(12) United States Patent
Mimura et al.

(10) Patent No.: US 12,479,106 B2
(45) Date of Patent: Nov. 25, 2025

(54) EXTERNAL INPUT DEVICE, ROBOT SYSTEM, CONTROL METHOD OF ROBOT SYSTEM, CONTROL PROGRAM, AND RECORDING MEDIUM

(71) Applicant: CANON KABUSHIKI KAISHA, Tokyo (JP)

(72) Inventors: Toshihiko Mimura, Tokyo (JP); Kazuki Otake, Saitama (JP); Shingo Amano, Kanagawa (JP); Kei Watanabe, Tokyo (JP); Yasuaki Tokunaga, Kanagawa (JP); Satoshi Kokubo, Tokyo (JP); Hideaki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 17/246,405

(22) Filed: Apr. 30, 2021

(65) Prior Publication Data

US 2021/0252713 A1 Aug. 19, 2021

Related U.S. Application Data

(63) Continuation of application No. PCT/JP2019/042344, filed on Oct. 29, 2019.

(30) Foreign Application Priority Data

Nov. 1, 2018 (JP) ................................. 2018-206679

(51) Int. Cl.
*B25J 13/08* (2006.01)
*B25J 9/16* (2006.01)
(Continued)

(52) U.S. Cl.
CPC ........... *B25J 9/1697* (2013.01); *B25J 13/081* (2013.01); *B25J 19/023* (2013.01); *G06F 3/0416* (2013.01)

(58) Field of Classification Search
None
See application file for complete search history.

(56) References Cited

U.S. PATENT DOCUMENTS 6,636,254 B1 * 10/2003 Onishi ...................... G06T 3/60
348/65
9,619,049 B2 * 4/2017 Bostick ................. G06F 1/1694
(Continued)

FOREIGN PATENT DOCUMENTS

CN 107040709 A 8/2017
EP 1981263 A1 10/2008
(Continued)

OTHER PUBLICATIONS

Michel et al.; ""KhepOnTheWeb": An Experimental Demonstrator in Telerobotics and Virtual Reality"; Virtual Systems and Multimedia (VSMM) 1997; IEEE; Sep. 10, 1997; pp. 90-98.
(Continued)

*Primary Examiner* — Matthew Ell
*Assistant Examiner* — Gabriel Mercado
(74) *Attorney, Agent, or Firm* — Canon U.S.A., Inc. IP Division

(57) ABSTRACT

An external input device is employed, the external input device being configured to operate a robot system including an imaging apparatus capable of changing an imaging point of view and a robot apparatus, the external input device includes a display area, a robot apparatus operation unit configured to operate the robot apparatus, an imaging operation unit configured to operate the imaging apparatus, and an image display unit configured to display an image captured by the imaging apparatus, wherein the robot apparatus operation unit, the imaging operation unit, and the image display unit are displayed on the display area, and wherein
(Continued)

the image display unit is disposed between the robot apparatus operation unit and the imaging operation unit.

40 Claims, 43 Drawing Sheets

(51) Int. Cl.
   *B25J 19/02* (2006.01)
   *G06F 3/041* (2006.01)

(56) References Cited

U.S. PATENT DOCUMENTS

| | | | | |
|---|---|---|---|---|
| 11,407,111 | B2* | 8/2022 | Zhang | B25J 19/023 |
| 11,613,022 | B2* | 3/2023 | Hibino | B25J 9/042 |
| | | | | 700/259 |
| 2006/0229766 | A1* | 10/2006 | Setsuda | G05B 19/425 |
| | | | | 700/245 |
| 2007/0113255 | A1* | 5/2007 | Kurosawa | H04N 7/185 |
| | | | | 725/105 |
| 2010/0017033 | A1 | 1/2010 | Boca | |
| 2011/0107222 | A1* | 5/2011 | Uchida | H04N 21/42202 |
| | | | | 715/730 |
| 2011/0210917 | A1* | 9/2011 | LaFave | G06F 3/023 |
| | | | | 345/160 |
| 2011/0242024 | A1* | 10/2011 | Fukumoto | H04N 1/00472 |
| | | | | 345/173 |
| 2012/0051727 | A1* | 3/2012 | Tanaka | G03B 17/14 |
| | | | | 396/49 |
| 2012/0191269 | A1 | 7/2012 | Chen et al. | |
| 2014/0009561 | A1* | 1/2014 | Sutherland | B62D 11/04 |
| | | | | 348/14.05 |
| 2014/0068439 | A1 | 3/2014 | Lacaze et al. | |
| 2015/0074573 | A1* | 3/2015 | Teshima | G06F 3/04847 |
| | | | | 715/765 |
| 2015/0121225 | A1* | 4/2015 | Somasundaram | H04N 21/4316 |
| | | | | 715/721 |
| 2015/0331399 | A1* | 11/2015 | Hackl | G06F 3/04847 |
| | | | | 700/83 |
| 2016/0241767 | A1* | 8/2016 | Cho | G06F 3/04842 |
| 2016/0346936 | A1* | 12/2016 | Hietmann | G05B 19/409 |
| 2016/0364111 | A1 | 12/2016 | Piekny et al. | |
| 2017/0071681 | A1* | 3/2017 | Peine | A61B 34/74 |
| 2017/0154430 | A1 | 6/2017 | Yoshii | |
| 2018/0154517 | A1* | 6/2018 | Park | B25J 9/161 |
| 2019/0030713 | A1* | 1/2019 | Gabardos | B25J 9/163 |

FOREIGN PATENT DOCUMENTS

| | | |
|---|---|---|
| EP | 3349432 A1 | 7/2018 |
| JP | 2000-135689 A | 5/2000 |
| JP | 2001-121458 A | 5/2001 |
| JP | 2002331482 A | 11/2002 |
| JP | 2006-000977 A | 1/2006 |
| JP | 2007-334551 A | 12/2007 |
| JP | 2009-000782 A | 1/2009 |
| JP | 2011-212764 A | 10/2011 |
| JP | 2012023434 A | 2/2012 |
| JP | 2012171024 A | 9/2012 |
| JP | 2012192466 A | 10/2012 |
| JP | 2013-214943 A | 10/2013 |
| JP | 2014184543 A | 10/2014 |
| JP | 2015-083331 A | 4/2015 |
| JP | 2015-188990 A | 11/2015 |
| JP | 2018-107786 A | 7/2018 |
| JP | 2018113659 A | 7/2018 |
| WO | 2017/033355 A1 | 3/2017 |

OTHER PUBLICATIONS

Marin et al.; "The UJI Online Robot: An Education and Training Experience"; Autonomous Robots, vol. 15, No. 3; Nov. 1, 2003; pp. 283-297.

Rastogi et al.; "Telerobotic control with stereoscopic augmented reality"; Proc. SPIE vol. 2653, Stereoscopic Displays and Virtual Reality Systems III; Apr. 10, 1996; pp. 115-122.

Zafar et al.; "Smart Phone Interface for Robust Control of Mobile Robots"; 2014 IEEE International Conference on Autonomous Robot Systems and Competitions (ICARSC); May 14-15, 2014; pp. 42-46; Espinho, Portugal.

Hashimoto et al.; "TouchMe: An Augmented Reality Based Remote Robot Manipulation"; The 21st International Conference on Artificial Reality and Telexistence; Nov. 28-30, 2011; pp. 61-66; Osaka, Japan.

* cited by examiner

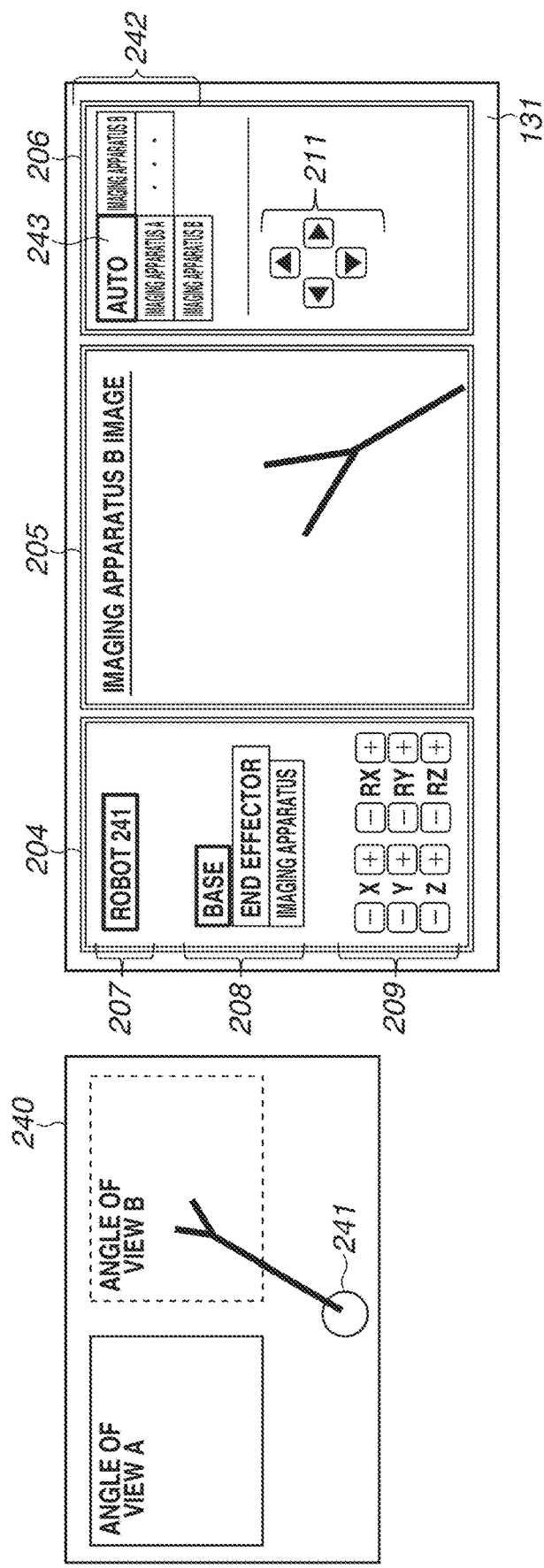

FIG.23

SETTING > MEASUREMENT BY PROCESS PROGRAM

Process Prg 1

| PROCESS | ROBOT OPERATION | ROBOT-MAN OPERATION | MAN OPERATION | OTHER OPERATIONS |
|---|---|---|---|---|
| PRESENCE/ABSENCE DETECTION 1 | Start | | | |
| ... | | | | |
| HAND UNCLAMPING | | | | |
| ARM OPERATION P2 | | | | |
| PRESENCE/ABSENCE DETECTION 2 | Stop | Start | | |
| ... | | | | |
| PRESENCE/ABSENCE DETECTION 2 | | Stop | Start | |
| ... | | | | |
| PRESENCE/ABSENCE DETECTION 3 | | | Stop | Start |
| ... | | | | |
| END | | | | Stop |

FIG.24

SETTING > MEASUREMENT BY MAN-ROBOT DISTANCE

MAN-ROBOT DISTANCE AT WHICH OPERATION IS REGARDED AS COLLABORATIVE   20 mm

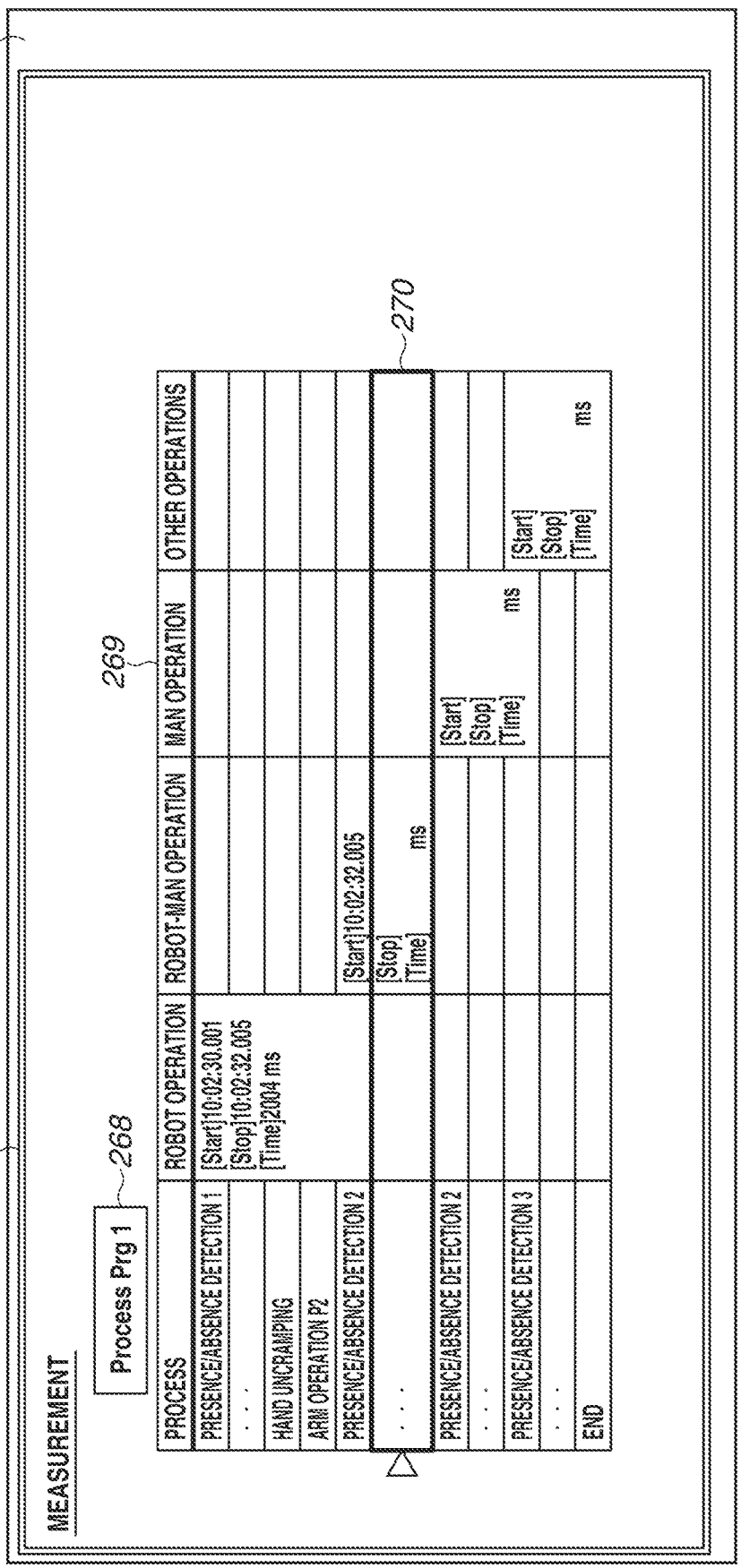

FIG. 26

MEASUREMENT HISTORY (271)

| DATE AND TIME | Process Prg |
|---|---|
| ⋮ | ⋮ |
| 10:02:30.001- | Process Prg 1 |
| ⋮ | ⋮ |

(273)

Process Prg 1 (274)

(272)

| PROCESS | ROBOT OPERATION | ROBOT-MAN OPERATION | MAN OPERATION | OTHER OPERATIONS |
|---|---|---|---|---|
| PRESENCE/ABSENCE DETECTION P1 | [Start]10:02:30.001<br>[Stop]10:02:32.005<br>[Time]2004 ms | | | |
| ⋮ | | | | |
| HAND UNCLAMPING | | | | |
| ARM OPERATION P2 | | | | |
| PRESENCE/ABSENCE DETECTION 2 | | [Start]10:02:32.005<br>[Stop]10:02:39.025<br>[Time] 7020 ms | | |
| ⋮ | | | | |
| PRESENCE/ABSENCE DETECTION 2 | | | [Start]10:02:39.025<br>[Stop]10:02:44.055<br>[Time] 5030 ms | |
| ⋮ | | | | |
| PRESENCE/ABSENCE DETECTION 3 | | | | [Start]10:02:44.055<br>[Stop]10:02:46.104<br>[Time] 2049 ms |
| END | | | | |

(275)

(131)

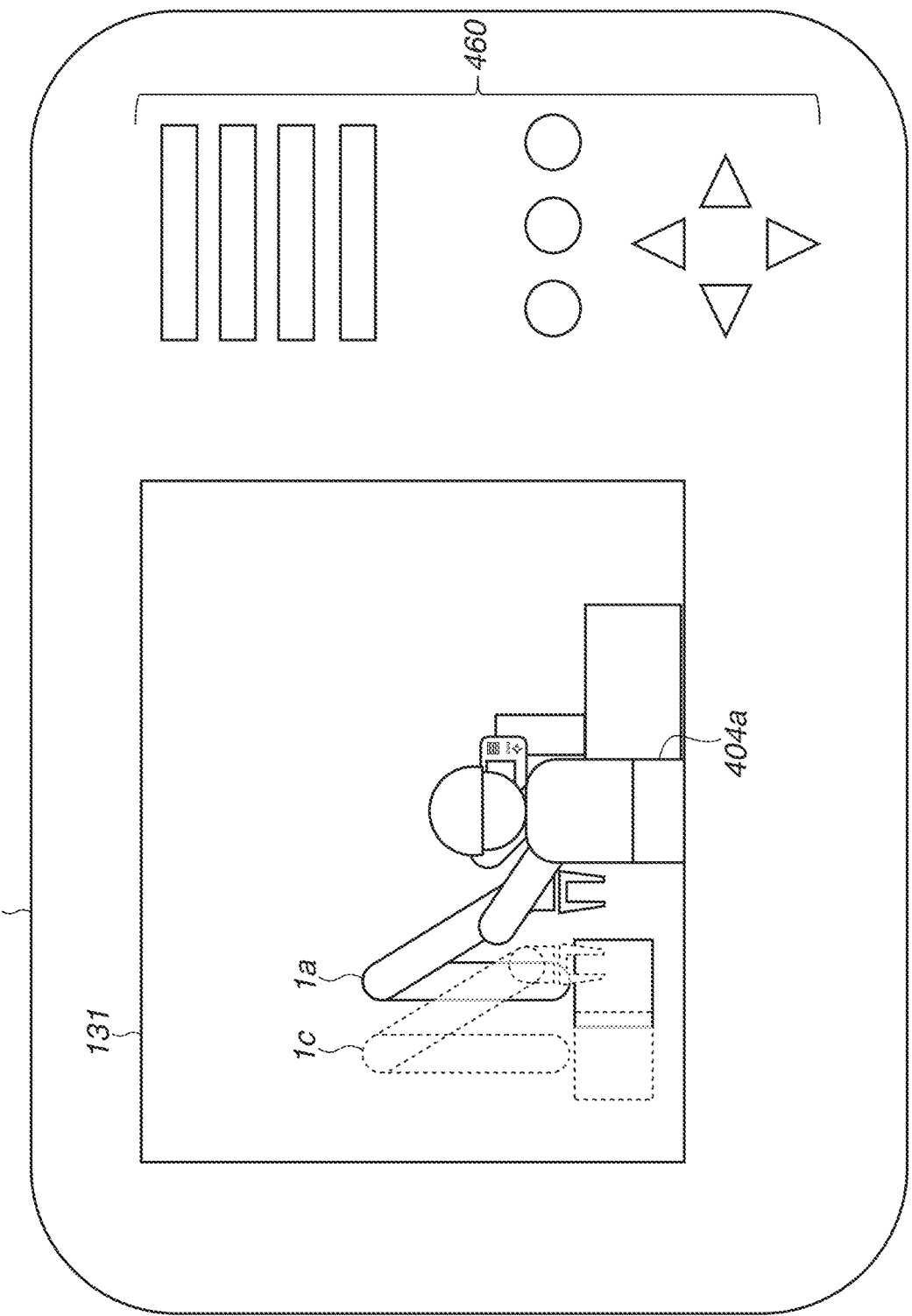

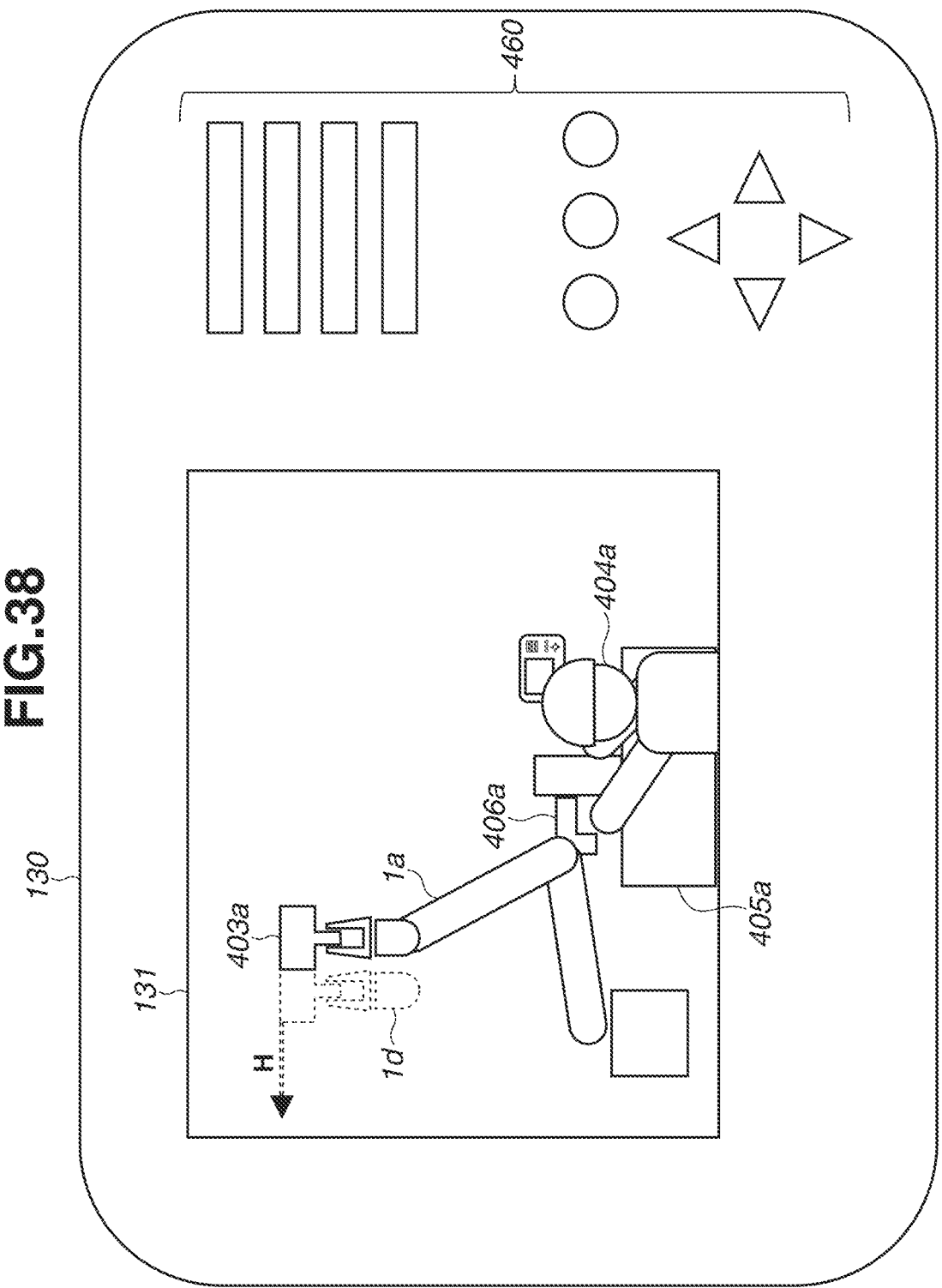

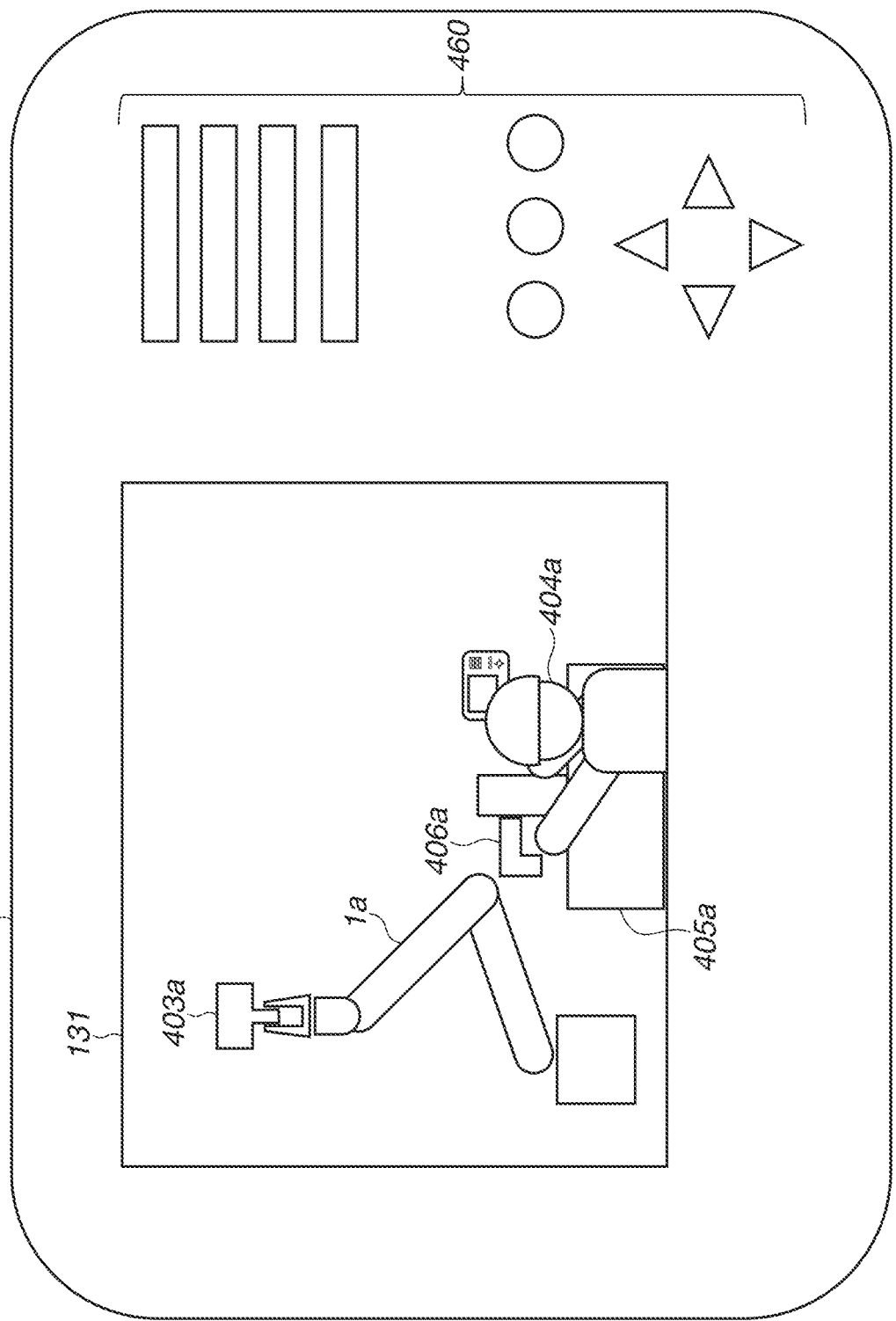

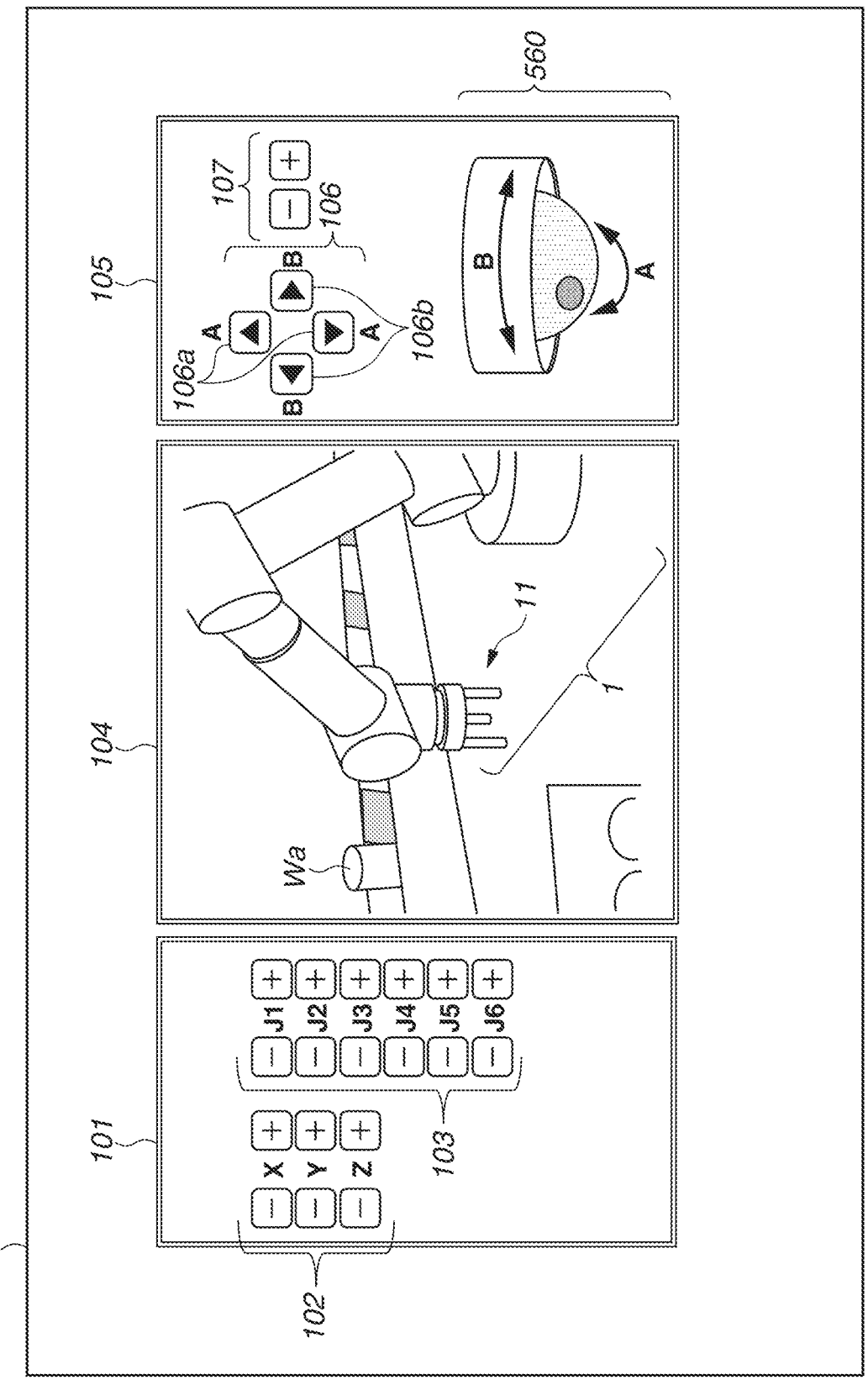

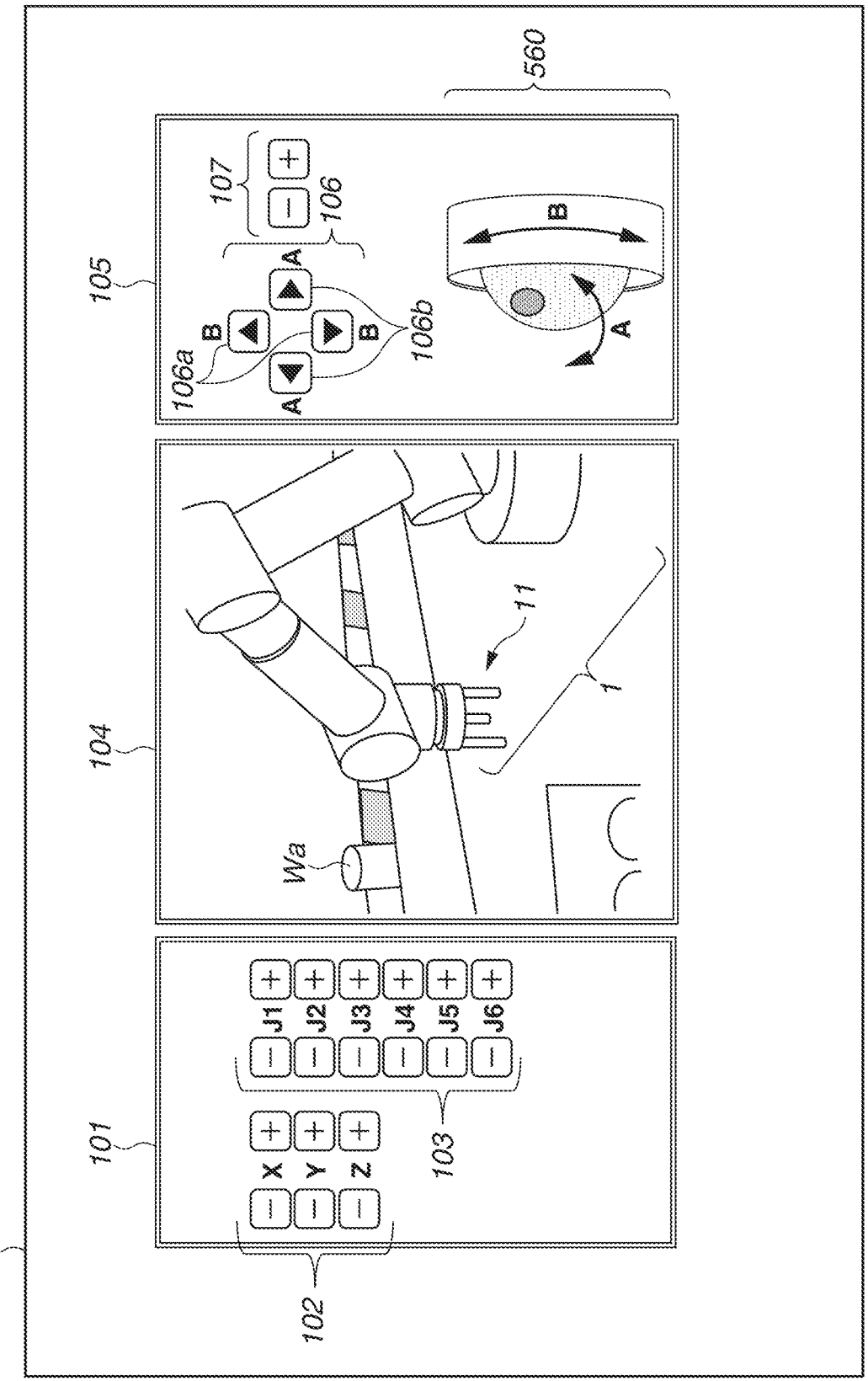

EXTERNAL INPUT DEVICE, ROBOT SYSTEM, CONTROL METHOD OF ROBOT SYSTEM, CONTROL PROGRAM, AND RECORDING MEDIUM

CROSS-REFERENCE TO RELATED APPLICATIONS

This application is a Continuation of International Patent Application No. PCT/JP2019/042344, filed Oct. 29, 2019, which claims the benefit of Japanese Patent Application No. 2018-206679, filed Nov. 1, 2018, both of which are hereby incorporated by reference herein in their entirety.

BACKGROUND OF THE INVENTION

Field of the Invention

The present invention relates to a robot system including an imaging apparatus.

Background Art

Robot systems for monitoring robot apparatuses by using imaging apparatuses have been attracting attention in recent years.

For example, in Patent Literature 1 (PTL 1), pan and tilt functions are provided to an imaging apparatus so that the imaging apparatus has an increased imaging range. The imaging apparatus can thus be used to display a robot apparatus in various directions and monitor various scenes of the robot apparatus by making full use of a swing function and a zoom function of the imaging apparatus according to need.

In a robot system discussed in Patent Literature 2 (PTL 2), an image from an imaging apparatus mounted on a robot hand and the like is displayed on an external input device, such as a teaching tablet. An operator then manipulates the robot hand while viewing an image from the point of view of the robot hand, and teaches start and end positions of the robot arm by using the external input device.

By thus teaching a robot apparatus while the operator views an image from the imaging apparatus having a wide imaging range, teaching at a location dangerous to the operator or in a place not accessible to the operator can be performed.

CITATION LIST

Patent Literature

PTL 1: Japanese Patent Laid-Open No. 2018-107786
PTL 2: Japanese Patent Laid-Open No. 2009-000782

However, in the robot system discussed in PTL 2, a monitor that displays the image from the imaging apparatus is merely included in the external input device, such as a teaching panel.

For an operation of the imaging apparatus and the robot apparatus using a single external input device including a display unit, such as a monitor, for displaying an image, what kind of user interface (hereinafter, UI) can be included in the external input device has thus not been discussed.

In view of the foregoing, an object of the present invention is to provide an external input device having a UI that is user-friendly in operating an imaging apparatus and a robot apparatus by using the single external input device including a monitor for displaying an image.

SUMMARY OF THE INVENTION

In view of the above described issue, an external input device is employed, the external input device being configured to operate a robot system including an imaging apparatus capable of changing an imaging point of view and a robot apparatus, the external input device includes a display area, a robot apparatus operation unit configured to operate the robot apparatus, an imaging operation unit configured to operate the imaging apparatus, and an image display unit configured to display an image captured by the imaging apparatus, wherein the robot apparatus operation unit, the imaging operation unit, and the image display unit are displayed on the display area, and wherein the image display unit is disposed between the robot apparatus operation unit and the imaging operation unit.

Further features of the present invention will become apparent from the following description of exemplary embodiments with reference to the attached drawings.

BRIEF DESCRIPTION OF THE DRAWINGS

FIG. 20B is a diagram illustrating the external input device 130 according to the seventh exemplary embodiment.

FIG. 23 is a diagram illustrating the external input device 130 according to the eighth exemplary embodiment.

FIG. 24 is a diagram illustrating the external input device 130 according to the eighth exemplary embodiment.

FIG. 25 is a diagram illustrating the external input device 130 according to the eighth exemplary embodiment.

FIG. 26 is a diagram illustrating the external input device 130 according to the eighth exemplary embodiment.

FIG. 37 is a diagram illustrating an external input device 130 according to a thirteenth exemplary embodiment.

FIG. 38 is a diagram illustrating an external input device 130 according to a fourteenth exemplary embodiment.

FIG. 39 is a diagram illustrating the external input device 130 according to the fourteenth exemplary embodiment.

FIG. 40 is a diagram illustrating an external input device 130 according to a fifteenth exemplary embodiment.

FIG. 41 is a diagram illustrating the external input device 130 according to the fifteenth exemplary embodiment.

DESCRIPTION OF THE EMBODIMENTS

Modes for carrying out the present invention will be described below with reference to the accompanying drawings. The exemplary embodiments described below are merely examples. For example, detailed configurations can be modified as appropriate by those skilled in the art without departing from the gist of the present invention. Numerical values described in the present exemplary embodiments are reference values and not intended to limit the present invention.

First Exemplary Embodiment

Figure 1:
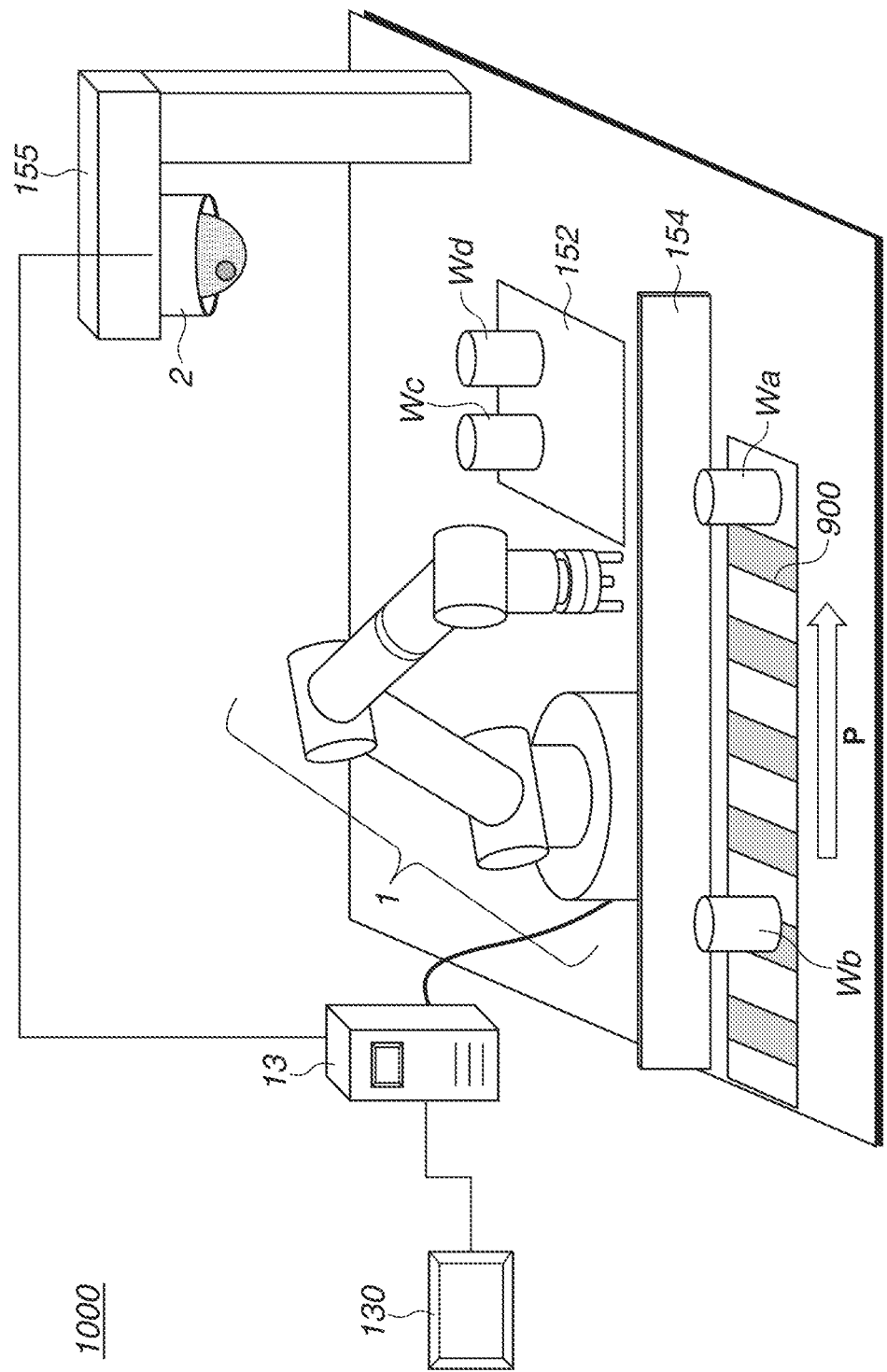
FIG. 1 is a diagram illustrating a configuration of a robot system 1000 according to the present exemplary embodiment.

FIG. 1 is a diagram illustrating a schematic configuration of a robot system 1000 according to the present exemplary embodiment. In the present exemplary embodiment, a description will be given of an example case where an operation where a robot apparatus 1 takes works Wa to Wd conveyed in the direction of the arrow P from a belt conveyor 900 and places onto a tray 152.

The robot system 1000 includes the robot apparatus 1, an imaging apparatus 2 for capturing an image of a state of the robot apparatus 1, a control apparatus 13 for controlling the robot apparatus 1 and the imaging apparatus 2, and an external input device 130 for teaching the robot apparatus 1 and the imaging apparatus 2.

In FIG. 1, the imaging apparatus 2 is installed on a pillar 155, the imaging apparatus 2 captures an image of the robot apparatus 1 and works nearby, and an image from the imaging apparatus 2 is displayed on a display unit 131 serving as a display area of the external input device 130.

Figure 2:
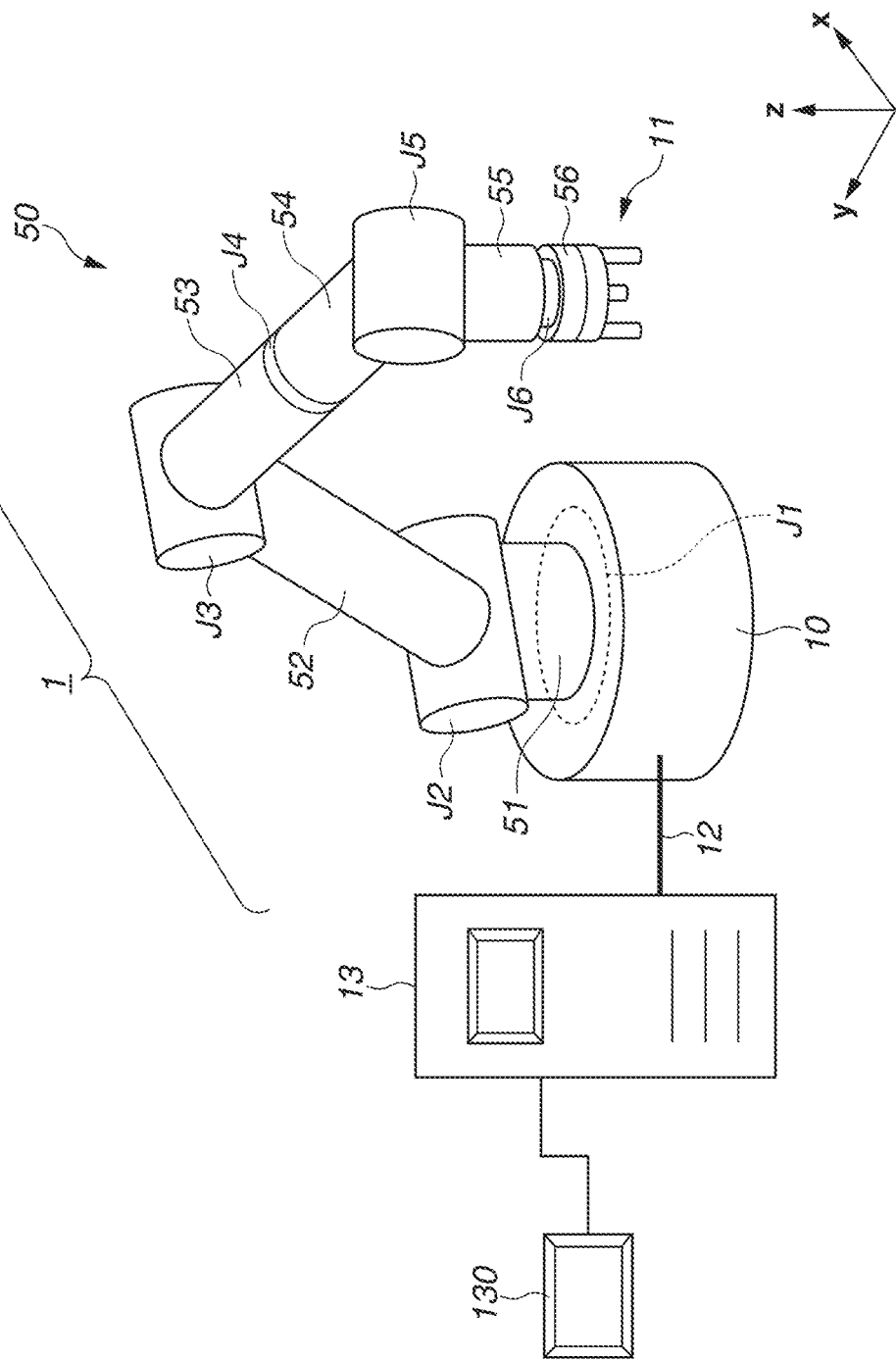
FIG. 2 is a diagram illustrating a configuration of a robot apparatus 1 according to the present exemplary embodiment.

FIG. 2 is a diagram illustrating a configuration of the robot apparatus 1 according to the present exemplary embodiment. In the present exemplary embodiment, the robot apparatus will be described by using a six-axis articulated robot as an example.

In FIG. 2, the robot apparatus 1 includes a base 10, a robot arm main body 50 including six joints J1 to J6, and an end effector 11 for gripping a work. The robot apparatus 1 is connected to the control apparatus 13 via a cable 12.

The robot arm main body 50 includes a plurality of links mutually connected in, e.g., a serial link form via a plurality of joints (six axes). Links 51, 52, 53, 54, 55, and 56 of the robot arm main body 50 are driven via the joints J1, J2, J3, J4, J5, and J6. The joints include not-illustrated motors as respective driving sources.

A robot hand for performing assembly operations or moving operations in a production line is applied to the end effector 11 connected to the end of the robot arm main body 50.

The end effector 11 can be attached to the link 56 by semi-fixed means, such as screwing, or by detachable means, such as latching.

In particular, if the end effector 11 is detachably attachable, a method of controlling the robot arm main body 50 to attach, detach, or interchange different end effectors 11 arranged in a supply location by the operation of the robot arm main body 50 itself can be employed.

Moreover, in the present exemplary embodiment, the joints J1 to J6 include respective not-illustrated torque sensors and encoders to enable feedback control on the driving of the respective joints.

In the present exemplary embodiment, the end effector 11 will be described by taking a robot hand including three fingers as an example. While in the present exemplary embodiment the fingered robot hand is described as an example, other mechanisms that can operate a work, such as an end effector that includes a sucking mechanism instead of fingers and holds a work, may be separately used.

The control apparatus 13 includes a central processing unit (CPU) including a microprocessor or the like. Moreover, the external input device 130 that is used by a teaching operator to teach the robot apparatus 1 and the imaging apparatus 2 near the robot apparatus 1 is connected to the control apparatus 13.

The operator inputs command values into the control apparatus 13 by using the external input device 130, and control values are passed from the control apparatus 13 to the robot arm main body 50 and the end effector 11, whereby an operation such as placing works onto the tray 152 is performed by the robot apparatus 1.

A protection wall 154 is installed in the vicinity of the robot apparatus 1. The protection wall 154 is provided for the sake of safety so that works or workers will not contact the robot apparatus 1.

The control apparatus 13 also includes a read only memory (ROM) storing a program for controlling corresponding driving units based on various operations of the robot arm main body 50, and data needed for such control. The control apparatus 13 further includes a random access memory (RAM) where data, setting values, and programs, and the like needed in controlling the robot arm main body 50 are loaded, and that is used as a working area of the CPU.

Figure 3:
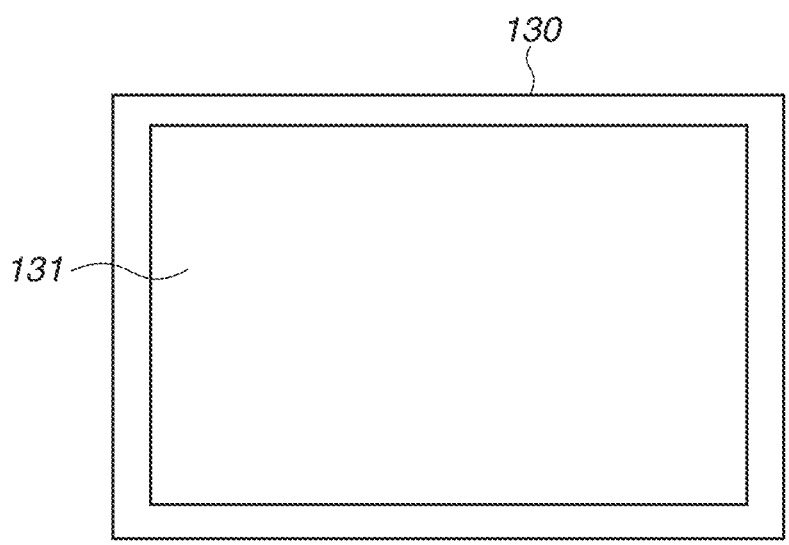
FIG. 3 is a diagram illustrating a configuration of an external input device 130 according to the present exemplary embodiment.

FIG. 3 is a diagram illustrating the external input device 130 that is used by a teaching operator to teach the robot apparatus 1 and the imaging apparatus 2. The external input device 130 includes the display unit 131. In the present exemplary embodiment, a teaching tablet will be described as an example of the external input device.

The display unit 131 displays an interface for teaching the robot apparatus 1 and the imaging apparatus 2 operations, an image captured by the imaging apparatus 2, and the like.

The display unit 131 is a touch panel display. The operator can input command values into the robot apparatus 1 and the imaging apparatus 2 by performing touch operations and the like on the display unit 131.

The operator can thus input command values by performing touch operations on a display area, based on information displayed on the display unit 131, and teach the robot apparatus 1 and the imaging apparatus 2 operations.

Figure 4:
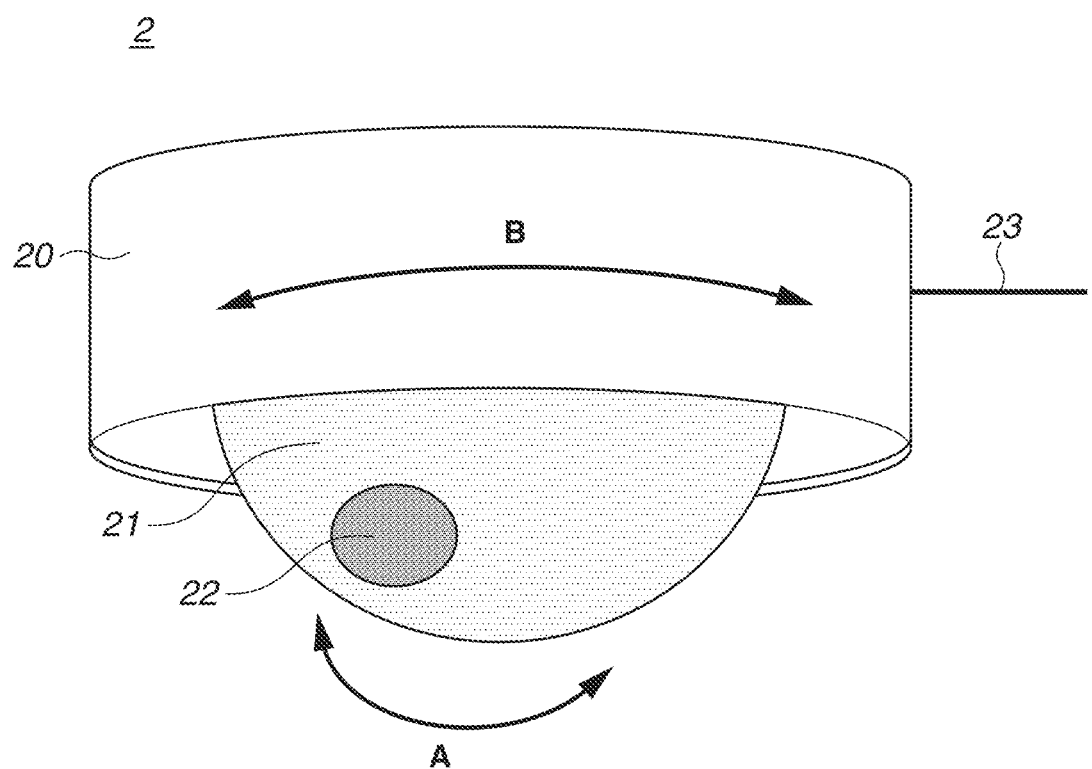
FIG. 4 is a diagram illustrating a configuration of an imaging apparatus 2 according to the present exemplary embodiment.

FIG. 4 is a diagram illustrating a configuration of the imaging apparatus 2. In the present exemplary embodiment, a pan-tilt camera capable of panning, tilting, and zooming will be described as an example of the imaging apparatus 2.

The imaging apparatus 2 includes a camera base 20, a movable unit 21, and an imaging unit 22 inside the movable unit 21.

The movable unit 21 includes a tilt motor and the imaging unit 22 is disposed via a transmission mechanism such as a shaft and a bearing, and thus the imaging unit 22 can be rotated in a tilt direction indicated by the arrow A.

The movable unit 21 also includes a pan motor. The imaging unit 22 is disposed via a transmission mechanism, such a shaft and a bearing, so that the imaging unit 22 can be rotated in a pan direction indicated by the arrow B.

The imaging apparatus 2 can change an imaging point of view and capture an image by driving the pan motor and the tilt motor. Recording an operation for driving the pan motor and the tilt motor to a given imaging point of view and imaging field of view and capturing an image with the imaging unit 22 at the specified position will be referred to as teaching the imaging apparatus 2.

The imaging apparatus 2 further includes a cable 23 for connecting to the control apparatus 13, and is connected to the control apparatus 13 via the cable 23.

The imaging apparatus 2 can thus capture an image of the robot apparatus 1 and a predetermined position nearby by using the movable unit 21, and can display the image on the display unit 131 of the external input device 130 via the control apparatus 13.

Figure 5:
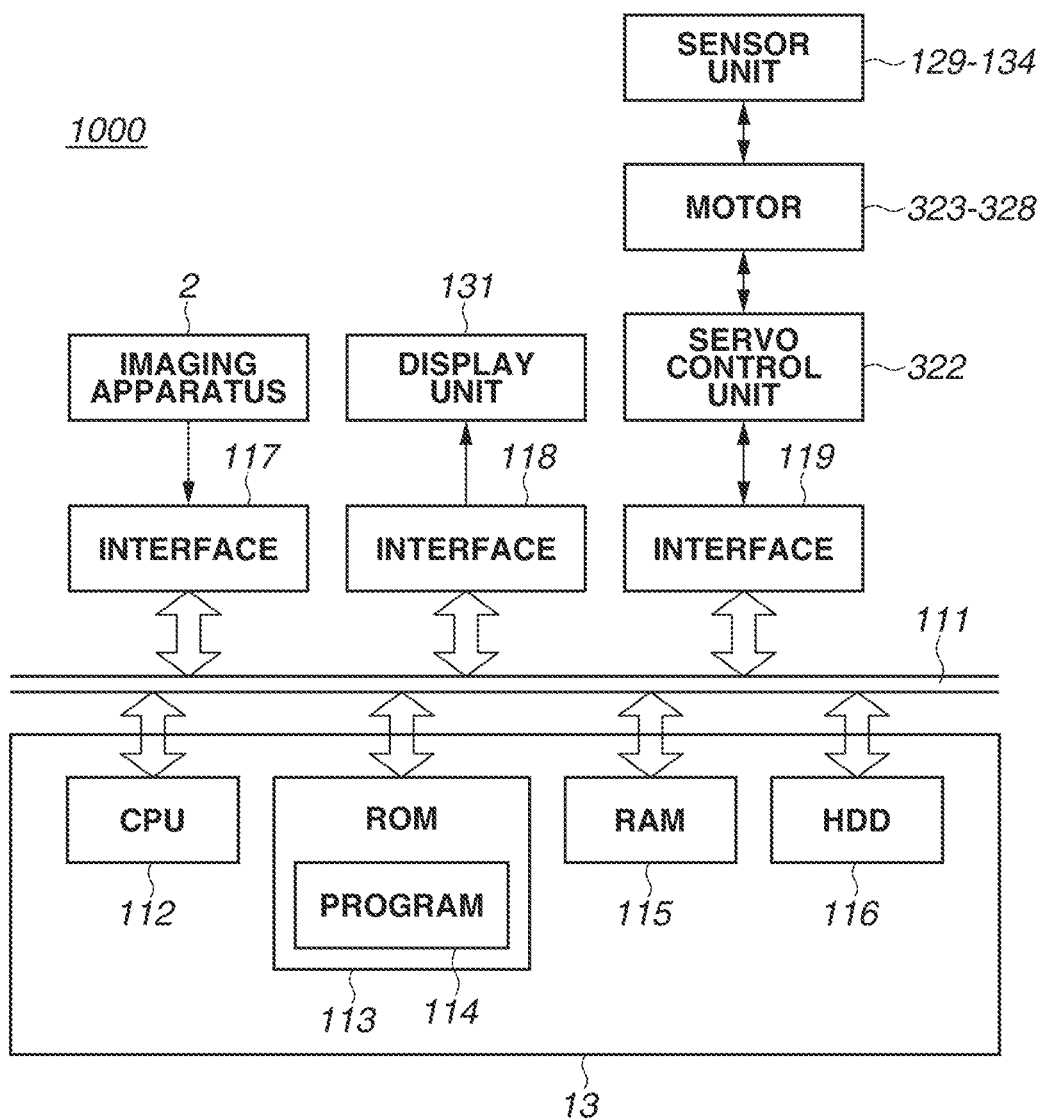
FIG. 5 is a control block diagram of the robot system 1000 according to the present exemplary embodiment.

FIG. 5 illustrates a control block diagram of the robot system 1000 that is used in the present exemplary embodiment.

In FIG. 5, a CPU 112, a ROM 113, a RAM 115, and an HDD 116 included in the control apparatus 13 are connected to a bus 111 for transmitting information. To control the driving of the pan motor and the tilt motor included in the imaging apparatus 2, not-illustrated drivers of the respective motors are further connected to the bus 111 via an interface 117.

A servo control unit 322 that controls motors 323 to 328 of the joints in the robot arm main body 50 of the robot apparatus 1 is also connected to the bus 111 via an interface 119.

The display unit 131 included in the external input device 130 for the operator to give commands to the robot apparatus 1 and the imaging apparatus 2 is also connected to the bus 111 via an interface 118.

The robot apparatus 1, the imaging apparatus 2, the external input device 130, and the control apparatus 13 included in the robot system 1000 can thus communicate with each other via the bus 111.

This enables the operator to transmit command values to the robot apparatus 1 and the imaging apparatus 2 and control the robot apparatus 1 and the imaging apparatus 2 in parallel via the external input device 130.

An example of a UI of the external input device 130 according to the present exemplary embodiment will be described below in detail. In the present exemplary embodiment, an example of a UI suitable in performing calibration operations and teaching operations on the robot apparatus 1 and the imaging apparatus 2 by using the external input device 130, using an image from the imaging apparatus 2 displayed on the external input device 130 will be described.

Figure 6:
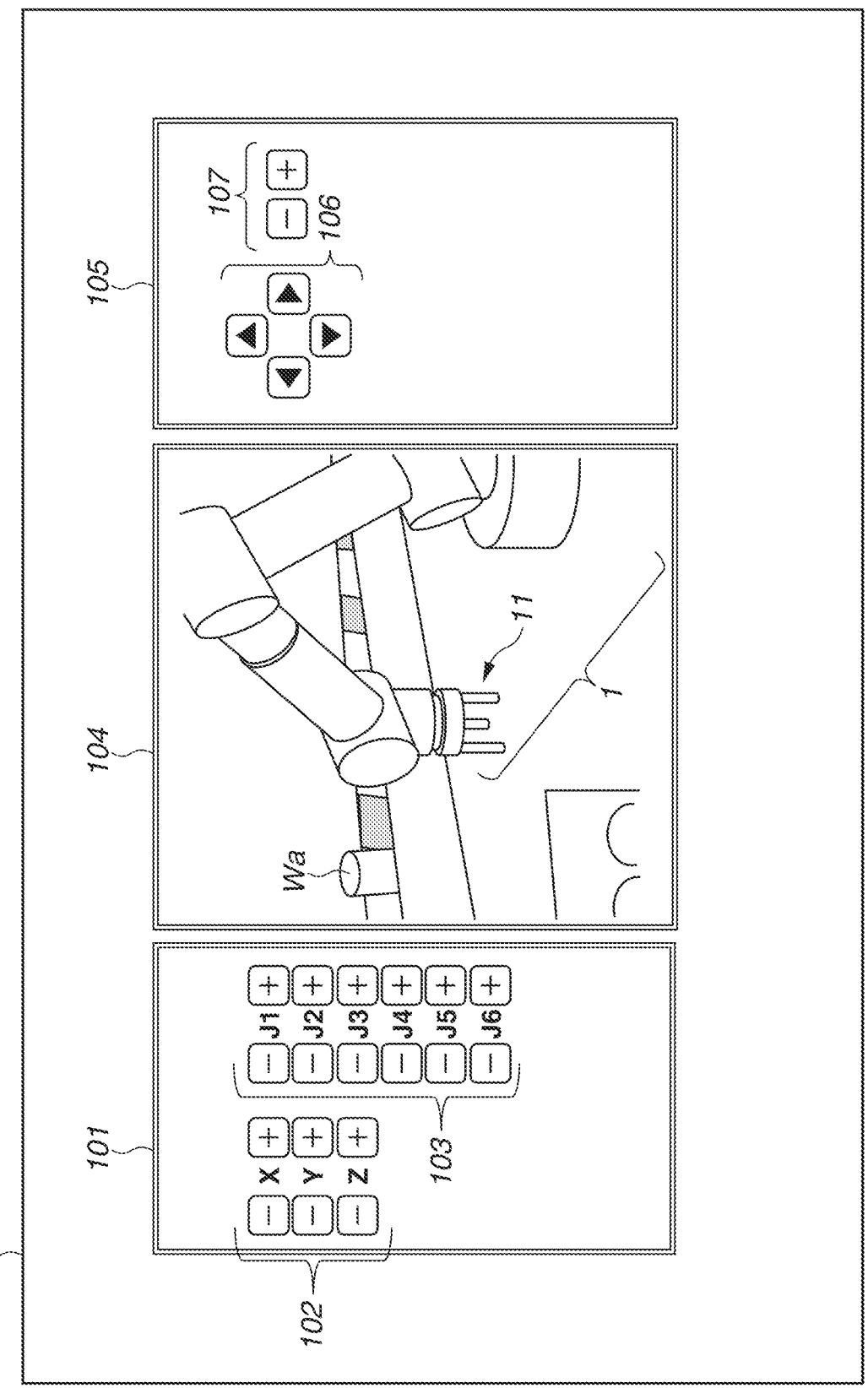
FIG. 6 is a diagram illustrating the external input device 130 according to a first exemplary embodiment.

FIG. 6 illustrates an example of a screen that is displayed on the display unit 131. The display unit 131 displays a robot apparatus operation section 101 for controlling and teaching the orientation of the robot apparatus 1, and an imaging operation section 105 for controlling and teaching the pan motor and the tilt motor of the imaging apparatus 2.

The robot apparatus operation section 101 includes end effector operation buttons 102 for moving the end effector 11 in X, Y, and Z directions in a given coordinate system, and joint operation buttons 103 for operating the amounts of rotation of the respective joints J1 to J6 separately.

The imaging operation section 105 includes point of view operation buttons 106 for pan and tilt operations of the imaging apparatus 2, and zoom operation buttons 107 for making zoom-in and zoom-out operations.

An image display section 104 for displaying an image captured by the imaging apparatus 2 is further displayed between the robot apparatus operation section 101 and the imaging operation section 105.

In general, the roles of an imaging apparatus in a robot system include measuring a position of a work to be handled, inspecting a work yet to be machined, and inspecting an assembly operation or machining operation by a robot apparatus.

The imaging apparatus therefore desirably captures an image of the vicinity of the end effector of the robot apparatus continuously. However, the movable range of the end effector of the robot apparatus can be wide depending on taught operations.

An imaging apparatus having pan and tilt functions capable of freely changing the direction of the imaging point of view is useful in such a case.

As illustrated in FIG. 6, on the external input device 130 for inputting teaching command values, the robot apparatus operation section 101, the imaging operation section 105, and the image display section 104 are all displayed on the same display unit, and thus inputs from the operator can be accepted.

The imaging point of view can thus be easily adjusted by using the image display section 104 and the imaging operation section 105 even in a case where the position of the end effector changes successively when the operator teaches the robot apparatus while viewing an image from the imaging apparatus.

The operator can thus teach the robot apparatus at each teaching point by using the robot apparatus operation section 101 and adjust the imaging apparatus 2 by using the imaging operation section 105 in conjunction with the robot apparatus 1 while checking the imaging point of view in the image display section 104.

A user-friendly input device can thus be provided since teaching operations on the robot apparatus 1 and teaching operations on the imaging apparatus 2 can be made and the image from the imaging apparatus 2 can be observed on the same screen.

The robot apparatus operation section 101 is displayed on either the left or the right of the image display section 104, and the imaging operation section 105 on the other. The operation sections are thereby made accessible to the left and right hands of the operator when the operator holds the external input device 130. This can further improve the operability of the external input device 130 since the fingers of the operator can easily reach the operation sections. The display positions of the robot apparatus operation section 101, the imaging operation section 105, and the image display section 104 may be changeable as appropriate depending on the size of the operator's hands etc.

Second Exemplary Embodiment

In the foregoing first exemplary embodiment, the external input device is configured so that teaching operations on the robot apparatus 1 and teaching operation on the imaging apparatus 2 can be made and the image of the imaging apparatus 2 can be observed on the same screen, whereby the convenience of operator's operation is improved.

In addition to the foregoing, in the present exemplary embodiment, the UI of the external input device can ensure the safety of the operator.

Differences from the first exemplary embodiment in hardware and control system configurations will be illustrated and described below. Portions similar to those of the first exemplary embodiment shall have similar configurations and be capable of performing similar operations to the foregoing, and a detailed description thereof will be omitted.

Figure 7:
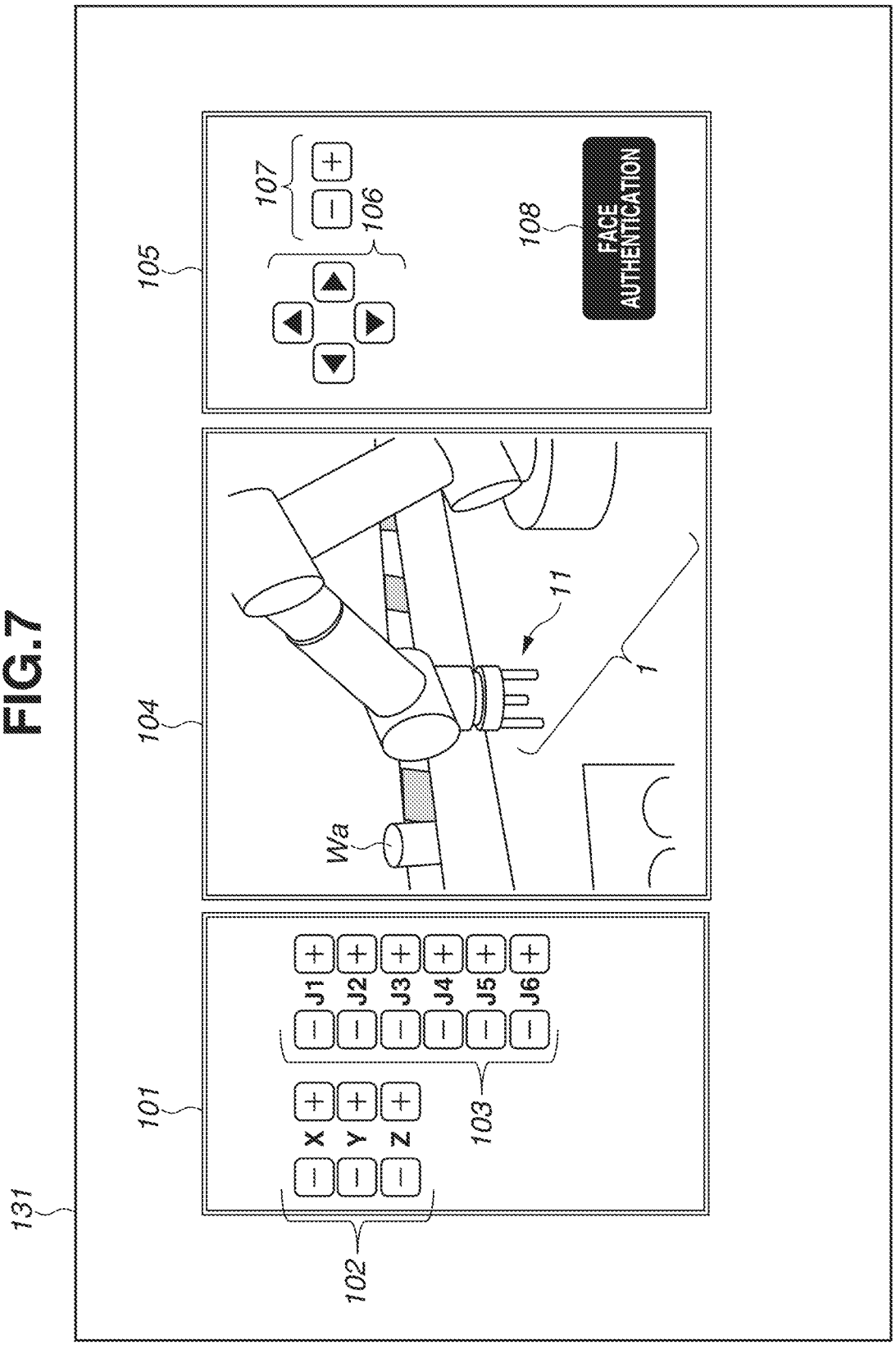
FIG. 7 is a diagram illustrating an external input device 130 according to a second exemplary embodiment.

FIG. 7 illustrates a screen displayed on the display unit 131 according to the present exemplary embodiment. A difference from the first exemplary embodiment is that the imaging operation section 105 of the display unit 131 includes a face authentication button 108 for switching a face authentication function between enabled and disabled.

For example, in the case of a robot system where an operator frequently approaches a robot apparatus, it should be ensured that the operator is prevented from injury.

For that purpose, a safety upper limit needs to be set on the driving speed of the robot apparatus. This can be achieved by implementing an alert function of reducing the driving speed of the robot apparatus in a case where the presence of an operator is detected in the image from the imaging apparatus.

However, when teaching the robot apparatus, the operator typically comes near the robot apparatus, and an image of the operator is captured by the imaging apparatus.

This activates the alert function, and the efficiency of the teaching operation drops since the teaching operation is performed with the driving speed of the robot apparatus reduced.

In the present exemplary embodiment, the face of the teaching operator registered in advance is recognized from the image from the imaging apparatus 2.

Figure 8:
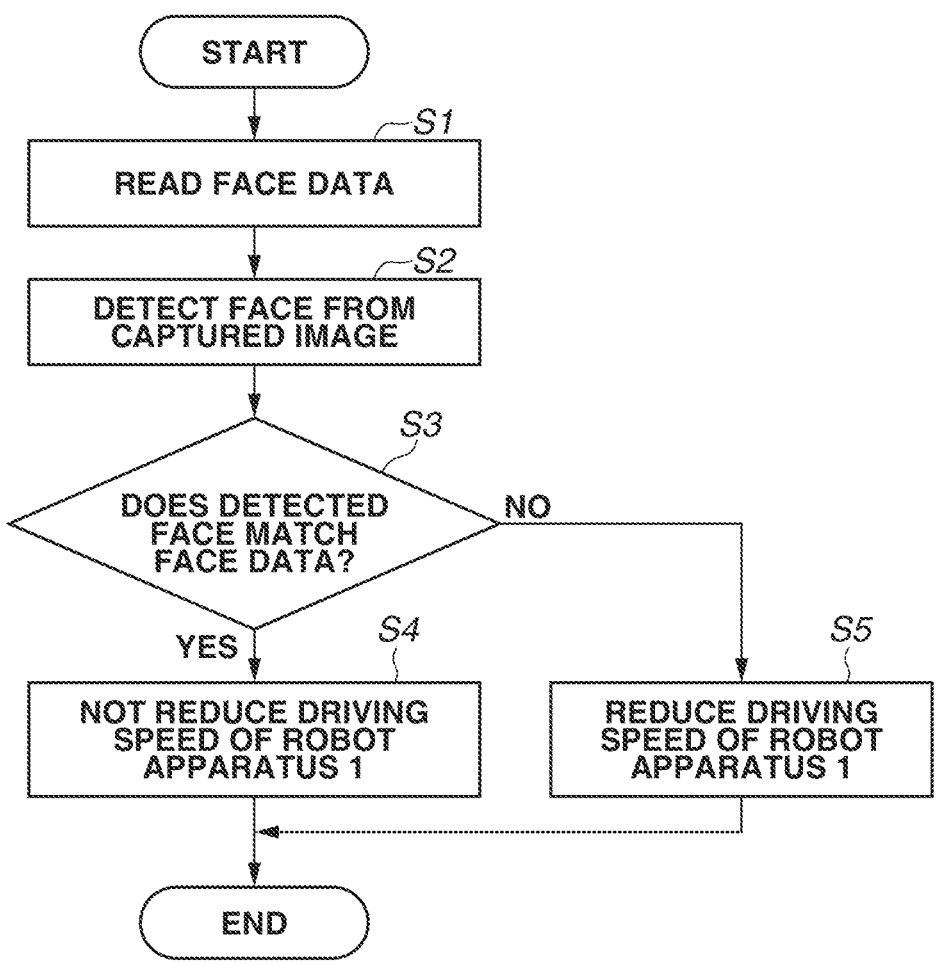
FIG. 8 is a flowchart illustrating a control procedure according to the second exemplary embodiment.

Data on the face of the teaching operator is recorded in a storage unit such as the HDD 116 in advance. In a case where the face authentication button 108 is pressed, an authentication program is loaded into the RAM 115, and a face authentication operation is performed. FIG. 8 is a flowchart of the authentication program according to the present exemplary embodiment. The processing procedure of FIG. 8 is started by pressing of the face authentication button 108. While these processing procedures are described to be executed by the control apparatus 13, the external input device 130 may include another control device and execute the processing procedures.

In step S1, the control apparatus 13 initially reads the face data from the HDD 116.

In step S2, the control apparatus 13 detects a face from an image currently captured by the imaging apparatus 2.

In step S3, the control apparatus 13 determines whether the detected face matches the previously recorded data on the face of the teaching operator. If the detected face matches the face data (YES in step S3), the processing proceeds to step S4. If not (NO in step S3), the processing proceeds to step S5.

In step S4, the operator teaching the robot apparatus 1 can be determined to be one well-trained on the danger from the robot apparatus 1 and the safety measures, and the risk of contact between the robot apparatus 1 and the operator can be determined to be low. The alert function therefore does not necessarily need to be enabled. The control apparatus 13 thus terminates the face authentication program without reducing the driving speed of the robot apparatus.

Meanwhile, in step S5, the operator near the robot apparatus 1 can be determined to be one not well-trained on the danger from the robot apparatus 1 or the safety measures, and there is the possibility of contact between the robot apparatus 1 and the operator. The alert function therefore needs to be enabled to ensure the operator's safety. The control apparatus 13 thus reduces and limits the driving speed of the robot apparatus 1, and terminates the face authentication program.

In such a manner, the alert function can be performed when needed. Since a skilled operator can make teaching operations at high driving speed in teaching the robot apparatus, the efficiency of the teaching operations can be improved.

The processing procedure of FIG. 8 may be started when the external input device 130 recognizes that a teaching mode is set, instead of pressing the face authentication button 108.

Third Exemplary Embodiment

Next, an example of a UI suitable in performing calibration operations and teaching operations on a robot apparatus 1 and an imaging apparatus 2 by using the external input device 130, using an image from the imaging apparatus 2 displayed on the external input device 130 will be described as a third exemplary embodiment.

In the present exemplary embodiment, description will be given of an example of a UI suitable in capturing an image of the robot apparatus 1 by the imaging apparatus 2 in synchronization with the operation of the robot apparatus 1.

Differences from the foregoing exemplary embodiments in hardware and control system configurations will be illustrated and described below. Portions similar to those of the first exemplary embodiment shall have similar configurations and be capable of performing similar operations to the foregoing, and a detailed description thereof will be omitted.

The present exemplary embodiment will be described by taking a case where the imaging apparatus 2 captures an image in synchronization with an operation where the robot apparatus 1 places works Wa to Wd conveyed in the direction of the arrow P onto the tray 152 from the belt conveyor 900 in order, as an example. The operation of the robot apparatus 1 and the synchronized operation of the imaging apparatus 2 will be described below in detail.

Initially, the imaging apparatus 2 drives the pan motor and the tilt motor to change the point of view and captures an image of the tray 152 at timing when the robot apparatus 1 grips a work on the belt conveyor 900.

The presence or absence of a work on the tray is detected by image processing on the captured image. The robot apparatus 1 places the work gripped by the end effector 11 on a position where there is no work on the tray.

The imaging apparatus 2 drives the pan motor and the tilt motor to change the point of view and captures an image of the belt conveyor 900 at timing when the robot apparatus 1 places the work on the tray 152.

The presence or absence of a work on the belt conveyor 900 is detected by image processing on a captured image. In a case where there is a work on the belt conveyor 900, the robot apparatus 1 obtains the work on the belt conveyor 900.

The robot system 1000 makes the robot apparatus 1 and the imaging apparatus 2 repeat the foregoing operations. In such a manner, the imaging apparatus 2 changes the imaging point of view and captures an image in synchronization with the operation of the robot apparatus 1, recognizes the working environment based on the captured image, and gives the operation of the robot apparatus 1 feedback.

To implement such an operation, the imaging apparatus 2 needs to complete changing the imaging point of view within the time needed for the robot apparatus 1 to grip a work on the belt conveyor 900 and place the work on the tray 152.

Whether the imaging point of view can be changed in time has conventionally been checked by simulation or by actually operating the robot apparatus 1 and the imaging apparatus 2, and if not, the imaging point of view has been set again. Such an operation has been burdensome to the operator.

In the present exemplary embodiment, the burden on the teaching operator in teaching the imaging point of view of the imaging apparatus 2 in the case where the imaging apparatus 2 captures an image of the robot apparatus 1 in synchronization with such an operation of the robot apparatus 1 can be reduced.

Figure 9:
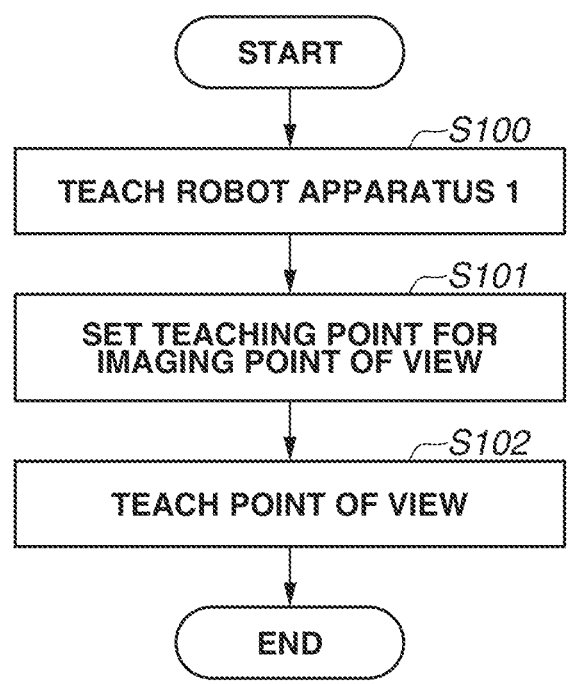
FIG. 9 is a flowchart illustrating a control procedure according to the third exemplary embodiment.

FIG. 9 is a flowchart of a method for teaching the robot apparatus 1 and the imaging apparatus 2 according to the present exemplary embodiment. The teaching method includes three steps S100 to S102.

In FIG. 9, in step S100, the operator initially teaches the robot apparatus 1. The operator teaches the robot apparatus 1 by direct teaching. The operator teaches the robot apparatus 1 an operation for gripping a work on the belt conveyor 900 and placing the work on the tray 152 by directly moving the robot apparatus 1 by hand.

However, the teaching method is not limited thereto. As described in the first and second exemplary embodiments, the operator may teach the robot apparatus 1 by offline teaching where the operator performs teaching near the robot apparatus 1 by using the external input device 130. Various robot apparatus teaching methods implementable by those skilled in the art can be used.

Teaching data taught by the foregoing method may be recorded in the control apparatus 13. The external input device 130 may include a recording unit, and the teaching data may be recorded in the external input device 130.

In steps S101 and S102, the operator teaches the imaging apparatus 2. The operator teaches the point of view of the imaging apparatus 2 in association with the operation of the robot apparatus 1. Before a description of steps S101 and S102, an example of the UI of the external input device 130 according to the present exemplary embodiment will be described in detail below.

Figure 10:
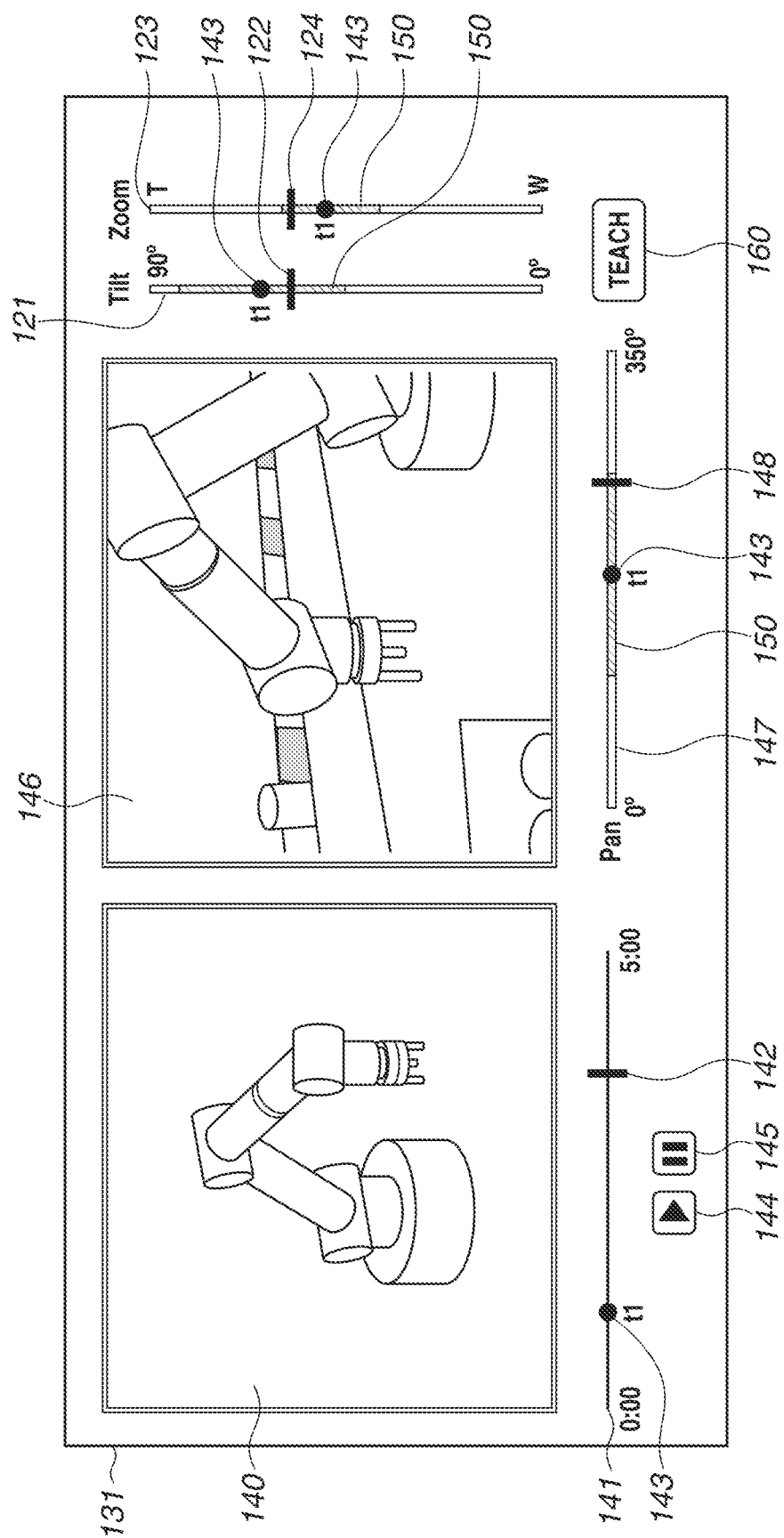
FIG. 10 is a diagram illustrating an external input device 130 according to a third exemplary embodiment.

FIG. 10 illustrates a screen for teaching the imaging apparatus 2 that is displayed on the display unit 131 of the external input device 130. Differences from the foregoing exemplary embodiments will be described below.

In FIG. 10, the present exemplary embodiment includes a model display section 140 where the orientation of the robot apparatus 1 is displayed by a three-dimensional (3D) model based on previously-recorded model data on the robot apparatus 1.

The model display section 140 is configured so that a probable orientation of the actual robot apparatus 1 calculated from the model data and teaching point data can be observed as a 3D model on-screen. The orientation is calculated by using a technique called RRT (Rapidly-Exploring Random Trees).

A playback bar 141 is located below the model display section 140, with a playback button 144 and a pause button 145 for operating the robot apparatus 1 which has completed teaching.

A current position mark 142 indicating the temporal current position of the operation of the robot apparatus 1 being played back is displayed on the playback bar 141. The playback bar 141 is a bar representing up to an end time, with the start of a predetermined operation of the robot apparatus 1 as 0 sec. In FIG. 5, the end time is 5:00 (5 minutes).

In a case where the playback button 144 is pressed, the actual robot apparatus 1 starts to operate. In a case where the pause button 145 is pressed, the actual robot apparatus 1 suspends operation.

The operation of the actual robot apparatus 1 can be controlled by touching the current position mark 142 and making a swipe from side to side in the suspended state.

In a case where the current position mark 142 is swiped to the right, the actual robot apparatus 1 operates by the amount of swipe movement. In a case where the current position mark 142 is swiped to the left, the robot apparatus 1 operates reversely by the amount of swipe movement.

Like the operation for sliding the current position mark 142, the robot apparatus 1 can be similarly operated by touching a part of the model display section 140 and making a swipe from side to side.

An image display section 146 displays the image captured by the imaging apparatus 2. A pan operation bar 147 for operating the pan motor of the imaging apparatus 2 is located below the image display section 146, and a pan position mark 148 indicating the current position of the imaging apparatus 2 in the pan direction is displayed.

The operator can operate the pan motor of the imaging apparatus 2 by touching the pan position mark 148 and sliding the pan position mark 148 from side to side.

A pan motor operation similar to the operation for sliding the pan position mark 148 can also be made by touching a part of the image display section 146 and making a swipe from side to side.

The tilt motor can be operated in a similar manner to the foregoing pan motor operation.

A tilt operation bar 121 for operating the tilt motor of the imaging apparatus 2 is displayed on the right of the image display unit in the diagram, and a tilt position mark 122 indicating the current position of the imaging apparatus 2 in the tilt direction is displayed.

The operator can operate the tilt motor of the imaging apparatus 2 by touching the tilt position mark 122 and sliding the tilt position mark 122 up and down.

A tilt motor operation similar to the operation for sliding the tilt position mark 122 can also be made by multi-touching a part of the image display section 146 with two fingers and making a swipe up and down.

A display and function similar to those of the foregoing pan motor operation and the tilt motor operation are also provided for the zooming of the imaging apparatus 2.

A zoom bar 123 is displayed on the right of the tilt operation bar 121 in the diagram, and a zoom adjustment mark 124 indicating the current focal position of the imaging apparatus 2 during zoom-up and zoom-down is displayed.

The operator can adjust the zooming of the imaging apparatus 2 by touching the zoom adjustment mark 124 and sliding the zoom adjustment mark 124 up and down. The zoom adjustment mark 124 is slid up to zoom up, and slid down to zoom down.

A zoom adjustment similar to that made by the operation for sliding the zoom adjustment mark 124 can also be made by touching a part of the image display section 146 and making a pinch-in or pinch-out.

If the pan position, the tilt position, and the zoom position are adjusted by the respective bars and an imaging teach button 160 is pressed, a teaching point for the imaging point of view of the imaging apparatus 2 is set where the marks are positioned on the bars.

An imaging point of view teaching point 143 indicating the teaching point for the imaging point of view of the imaging apparatus 2 is displayed on each of the playback bar 141, the pan operation bar 147, the tilt operation bar 121, and the zoom bar 123 for operating the robot apparatus 1 and the imaging apparatus 2.

The operator can thus easily find out the details (pan position, tilt position, and zoom position) of a predetermined teaching point (in FIG. 10, t1) where the imaging apparatus 2 is taught in a series of operations taught to the robot apparatus 1.

Return to FIG. 9. In step S101, the operator teaches an imaging point of view of the imaging apparatus 2 in the series of operations of the robot apparatus 1 taught in step S100.

Initially, the operator presses the playback button 144 to operate the robot apparatus 1. The operator observes the image display section 146, and presses the pause button 145 to suspend the robot apparatus 1 at a point where to teach an imaging point of view.

The position of the current position mark 142 on the playback bar 141 while paused servers as the teaching point for the imaging point of view of the imaging apparatus 2 in the series of operations of the robot apparatus 1.

In step S102, the operator teaches the motors and zooming of the imaging apparatus 2. The teaching operator adjusts the pan position, the tilt position, and the zoom position of the imaging apparatus while observing the image display section 146, and finally presses the imaging teach button 160 to teach the imaging point of view of the imaging apparatus 2.

Here, point of view settable ranges 150 indicating the ranges where the point of view can be set are displayed on the pan operation bar 147, the tilt operation bar 121, and the zoom adjustment bar 123.

The point of view settable ranges 150 indicate setting ranges where the point of view can be changed without lagging behind the operation of the robot apparatus 1.

FIG. 10 illustrates a state where the imaging apparatus 2 has already been taught the predetermined teaching point t1 indicated by the imaging point of view teaching points 143 and is newly taught at the current position mark 142.

Here, the ranges where the pan position, the tilt position, and the zoom position can be changed while the robot apparatus 1 operates from the imaging point of view teaching point 143 to the current position mark 142 on the playback bar 141 are displayed as the point of view settable ranges 150.

A method for setting the point of view settable ranges 150 will be described in detail. Initially, a point of view change time that takes from the past imaging point of view teaching point 143 to the current position mark 142, which is the point to teach another imaging point of view at in step S101 this time, is calculated.

If there is a plurality of past imaging point of view teaching points, the imaging point of view teaching point closest to the current position mark to teach the point of view at this time is referred to.

Next, settable pan, tilt, and zoom amounts are determined from the point of view change time and the speeds of the pan motor, the tilt motor, and the zoom processing.

Finally, the ranges within the settable pan, tilt, and zoom amounts centered at the past imaging point of view teaching points 143 displayed on the respective operation bars are set as the point of view settable ranges 150.

The operator makes various settings within the point of view settable ranges 150, various settings of the imaging point of view of the imaging apparatus 2 can thus be changed without lagging behind the operation of the robot apparatus 1. This enables changing the point of view of the imaging apparatus 2 in synchronization with the robot apparatus 1.

As described above, in the present exemplary embodiment, point of view settable ranges are displayed on the operation screen of the imaging apparatus 2 in teaching the imaging point of view of the imaging apparatus 2.

This provides the effect of reducing the burden on the operator since the imaging apparatus 2 can be prevented from being taught an imaging point of view conditioned such that the point of view of the imaging apparatus 2 is unable to be changed in time for the operation of the robot apparatus 1.

In addition, the operator can easily find out the details (pan position, tilt position, and zoom position) of a predetermined teaching point where the imaging apparatus 2 is taught in the series of operations taught to the robot apparatus 1.

Moreover, since the various driving units of the imaging apparatus 2 can be operated by a method similar to the operation method of the robot apparatus 1, the imaging point of view synchronized with the operation of the robot apparatus 1 can be taught without a need for complicated operations.

In the present exemplary embodiment, in operating the robot apparatus 1 and the imaging apparatus 2 by touch operations, the operation targets are distinguished by touching the model display section 140 in operating the robot apparatus 1 and touching the image display section 146 in operating the imaging apparatus 2. However, this is not restrictive.

For example, the image on the image display section 146 is analyzed and divided between an area where the robot apparatus 1 is captured and other areas. The operation targets then may be distinguished in such a manner that operating the robot apparatus 1 is performed when the area including the robot apparatus 1 is touched and operating the imaging apparatus 2 is performed when an area other than that of the robot apparatus is touched.

Different touch operations may be used to distinguish the operation targets. For example, the robot apparatus 1 is operated when a multi-touch is made with two fingers. The imaging apparatus 2 is operated when a single touch is made with a single finger. Alternatively, the imaging apparatus 2 may be operated by a multi-touch, and the robot apparatus 1 may be operated by a single touch.

A drag operation and a flick operation may be used to distinguish the operation targets. For example, the operation targets can be distinguished in such a manner that operating the robot apparatus 1 is performed when a drag operation is made and operating the imaging apparatus 2 is performed when a flick operation is made.

Furthermore, a single touch, a multi-touch, a drag operation, and a flick operation may be combined to distinguish the operation targets. For example, the robot apparatus 1 is operated when a drag operation is made with a multi-touch. The operator's operation mistakes and the like can be further reduced by setting a plurality of distinguishing methods.

The image display section 146 may include a pressure-sensitive touch panel so that a force value can be detected, and the operation targets may be distinguished based on the force value. For example, a threshold is set for the force value detected when a touch is made. The operation targets then can be distinguished in such a manner that operating the robot apparatus 1 is performed when a touch is made with a force value greater than or equal to the set threshold and operating the imaging apparatus 2 is performed when a touch is made with a force value less than the set threshold.

A setting button for setting which to operate among the robot apparatus 1 and the imaging apparatus 2 by a touch operation on the image display section 146 may be displayed on the image display section 146. For example, two operation setting buttons including one for making a setting to operate the robot apparatus 1 and one for making a setting to operate the imaging apparatus 2 are displayed. The operation targets can be distinguished by touching the buttons depending on the situation. Alternatively, a single operation switch button may be displayed, and the switching between the setting to operate the robot apparatus and the setting to operate the imaging apparatus may be implemented by touching the operation switch button each time.

In a case where the image display section 146 is touched to operate the robot apparatus 1 as described above, the robot apparatus 1 can be abruptly moved by a flick operation.

In such a case, the abrupt operation of the robot apparatus 1 can be avoided by making a setting to not accept a flick operation while the robot apparatus 1 is operated.

Moreover, the robot apparatus 1 may include an acceleration sensor, and an operation for stopping the robot apparatus 1 may be performed in a case where a predetermined value of acceleration is detected.

Fourth Exemplary Embodiment

Next, an example of a UI suitable in performing calibration operations and teaching operations on robot apparatuses and imaging apparatuses by using the external input device 130, using images from the imaging apparatuses displayed on the external input device 130 will be described as a fourth exemplary embodiment.

In the present exemplary embodiment, a description will be given of an example of a UI that enables the operator to operate the robot apparatuses in a coordinate system where the operator can easily perform teaching even when the operator operates a plurality of operation targets and performs teaching while observing images from the imaging apparatuses.

Differences from the foregoing exemplary embodiments in hardware and control system configurations will be illustrated and described below. Portions similar to those of the first exemplary embodiment shall have similar configurations and be capable of performing similar operations to the foregoing, and a detailed description thereof will be omitted.

Figure 11:
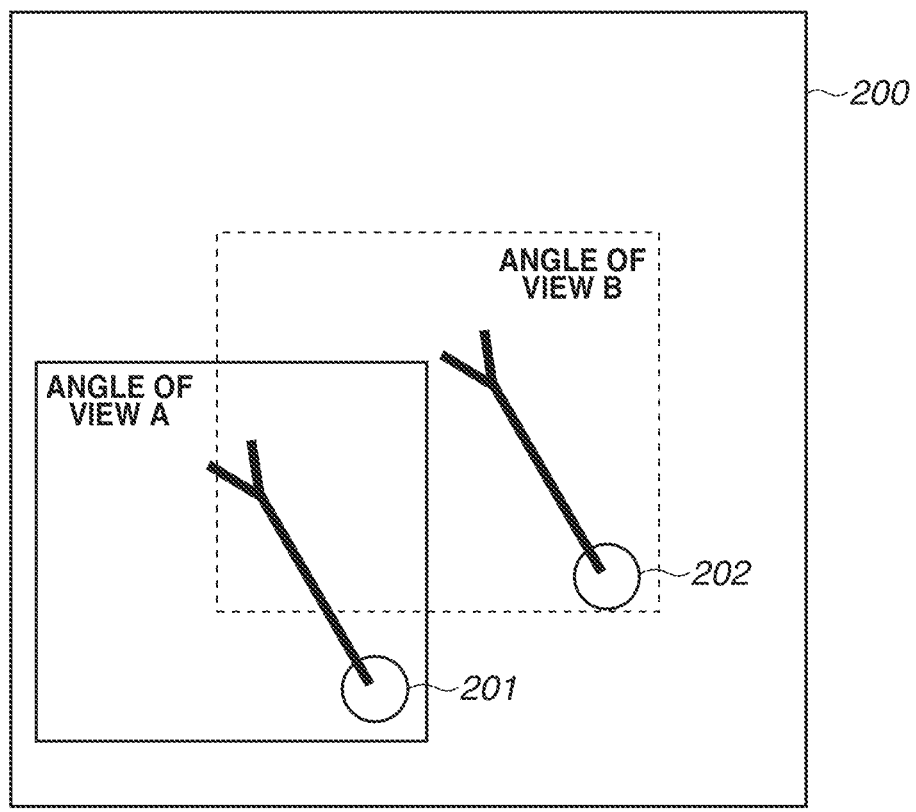
FIG. 11 is a diagram illustrating a robot system 2000 according to a fourth exemplary embodiment.

FIG. 11 is a top view schematically illustrating a robot system 2000 according to the present exemplary embodiment. In FIG. 11, robot apparatuses 201 and 202 are fixed to a base 200.

To monitor the robot apparatuses 201 and 202, the robot system 2000 includes imaging apparatuses A and B (not illustrated), the angles of view of which will be referred to as angles of view A and B, respectively. Like the foregoing exemplary embodiments, the imaging apparatuses A and B have pan and tilt functions.

Both the imaging apparatuses A and B are fixed to positions from which the robot apparatuses 201 and 202 can be monitored. For ease of understanding, the robot apparatuses 201 and 202 are simply represented by symbols.

The angles of view A and B in FIG. 11 are not necessarily rectangular, but illustrated by rectangles for ease of description.

Figure 12:
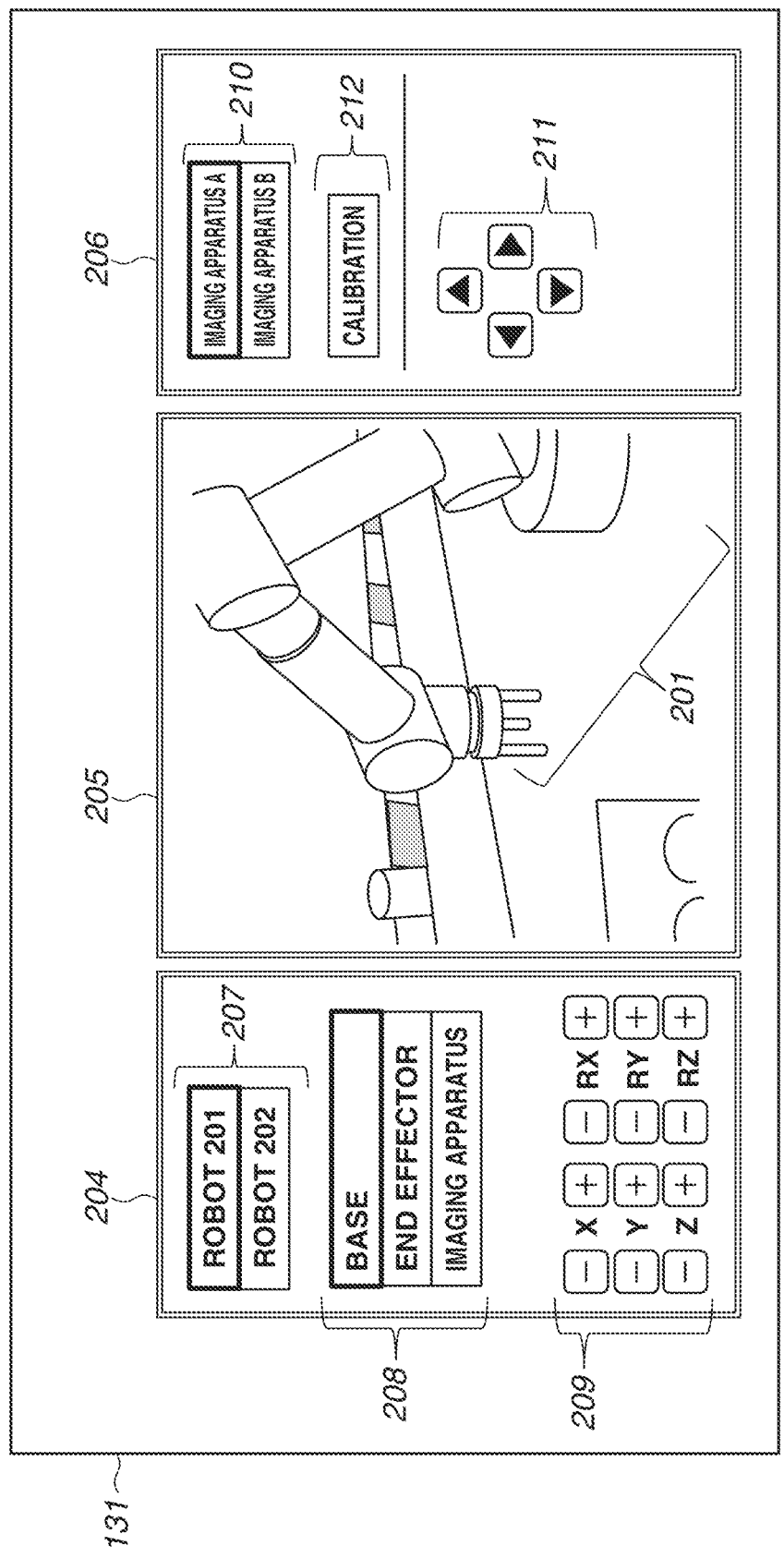
FIG. 12 is a diagram illustrating an external input device 130 according to a fourth exemplary embodiment.

FIG. 12 is a diagram illustrating the display unit 131 of the external input device 130 according to the present exemplary embodiment. In FIG. 12, the display unit 131 includes a robot apparatus operation section 204, an image display section 205, and an imaging operation section 206.

The robot apparatus operation section 204 includes robot apparatus switch buttons 207, coordinate system switch buttons 208, and end effector operation buttons 209.

The robot apparatus switch buttons 207 allows the operator to select a robot desired to manually operate. In the present exemplary embodiment, buttons "robot 201" and "robot 202" are displayed since the robot system 2000 includes the robot apparatuses 201 and 202.

The coordinate system switch buttons 208 can select a coordinate system to be used when the operator manually operates the robot apparatus selected by the robot apparatus switch buttons 207.

In the present exemplary embodiment, three types of buttons "base", "end effector", and "imaging apparatus" are displayed. This enables the operation in a base coordinate system, an end effector coordinate system, and an imaging coordinate system by a base coordinates system button, an end effector coordinate system button, and an imaging coordinate system button, respectively.

The base coordinate system refers to a coordinate system based on a robot base of the robot apparatus selected by the robot apparatus switch buttons 207. In other words, the base coordinate system is a world coordinate system of the entire robot apparatus.

The end effector coordinate system refers to a coordinate system based on the end effector of the robot apparatus selected by the robot apparatus switch buttons 207. In other words, the end effector coordinate system is a local coordinate system with respect to the base coordinate system that is the world coordinate system.

The imaging coordinate system refers to the coordinate system of an imaging apparatus selected by imaging apparatus switch buttons 210 to be described below.

The end effector operation buttons 209 enable manually operating the robot apparatus selected by the robot apparatus switch buttons 207 to make translational movements in X, Y, and Z directions and a rotational movement in the coordinate system set by the coordinate system switch buttons 208.

The image display section 205 displays an image from the imaging apparatus selected in the imaging operation section 206. In the case of FIG. 12, an image of the robot apparatus 201 captured by the imaging apparatus A is displayed.

The imaging operation section 206 includes the imaging apparatus switch buttons 210, point of view operation buttons 211, and a calibration button 212.

The imaging apparatus switch buttons 210 can select an imaging apparatus that the operator wants to use, and an image from the selected imaging apparatus is displayed on the image display section 205.

The point of view operation buttons 211 can make pan and tilt operations on the imaging apparatus selected by the operator using the imaging apparatus switch buttons 210. Like the foregoing first exemplary embodiment, zoom operation buttons for making zoom-in and zoom-out operations may further be provided.

The calibration button 212 can calibrate a relative position and orientation between the robot apparatus selected by the robot apparatus switch buttons 207 and the imaging apparatus selected by the imaging apparatus switch buttons 210, in a case where "imaging apparatus" is selected by the coordinate system switch buttons 208.

To operate a robot apparatus in an imaging coordinate system, the relative position and orientation between the robot apparatus and the imaging apparatus need to be known. The calibration button 212 therefore always needs to be pressed before the operation of the end effector operation buttons 209. A specific calibration method will be described below.

Next, an operation method in a robot apparatus coordinate system and an operation method in an imaging coordinate system will be described. An operation in a robot apparatus coordinate system can be made by selecting the robot apparatus to be operated by the robot apparatus switch buttons 207 and selecting "base" or "end effector" by the coordinate system switch buttons 208. Since such an operation is similar to a normal operation on a robot apparatus, details will be omitted.

To make an operation in an imaging coordinate system, a robot apparatus to be operated needs to be selected by the robot apparatus switch buttons 207, "imaging apparatus" needs to be selected by the coordinate system switch buttons 208, and a camera to be used needs to be selected by the imaging apparatus switch buttons 210. This, however, is not sufficient to make the operation possible.

As described above, the calibration button 212 needs to be pressed to perform calibration since the relative position and orientation between the robot apparatus and the imaging apparatus need to be known to operate the robot apparatus in the imaging coordinate system.

The significance of the calibration of the relative position and orientation between the robot apparatus and the imaging apparatus is based on that the positions of the robot apparatus and the imaging apparatus are adjusted on-site and do not necessarily agree with designed positions.

Figure 13:
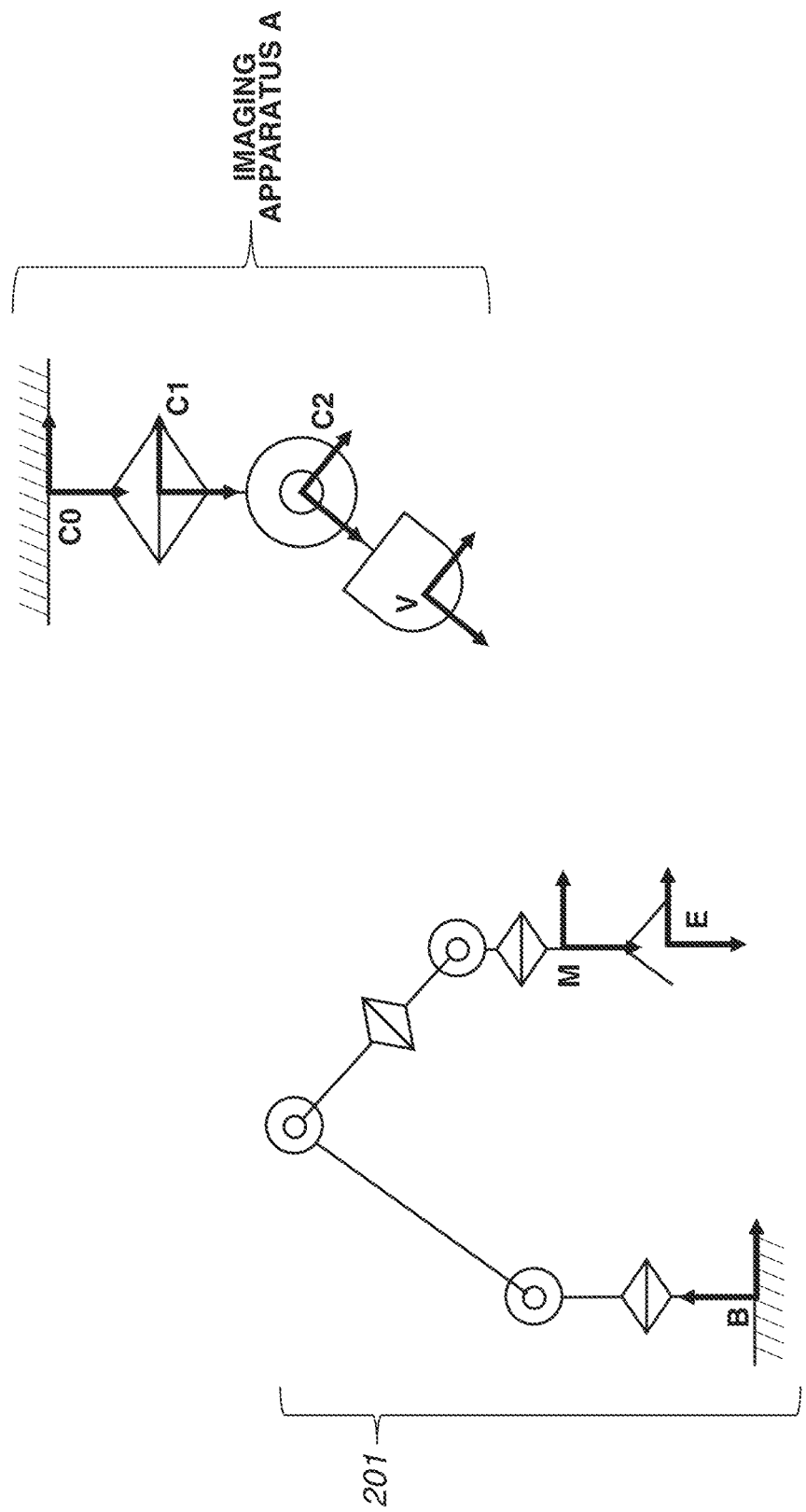
FIG. 13 is an explanatory diagram illustrating a relative orientation between an imaging apparatus A and a robot apparatus 201 according to the fourth exemplary embodiment.

A method for calibrating the relative position and orientation between a robot apparatus and an imaging apparatus according to the present exemplary embodiment will be described. FIG. 13 is a diagram illustrating the coordinate systems of a robot apparatus and an imaging apparatus according to the present exemplary embodiment.

In FIG. 13, for the sake of simplicity, a combination of the robot apparatus 201 and the imaging apparatus A will be described as an example. The points of origin of the base coordinate system, the end effector coordinate system, and a marker coordinate system of the robot apparatus 201 will be denoted by B, E, and M, respectively.

As employed herein, the marker coordinate system refers to a coordinate system set for a marker (not illustrated). The marker is attached to the robot apparatus 201 before calibration or all the time.

The position of the marker is measured by the imaging apparatus A. The marker may be one capable of position measurement with six degrees of freedom. Three or more markers indicating three degrees of freedom may be used.

The marker(s) do not/does not need to be attached to the end of the robot apparatus. Locating the marker(s) at the end of the robot apparatus is suitable because the position(s) and orientation(s) of the marker(s) can be moved to near the center of the angle of view.

Attaching different markers to the respective robot apparatuses is, though not necessarily needed, suitable because the robot apparatuses can be visually distinguished. The points of origin of an imaging apparatus base coordinate system, a pan joint coordinate system, a tilt joint coordinate system, and the imaging coordinate system of the imaging apparatus A will be denoted by C0, C1, C2, and V, respectively.

Before pressing the calibration button, the operator operates the robot apparatus 201 or the imaging apparatus A with the end effector operation buttons 209 or the point of view operation buttons 211, respectively, so that the marker(s) fall/falls within the angle of view.

In a case where three markers indicating three degrees of freedom are used, the three markers are separately located within the angle of view so that the three markers do not fall on the same straight line. This is needed to generate the marker coordinate system M with the three markers.

To express a relative position and orientation between coordinate systems, a 4×4 homogeneous transformation matrix is used. For example, a homogeneous transformation matrix $H_{BE}$ expressing the relative position and orientation of the end effector coordinate system E with respect to the base coordinate system B is expressed by the following equation:

$$H_{BE} = \begin{bmatrix} C_{BE} & r_{BE} \\ O_{1\times 3} & 1 \end{bmatrix} \qquad [\text{Eq. 1}]$$

Here, $C_{BE}$ is a 3×3 rotation matrix, $r_{BE}$ is a 3×1 position vector, and $O_{1\times 3}$ is a 1×3 zero matrix.

Now, a description will be given of a transformation of the amount of movement in the imaging coordinate system into the robot apparatus coordinate system. Assuming that the amount of movement in the imaging coordinate system is $\Delta H_V$, and its representation in the robot apparatus coordinate system is $\Delta H_R$, the following equation holds:

$$\Delta H_R = H_{BC0} H_{C0V} \Delta H_V \qquad [\text{Eq. 2}]$$

Here, $\Delta H_V$ is the amount of movement itself when the end effector operation buttons 209 are operated in the imaging coordinate system.

A relative position and orientation $H_{C0V}$ is the relative position and orientation from the imaging apparatus base coordinate system C0 to the imaging coordinate system V, and is expressed by the following equation:

$$H_{C0V} = H_{C0C1} H_{C1C2} H_{C2V} \qquad [\text{Eq. 3}]$$

$H_{C2V}$ is known because at which position the imaging apparatus is located in the imaging coordinate system is inherently defined for the imaging apparatus.

Assuming that a pan angle is $\theta_{C1}$, a tilt angle is $\theta_{C2}$, a rotation matrix about a z-axis is $\text{Rot}_z$, and a rotation matrix about a y-axis is $\text{Rot}_y$, $H_{C0C1}$ and $H_{C1C2}$ are expressed by the following equations:

$$\begin{cases} H_{C0C1} = \begin{bmatrix} C_{C0C1} & r_{C0C1} \\ O_{1\times 3} & 1 \end{bmatrix} = \begin{bmatrix} \text{Rot}_z(\theta_{C1}) & r_{C0C1} \\ O_{1\times 3} & 1 \end{bmatrix} \\ H_{C1C2} = \begin{bmatrix} C_{C1C2} & r_{C1C2} \\ O_{1\times 3} & 1 \end{bmatrix} = \begin{bmatrix} \text{Rot}_y(\theta_{C2}) & r_{C1C2} \\ O_{1\times 3} & 1 \end{bmatrix} \end{cases} \qquad [\text{Eqs. 4}]$$

$\theta_{C1}$ and $\theta_{C2}$ are known from the encoders implemented in the pan motor and the tilt motor included in the imaging apparatus. Position vectors $r_{C0C1}$ and $r_{C1C2}$ are known design values inherent to the imaging apparatus.

In other words, the relative position and orientation $H_{C0V}$ is known. If a relative position and orientation $H_{BC0}$ can be determined by calibration, the amount of movement $\Delta H_R$ in the robot apparatus coordinate system can thus be determined.

The amount of movement $\Delta H_R$ in the robot apparatus coordinate system is the amount of movement in the base coordinate system B, and can thus be reflected on the normal operation of the robot apparatus.

Now, a method for determining the relative position and orientation $H_{BC0}$ will be described. Initially, the operator measures the position(s) of the marker(s) by pressing the calibration button 212. From FIG. 13, the relative position and coordinate $H_{BC0}$ here is expressed by the following equation:

$$H_{BC0} = H_{BE} H_{EM} H_{MV} H_{VC0} = H_{BM} H_{MV} H_{VC0} \qquad [\text{Eq. 5}]$$

Here, the following equations hold:

$$H_{MV} = (H_{VM})^{-1} \qquad [\text{Eq. 6}]$$

$$H_{VC0} = (H_{C0V})^{-1} \qquad [\text{Eq. 7}]$$

The relative position and orientation $H_{BE}$ can be calculated from the values of the encoders implemented in the respective joints of the robot apparatus 201 when the image of the marker(s) is captured, and is therefore known. The relative position and orientation $H_{C0V}$ is known from Eq. 3.

The case where a marker capable of position measurement with six degrees of freedom is attached to the end of the robot apparatus 201 will initially be described. A relative position and orientation $H_{EM}$ is known since the marker can be attached to a position designed with respect to the end effector coordinate system E.

A relative position and orientation $H_{VM}$ can be determined by measuring the position of the marker with the imaging apparatus A, and is therefore known.

Since Eq. 5 includes only known variables as described above, the relative position and orientation $H_{BC0}$ to be determined can be calculated, and the calibration is completed.

Next, the case where three or more markers indicating three degrees of freedom are used will be described. Three marker positions in the robot apparatus coordinate system will be denoted by $r_{BM1}$, $r_{BM2}$, and $r_{BM3}$. The marker positions shall be clear from the design.

Here, a marker coordinate system is generated by using the three points. The condition is that the first point is the point of origin of the marker coordinate system, the second point is a point that determines the x-axis direction of the marker coordinate system, and the third point is an arbitrary point on the xy plane of the marker coordinate system. The three points are not located on the same straight line.

Initially, the relative position and orientation $H_{BM}$ of the marker coordinate system M seen from the robot apparatus coordinate system is determined.

$$H_{BM} = \begin{bmatrix} C_{BM} & r_{BM} \\ O_{1\times 3} & 1 \end{bmatrix} \qquad [\text{Eq. 8}]$$

Assuming that the first point is the point of origin of the marker coordinate system M, the second point is the point that determines the x-axis direction of the marker coordinate system, and the third point is an arbitrary point on the xy plane of the marker coordinate system, the following equations hold:

$$\begin{cases} r_{BM} = r_{BM1} \\ C_{BM} = [c_{BM1} \ c_{BM2} \ c_{BM3}] \end{cases} \qquad [\text{Eqs. 9}]$$

Here, $$\begin{cases} c_{BM1} = \dfrac{r_{BM2} - r_{BM1}}{\|r_{BM2} - r_{BM1}\|_2} \\ c_{BM2} = \tilde{c}_{BM3} c_{BM1} \\ c_{BM3} = \tilde{c}_{BM1} \dfrac{r_{BM3} - r_{BM1}}{\|r_{BM3} - r_{BM1}\|_2} \end{cases} \qquad [\text{Eqs. 10}]$$

The tilde (~) on top of a symbol applied here represents a 3×3 skew-symmetric matrix, which is expressed by the following equation:

$$\tilde{c}_{BM1} = \begin{bmatrix} 0 & -c_{BM1z} & c_{BM1y} \\ c_{BM1z} & 0 & -c_{BM1x} \\ -c_{BM1y} & c_{BM1x} & 0 \end{bmatrix} \quad [\text{Eq. 11}]$$

The relative position and orientation $H_{BM}$ can be determined from the foregoing.

The relative position and orientation $H_{VM}$ of the marker coordinate system seen from the imaging coordinate system can be similarly determined:

$$H_{VM} = \begin{bmatrix} C_{VM} & r_{VM} \\ O_{1\times 3} & 1 \end{bmatrix} \quad [\text{Eq. 12}]$$

$$\begin{cases} r_{VM} = r_{VM1} \\ C_{VM} = [c_{VM1} \ c_{VM2} \ c_{VM3}] \end{cases} \quad [\text{Eqs. 13}]$$

$$\begin{cases} c_{VM1} = \dfrac{r_{VM2} - r_{VM1}}{\|r_{VM2} - r_{VM1}\|_2} \\ c_{VM2} = \tilde{c}_{VM3} c_{VM1} \\ c_{VM3} = \tilde{c}_{VM1} \dfrac{r_{VM3} - r_{VM1}}{\|r_{VM3} - r_{VM1}\|_2} \end{cases} \quad [\text{Eqs. 14}]$$

Since Eq. 5 includes only known variables, the relative position and orientation $H_{BC0}$ to be determined can be calculated, and the calibration is completed. The robot apparatuses and the imaging apparatuses need to be calibrated for each combination.

As described above, the present exemplary embodiment includes the robot apparatuses 201 and 202 and the imaging apparatuses A and B, and there are four homogeneous transformation matrices $H_{BC0}$ to be calibrated.

Calibrating the homogeneous transformation matrix $H_{BC0}$ of each combination in advance enables the operation of a robot apparatus in the imaging coordinate system in a case where the robot apparatus or the imaging apparatus to be operated is switched.

The present exemplary embodiment includes the means for switching between operation in the imaging coordinate system and operation in the robot apparatus coordinate system. The teaching operator can thus operate a robot apparatus in a coordinate system where the teaching operator can easily perform teaching even in the presence of a plurality of imaging apparatuses and a plurality of robot apparatuses.

Fifth Exemplary Embodiment

Next, a description will be given of an example of a UI suitable in performing calibration operations and teaching operations on robot apparatuses and imaging apparatuses by using the external input device 130, using images from the imaging apparatuses displayed on the external input device 130, as a fifth exemplary embodiment.

In the foregoing fourth exemplary embodiment, the description is given of an example of a UI where the operator can switch a coordinate system serving as a reference to avoid confusion in operating a robot apparatus in a case where there are a plurality of robot apparatuses and a plurality of imaging apparatuses and there is a plurality of coordinate systems.

In the present exemplary embodiment, a description will be given of an example of a UI where when the captured image is inconsistent with the intuition of the operator operating the external input device due to change in the imaging unit of an imaging apparatus, like upside down, the image can be easily changed to match the intuition of the operator.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 14A:
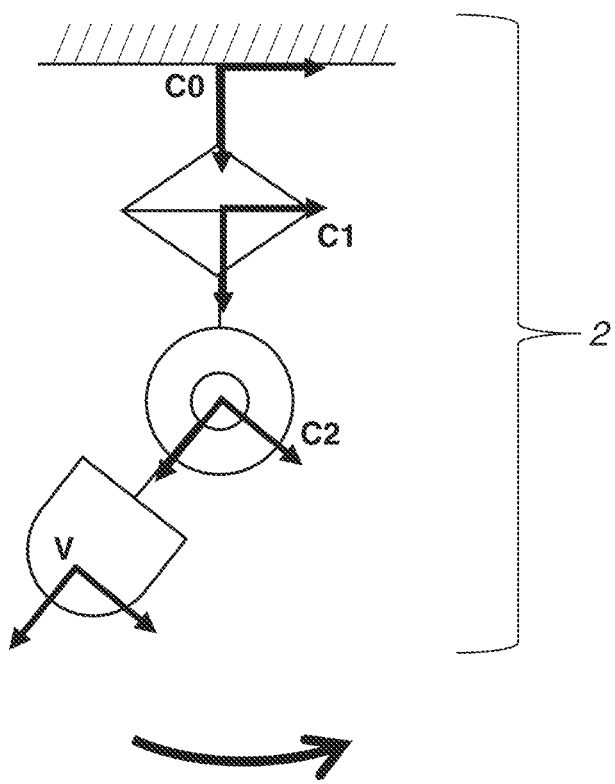
FIG. 14A is an explanatory diagram when an image from an imaging apparatus 2 according to a fifth exemplary embodiment is reversed upside down.
Figure 14B:
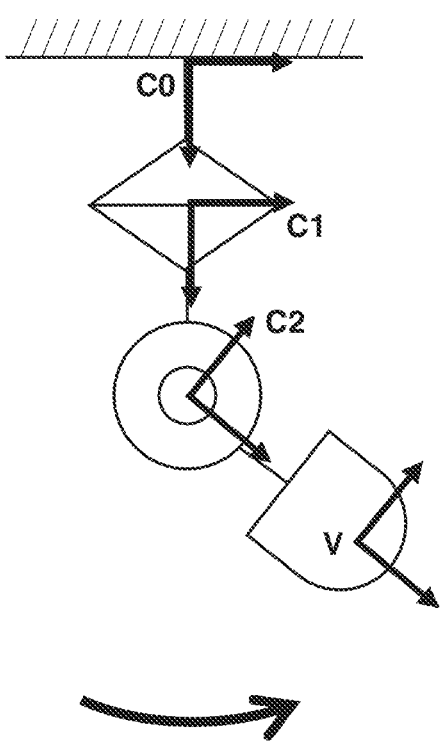
FIG. 14B is an explanatory diagram when an image from the imaging apparatus 2 according to the fifth exemplary embodiment is reversed upside down.

FIGS. 14A and 14B are side views schematically illustrating driving units of the imaging apparatus 2 according to the present exemplary embodiment. The points of origin of the imaging apparatus base coordinate system, the pan joint coordinate system, the tilt joint coordinate system, and the imaging coordinate system will be denoted by C0, C1, C2, and V, respectively.

The tilt angle will be denoted by $\theta_{C2}$. The tilt angle when the imaging apparatus 2 is directed directly below is expressed as $\theta_{C2} = 0$ deg.

FIG. 14A illustrates the imaging apparatus 2 at $\theta_{C2} = -45$ deg. FIG. 14B illustrates the imaging apparatus 2 at $\theta_{C2} = 45$ deg. In shifting from FIG. 14A to FIG. 14B, the image captured by the imaging apparatus 2 becomes upside down and inconsistent with the intuition of the operator who is operating based on the image on the external input device 130. In the present exemplary embodiment, a description will be given of an example of a UI where the operator can make an intuitive operation even in a case where the coordinate system in the image of the imaging apparatus 2 becomes upside down.

Figure 15:
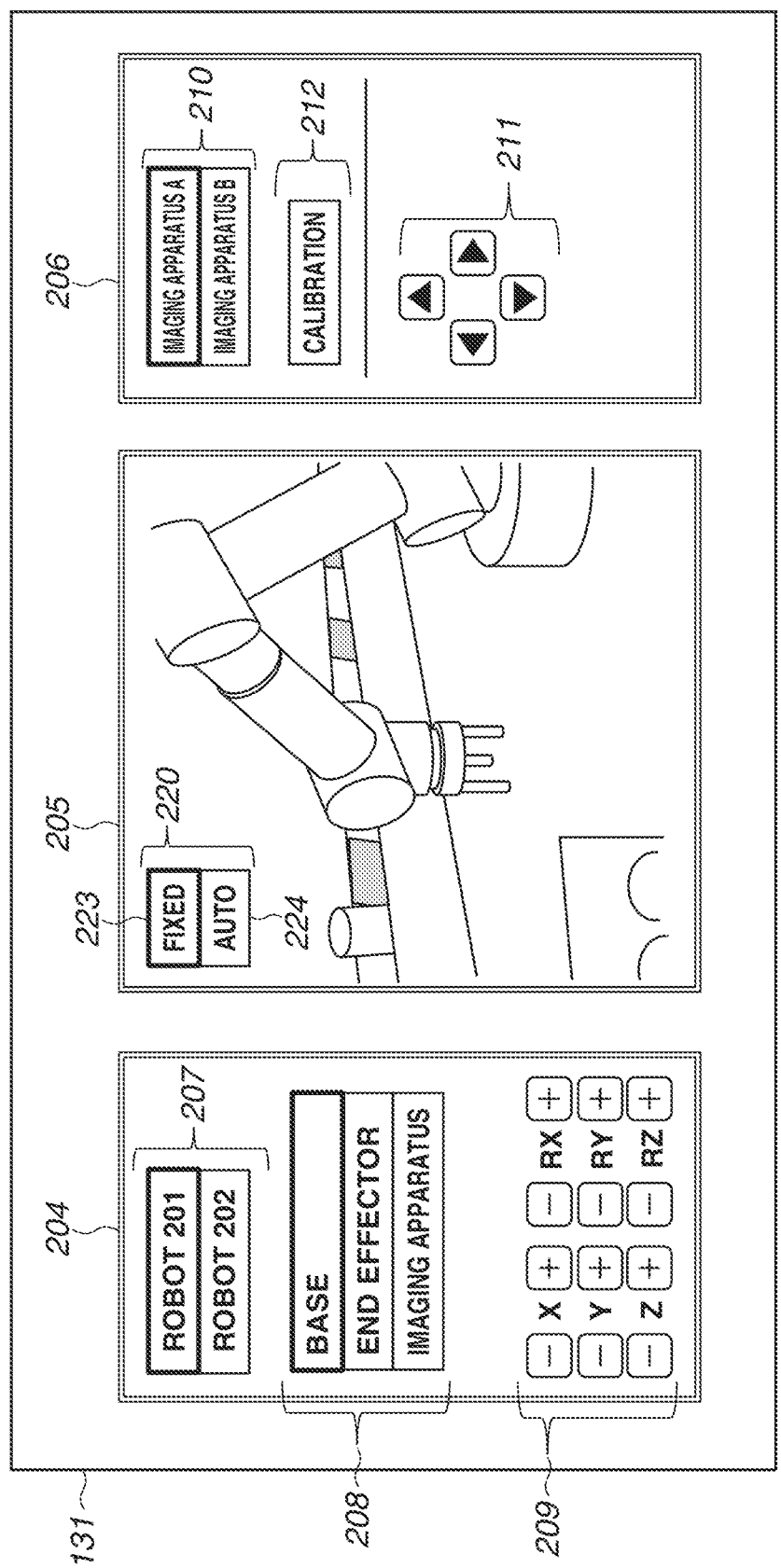
FIG. 15 is a diagram illustrating an external input device 130 according to the fifth exemplary embodiment.

FIG. 15 is a diagram illustrating the display unit 131 of the external input device 130 according to the present exemplary embodiment. Since the robot apparatus operation section 204 and the imaging operation section 206 are similar to those in the foregoing fourth exemplary embodiments, a description thereof will be omitted.

The image display section 205 according to the present exemplary embodiment includes the image captured by the imaging apparatus 2 and vertical flip switch buttons 220.

The vertical flip switch buttons 220 include a fixed button 223 and an auto button 224 for selecting vertical flip functions "fix" and "auto". A vertical flip method will be described in detail below.

Figure 16A:
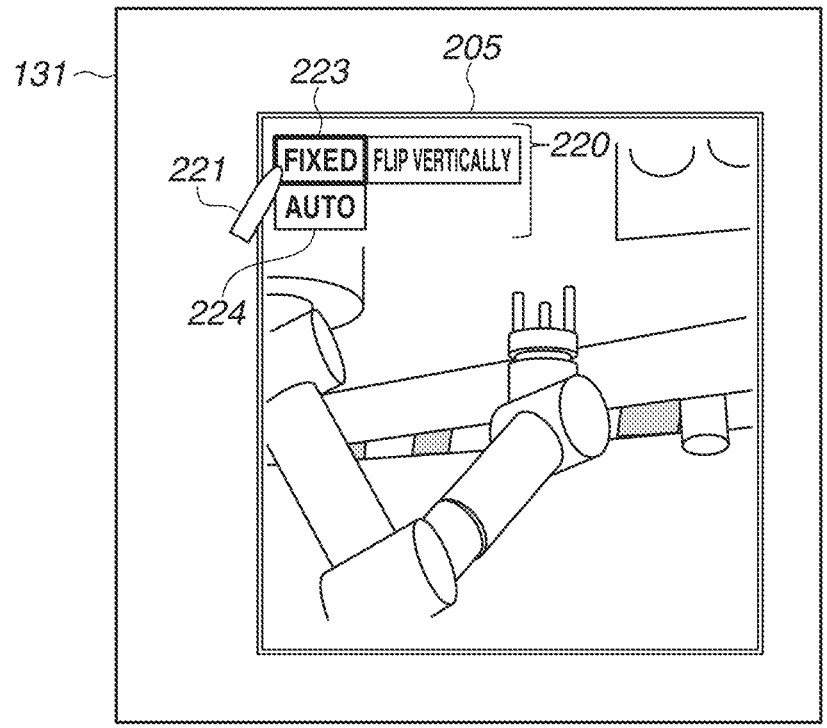
FIG. 16A is a diagram illustrating a case of when an image display section 205 according to the fifth exemplary embodiment has an upside down image.
Figure 16B:
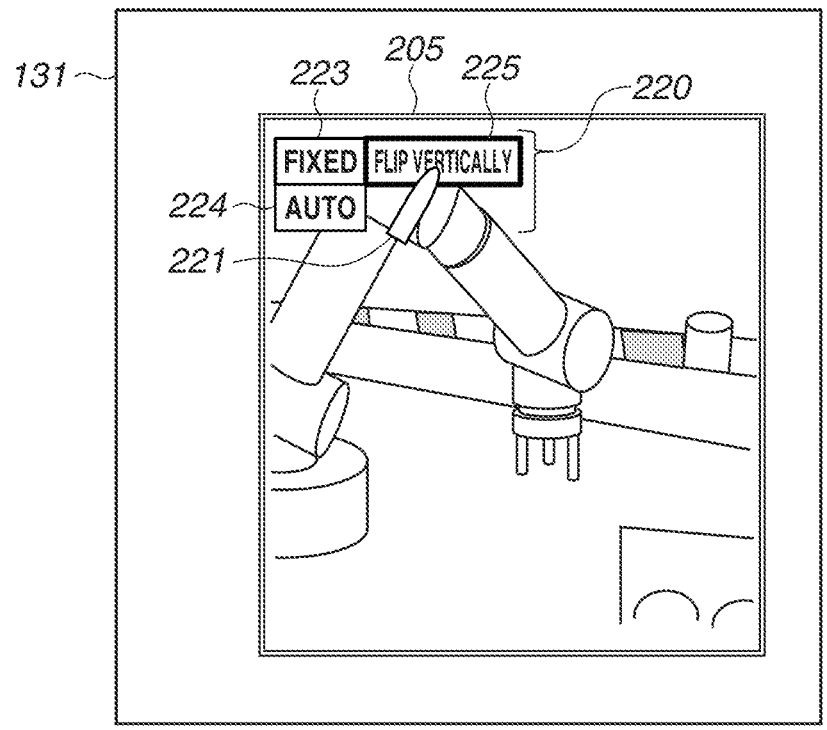
FIG. 16B is a diagram illustrating a case of when the image display section 205 according to the fifth exemplary embodiment has an upside down image.

FIGS. 16A and 16B are diagrams illustrating the image display section 205 in vertically flipping the screen of the image display section 205 by the operator's button operation according to the present exemplary embodiment. In FIGS. 16A and 16B, the robot apparatus operation section 204 and the imaging operation section 206 are omitted for simplification of description.

FIG. 16A illustrates a state where the coordinate system in the image captured by the imaging apparatus 2 is upside down and an image inconsistent with the operator's intuition is displayed on the image display section 205.

The operator touches the "fixed" button 223 of the vertical flip switch buttons 220 with his/her own finger 221. A vertical flip button 225 is then displayed on the right of the "fixed" button 223 in the diagram.

In FIG. 16B, to press the vertical flip button 225 which is displayed, the operator moves his/her own finger 221 to above the vertical flip button 225 and touches the vertical flip button 225.

The image on the image display section 205 is thus vertically flipped. By such a method, the image on the image display section 205 can easily be vertically flipped to match the operator's intuition.

Figure 17A:
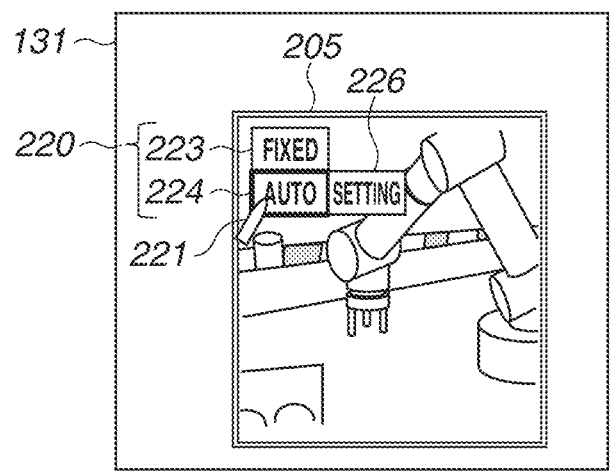
FIG. 17A is an explanatory diagram illustrating a case of when automatic vertical image flipping of the image display section 205 according to the fifth exemplary embodiment is performed.
Figure 17B:
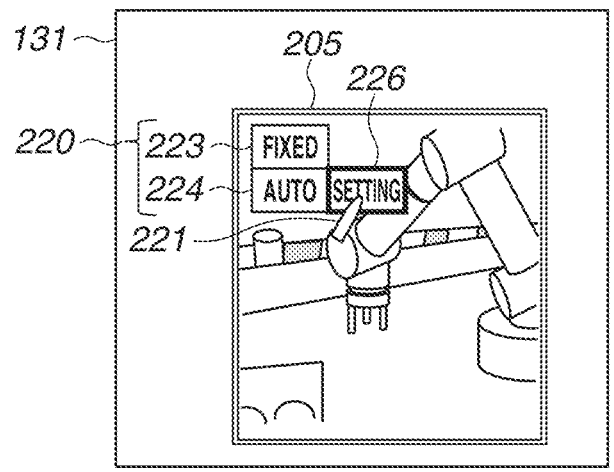
FIG. 17B is an explanatory diagram illustrating a case of when automatic vertical image flipping of the image display section 205 according to the fifth exemplary embodiment is performed.
Figure 17C:
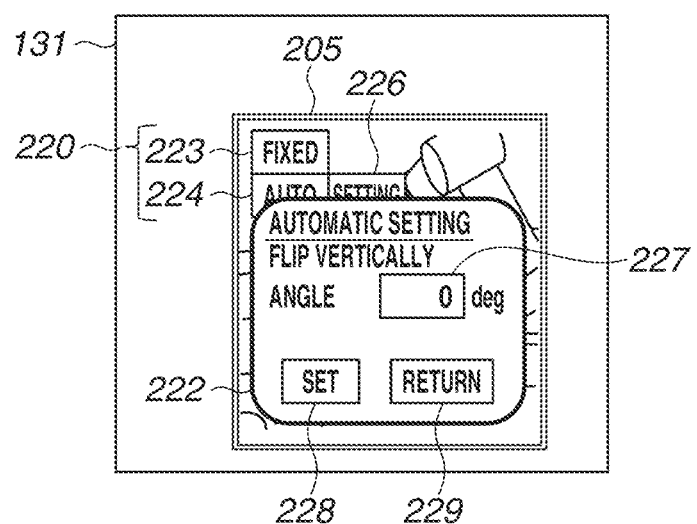
FIG. 17C is an explanatory diagram illustrating a case of when automatic vertical image flipping of the image display section 205 according to the fifth exemplary embodiment is performed.

Next, a method for automatically vertically flipping the image on the image display section 205 will be described. FIGS. 17A to 17C are diagrams for describing a setting method in automatically vertically flipping the image on the image display section 205 according to the present exemplary embodiment. Like FIGS. 16A and 16B, the robot apparatus operation section 204 and the imaging operation section 206 are omitted for simplification of description.

FIG. 17A is a diagram illustrating a state where the operator touches the auto button 224 with his/her own finger 221. FIG. 17B is a diagram illustrating a state where the operator touches a setting button 226 to be described below with his/her own finger 221. FIG. 17C is a diagram illustrating a state where an automatic setting section 222 to be described below is displayed on the image display section 205.

In FIG. 17A, to automatically vertically flip the image on the image display section 205, the operator touches and selects the "auto" button 224 of the vertical flip switch buttons 220 with his/her own finger 221.

However, in what case the image on the image display section 205 is automatically vertically flipped needs to be set in advance.

In the present exemplary embodiment, whether to vertically flip the image on the image display section 205 is thus determined based on the tilt angle $\theta_{C2}$. More specifically, in a case where the tilt angle detected from the tilt motor included in the imaging apparatus 2 is less than or equal to the value of a tilt angle set in advance, the image on the image display section 205 is displayed without change.

Meanwhile, in a case where the tilt angle detected from the tilt motor included in the imaging apparatus 2 is greater than the tilt angle set in advance, the image on the image display section 205 is vertically flipped and displayed. The setting method will be described in detail below. The foregoing angle of the tilt motor is detected by a not-illustrated encoder.

In FIG. 17A, the operator touches and selects the "auto" button 224 of the vertical flip switch buttons 220 with his/her own finger 221. The "setting" button 226 is thus displayed on the right of the auto button 224 in the diagram.

Next, in FIG. 17B, to press the setting button 226 which is displayed, the operator moves his/her own finger 221 to above the setting button 226 and touches the setting button 226. The automatic setting section 222 for vertical flip switching is thus displayed on the image display section 205 (FIG. 17C).

In FIG. 17C, the operator inputs a tilt angle to be set into a vertical flip angle input box 227. In the present exemplary embodiment, 0 deg is input.

In a case where the operator wants to set the input value of the tilt angle, the operator touches a set button 228. In a case where the operator wants to cancel the input, the operator touches a return button 229.

In a case where the encoder of the tilt motor detects the set value of the tilt angle while the operator is viewing the image captured by the imaging apparatus 2 and teaching the robot apparatus 1, the image on the image display section 205 is flipped.

By the above-described method, the image on the image display section 205 can easily be automatically vertically flipped to match the operator's intuition.

Next, a method for rotating the image on the image display section 205 by multi-touching the image display section 205 will be described. This method is used, for example, in a case where the operator wants to rotate the image by 90 deg, i.e., not necessarily vertically flip the image (by 180 deg).

FIG. 18 are diagrams illustrating the image display section 205 in a case where the image on the image display section 205 is rotated by a multi-touch operation. Like FIGS. 16A and 16B and FIGS. 17A to 17C, the robot apparatus operation section 204 and the imaging operation section 206 are omitted for simplification of description.

Figure 18A:
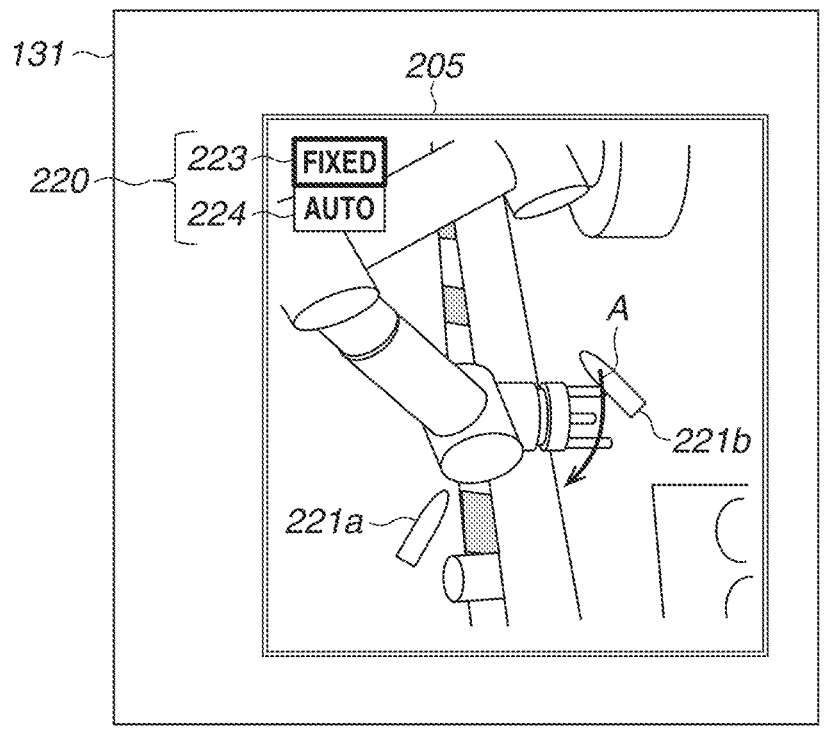
FIG. 18A is an explanatory diagram illustrating a case of when image rotating of the image display section 205 according to the fifth exemplary embodiment is performed by a multi-touch.
Figure 18B:
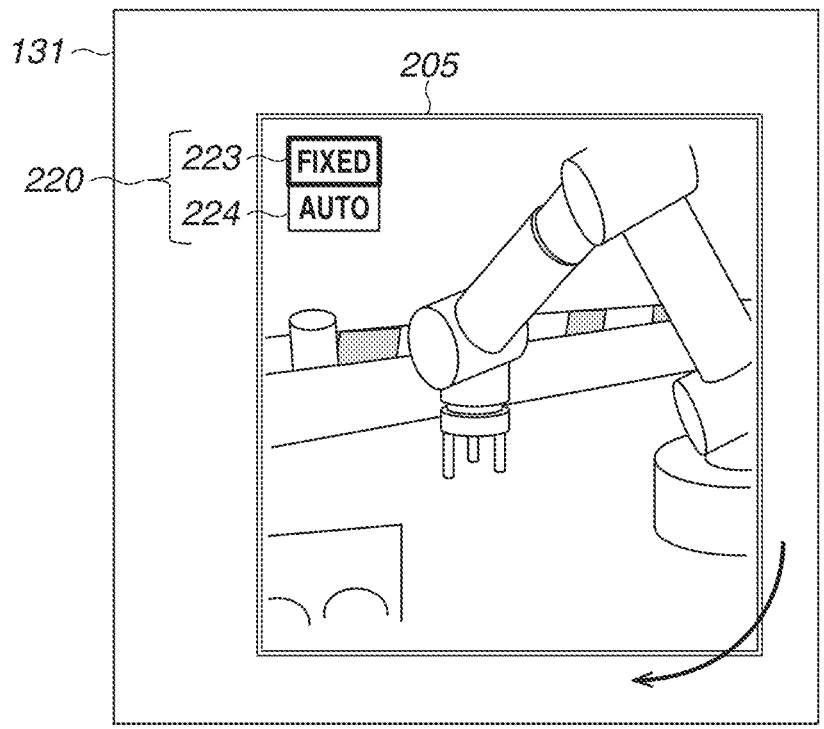
FIG. 18B is an explanatory diagram illustrating a case of when image rotating of the image display section 205 according to the fifth exemplary embodiment is performed by a multi-touch.

FIG. 18A is a diagram illustrating the image display section 205 before the rotation by the multi-touch operation. FIG. 18B is a diagram illustrating the image display section 205 rotated by the multi-touch operation.

In FIG. 18A, the operator touches and selects the fixed button 223 of the vertical flip switch buttons 220 with his/her own finger 221 in advance.

Next, the operator touches an arbitrary position other than the buttons on the image display section 205 with a finger 221a for setting a rotation center.

The operator then touches an arbitrary position on the image display section 205 with a finger 221b for determining an intended direction of rotation, and slides the finger 221b in the direction of rotation. In FIG. 18A, the finger 221b is rotated in the direction of the arrow A.

In a case where an angle of a locus (arrow A) traced by the finger 221b with the position touched with the finger 221a at the rotation center exceeds a threshold, the image display section 205 rotates 90 degrees in that direction (FIG. 18B).

The foregoing threshold is suitably 15 degrees or so. By such a method, the image on the image display section 205 can easily be manually rotated to match the operator's intuition.

As described above, in the present exemplary embodiment, even in a case where the direction of the imaging unit of the imaging apparatus 2 has changed and thus the coordinate system in the image becomes inconsistent with the intuition of the operator operating the external input device, like upside down, the image can easily be changed to match the operator's intuition. This provides the effect that the robot apparatus 1 and the imaging apparatus 2 can be operated in a coordinate system easily understandable to the operator.

Sixth Exemplary Embodiment

Next, an example of a UI suitable in performing calibration operations and teaching operations on robot apparatuses and imaging apparatuses by using the external input device 130, using images from the imaging apparatuses displayed on the external input device 130 will be described as a sixth exemplary embodiment.

In the present exemplary embodiment, a description will be given of an example of a UI where the coordinate system of an imaging apparatus can be changed to one where the operator can easily make operations, based on the operation processes of a robot apparatus.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 19A:
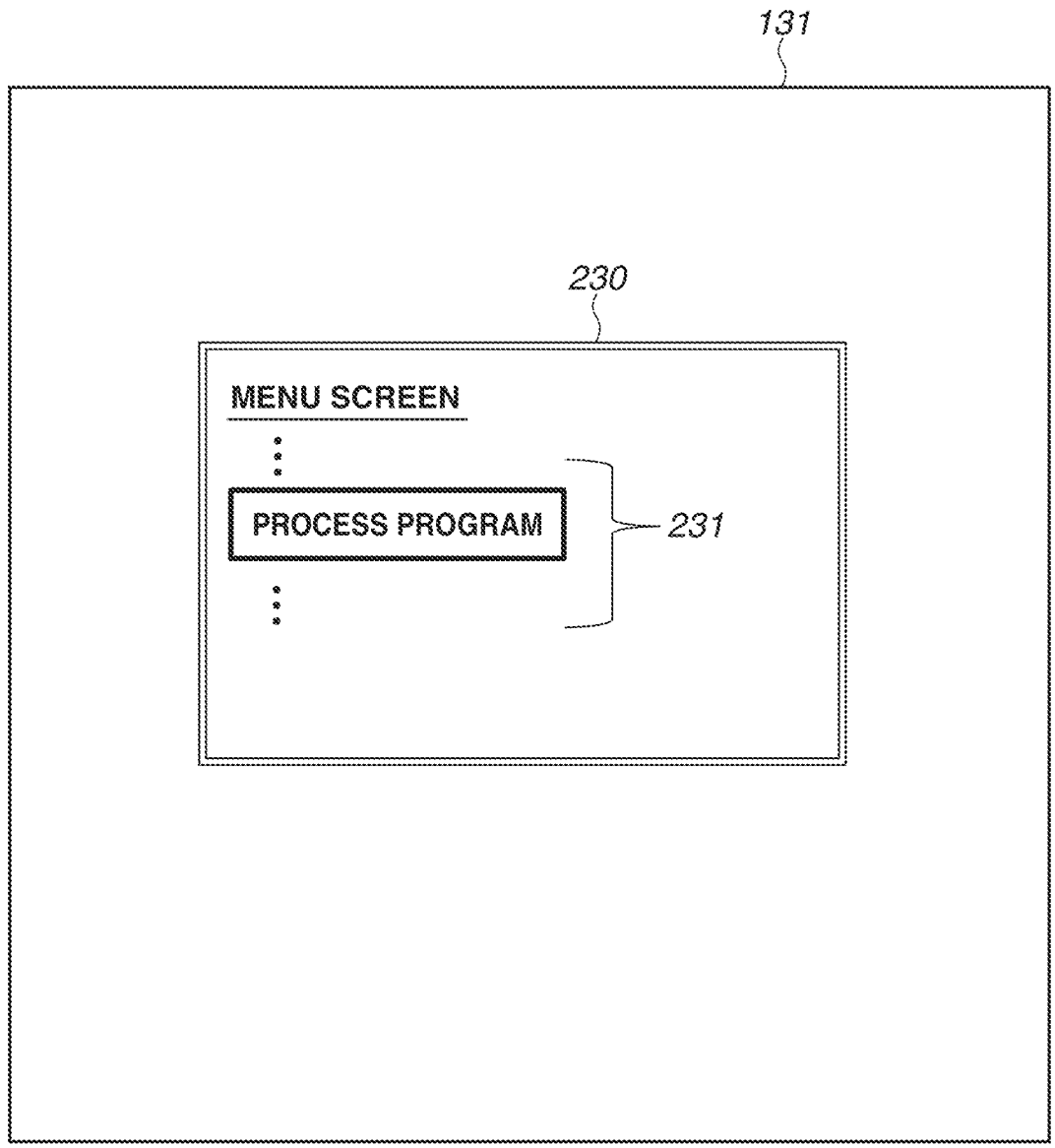
FIG. 19A is a diagram illustrating an external input device 130 according to a sixth exemplary embodiment.
Figure 19B:
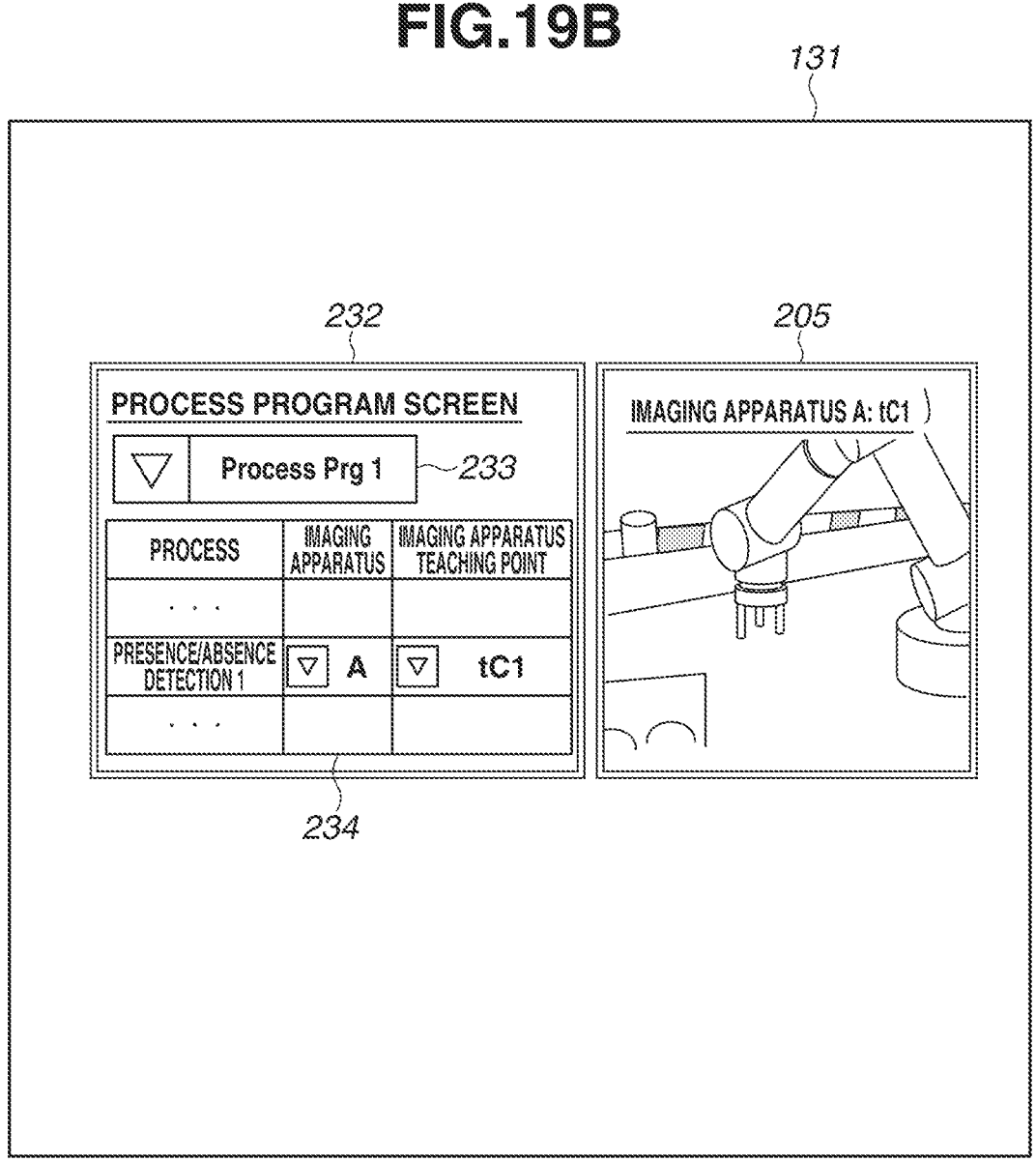
FIG. 19B is a diagram illustrating the external input device 130 according to the sixth exemplary embodiment.

FIGS. 19A and 19B are diagrams illustrating the display unit 131 of the external input device 130 in a case where a "process program" for the operation by the robot apparatus 1 according to the present exemplary embodiment is displayed. FIG. 19A is a diagram where a menu screen section 230 according to the present exemplary embodiment is displayed. FIG. 19B is a diagram where a process program screen according to the present exemplary embodiment is displayed.

In FIG. 19A, the menu screen section 230 displays function selection buttons 231. There are as many function selection buttons 231 as the number of functions of the robot system 2000. The functions are assigned to the respective buttons, and the menus of the corresponding functions can be opened by pressing the respective buttons. In the present exemplary embodiment, "process program" is selected to transition to the screen illustrated in FIG. 19B.

In FIG. 19B, the display unit 131 displays a process program screen section 232 and the image display section 205.

The process program screen section 232 includes a process program selection button 233 and an imaging apparatus teaching point selection field 234.

The process program selection button 233 allows the operator to select processes to be performed in the robot system 2000. In a case where the process program selection button 233 is pressed, a list of process programs is displayed as a pull-down list to enable user selection. In the present exemplary embodiment, a description will be given of a case where "Process Prg 1" is selected.

The imaging apparatus teaching point selection field 234 displays the details of the processes of the process program selected by the process program selection button 233. Examples of the details of a process include "robot arm operation", "robot hand cramping", and "presence/absence detection".

In the imaging apparatus teaching point selection field 234, an imaging apparatus to capture the image to be displayed on the image display section 205 and a teaching point corresponding to the imaging apparatus can be selected for each process.

The robot system 2000 includes a plurality of imaging apparatuses. In the present exemplary embodiment, the imaging apparatus name of the imaging apparatus A or the imaging apparatus B can be selected from a pull-down list by pressing the inverted triangle in the imaging apparatus column of the imaging apparatus teaching point selection field 234.

The pan and tilt angles and the zoom positions of each imaging apparatus, set by the method described in the third exemplary embodiment, are stored as data on the teaching points of each imaging apparatus. A teaching point of the imaging apparatus can be selected from a pull-down list by pressing the inverted triangle in the imaging apparatus teaching point column. In the present exemplary embodiment, the imaging apparatus A and an imaging apparatus teaching point tC1 are selected for the process of presence/absence detection 1.

The image display section 205 displays the image captured by the imaging apparatus at the imaging apparatus teaching point which have been selected immediately before in the imaging apparatus teaching point selection field 234. The names of the imaging apparatus and the imaging apparatus teaching point selected are also displayed. In the present exemplary embodiment, "IMAGING APPARATUS A:tC1" is displayed.

By selecting the imaging apparatus teaching point, the coordinate system of the imaging apparatus to be displayed can be uniquely determined based on the process.

In such a manner, a predetermined process program is selected in the process program selection button 233, and appropriate imaging apparatuses and imaging apparatus teaching points are set for the respective processes. This enables switching to the set imaging apparatuses and the imaging apparatus teaching points for display on the image display section 205 in performing the respective processes.

Operations can thus be made in a coordinate system where the operations are easy to understand, by changing the image of the imaging apparatus and the coordinate system displayed on the image display section 205, based on the operation processes of the robot system.

Seventh Exemplary Embodiment

Next, an example of a UI suitable in performing calibration operations and teaching operations on a robot apparatus and imaging apparatuses by the external input device 130 using images from the imaging apparatuses displayed on the external input device 130 will be described as a seventh exemplary embodiment.

In the present exemplary embodiment, a description will be given of an example of a UI where, in a case where there is a plurality of imaging apparatuses installed, the imaging apparatus to capture the image to be displayed on the external input device 130 can be automatically switched to display an image easily understandable to the operator.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 20A:
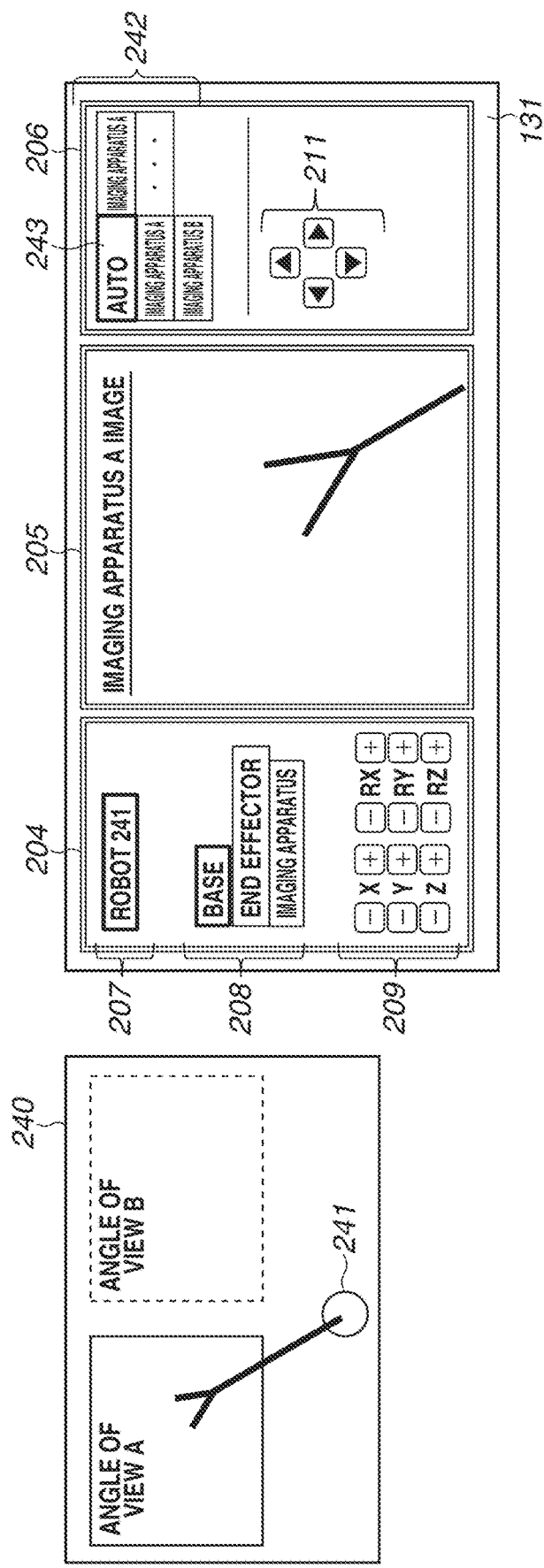
FIG. 20A is a diagram illustrating an external input device 130 according to a seventh exemplary embodiment.

FIGS. 20A and 20B are diagrams for describing a difference between screens displayed on the display unit 131 of the external input device 130, depending on a difference in the orientation of a robot apparatus 241 according to the present exemplary embodiment.

FIG. 20A is a diagram illustrating a top view of the robot apparatus 241 according to the present exemplary embodiment and the screen of the display unit 131 in a case where the tip of the robot apparatus 241 falls within an angle of view A. The left diagram of FIG. 20A is the top view of the robot apparatus 241 according to the present exemplary embodiment in the case where the tip of the robot apparatus 241 falls within the angle of view A.

FIG. 20B is a diagram illustrating a top view of the robot apparatus 241 according to the present exemplary embodiment and the screen of the display unit 131 in a case where the tip of the robot apparatus 241 falls within an angle of view B. The left diagram of FIG. 20B is the top view of the robot apparatus 241 according to the present exemplary embodiment in the case where the tip of the robot apparatus 241 falls within the angle of view B.

In the left diagram of FIG. 20A, the robot apparatus 241 is fixed to a base 240. To monitor the base 240, imaging apparatuses A and B are located near the robot apparatus 241. The angles of view captured by the respective imaging apparatuses A and B are referred to as the angles of view A and B. For simplification of description, the robot apparatus 241 is illustrated in a simplified form.

The right diagram of FIG. 20A is a diagram illustrating the display unit 131 of the external input device 130 in the case where the tip of the robot apparatus 241 according to the present exemplary embodiment falls within the angle of view A.

The display unit 131 includes the robot apparatus operation section 204, the image display section 205, and the imaging operation section 206.

Like the fourth exemplary embodiment, the robot apparatus operation section 204 includes the robot apparatus switch button 207, the coordinate system switch buttons 208, and the end effector operation buttons 209.

The image display section 205 displays the name of the imaging apparatus selected in the imaging operation section 206 and the image captured by the selected imaging apparatus. In the case of the right diagram of FIG. 20A, the image from the imaging apparatus A is displayed.

The imaging operation section 206 includes imaging apparatus switch buttons 242 and point of view operation buttons 211. The point of view operation buttons are similar to those in the fourth exemplary embodiment.

The imaging apparatus switch buttons 242 according to the present exemplary embodiment allows the operator to select which imaging apparatus to capture an image from among the plurality of imaging apparatuses installed.

To automatically switch the imaging apparatuses, based on the orientation of the robot apparatus 241, an "auto" button 243 is selected. In a case where the "auto" button 243 is selected, imaging apparatuses automatically selected by the control apparatus 13 are listed on the right of the "auto" button 243 in the diagram, and the image of the first imaging apparatus candidate is displayed on the image display section 205. In the present exemplary embodiment, "IMAGING APPARATUS A" is displayed on the right of the "auto" button 243.

Next, the left diagram of FIG. 20B illustrates a case where the tip of the robot apparatus 241 falls within the angle of view B, not within the angle of view A.

In the right diagram of FIG. 20B, the image display section 205 displays the image from the imaging apparatus B. "IMAGING APPARATUS B" is displayed on the right of the auto button 243.

Next, a method for automatically switching imaging apparatuses will be described. In a case where the "auto" button 243 of the imaging apparatus switch buttons 242 is touched by the teaching operator, the imaging apparatus to capture the image to be displayed on the image display section 205 is automatically switched.

Initially, whether the robot apparatus 241 is included in any of the captured images from all the imaging apparatuses installed is determined by image recognition.

The imaging apparatuses of which the captured images include the robot apparatus 241 are listed on the right of the auto button 243. In a case where there is a plurality of candidates, the imaging apparatuses are selected in numerical order of the imaging apparatuses, in alphabetical order of the names of the imaging apparatuses, or in descending order of the areas of the robot apparatus 241 captured in the angles of view, and listed on the right of the auto button 243.

The areas of the robot apparatus 241 captured in the images may be directly measured by image recognition. In a case where the position and orientation relationships between the robot apparatus and the imaging apparatuses have been calibrated as described in the fourth exemplary embodiment, the areas of the robot apparatus 241 may be calculated from calculated angles of view.

As a result, the operator can immediately select an imaging apparatus capturing an image of the portion to be taught (here, the tip of the robot apparatus 241) from among the plurality of imaging apparatuses, and switch the image of the image display section 205 to an appropriate one.

Consequently, even in a case where there is a plurality of imaging apparatuses installed, the operator can make operations by using an imaging apparatus and a coordinate system with which the operator can easily perform teaching.

Eighth Exemplary Embodiment

Next, an example of a UI suitable in managing a robot apparatus and an operator by using the external input device 130, using images from imaging apparatuses displayed on the external input device 130 will be described as an eighth exemplary embodiment.

In the present exemplary embodiment, a description will be given of an example of a UI where the imaging apparatuses are used to measure operation times of the operator and the robot apparatus of which images are captured by the imaging apparatuses and display the operation times on the external input device 130 so that the management of the operator and the robot apparatus can be facilitated.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 21:
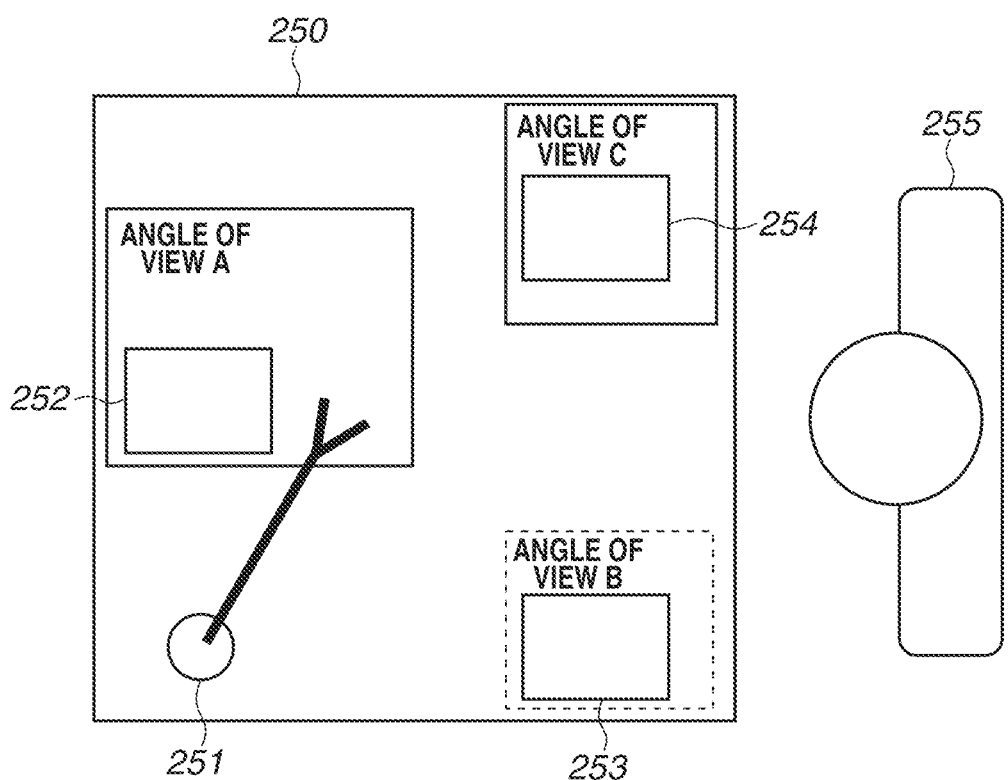
FIG. 21 is a diagram illustrating a robot system 2000 according to an eighth exemplary embodiment.

FIG. 21 is a diagram illustrating a top view of a robot system 2000 according to the present exemplary embodiment. In FIG. 21, a robot apparatus 251 and work storage areas 252, 253, and 254 are fixed onto a base 250.

The robot system 2000 according to the present exemplary embodiment also includes not-illustrated imaging apparatuses A, B, and C to detect whether a work is placed on the work storage areas 252, 253, and 254. The angles of view of the imaging apparatuses A, B, and C will be referred to as angles of view A, B, and C, respectively.

The work storage area 252 in the angle of view A is where a work is placed by the robot apparatus 251. The work storage area 253 in the angle of view B is where a work is placed by the robot apparatus 251 or an operator 255. The work storage area 254 in the angle of view C is where a work is placed by the operator 255.

The operator 255 is an operator who works in collaboration with the robot apparatus 251. For simplification of description, the robot apparatus 251 is illustrated in a simplified form.

Figure 22A:
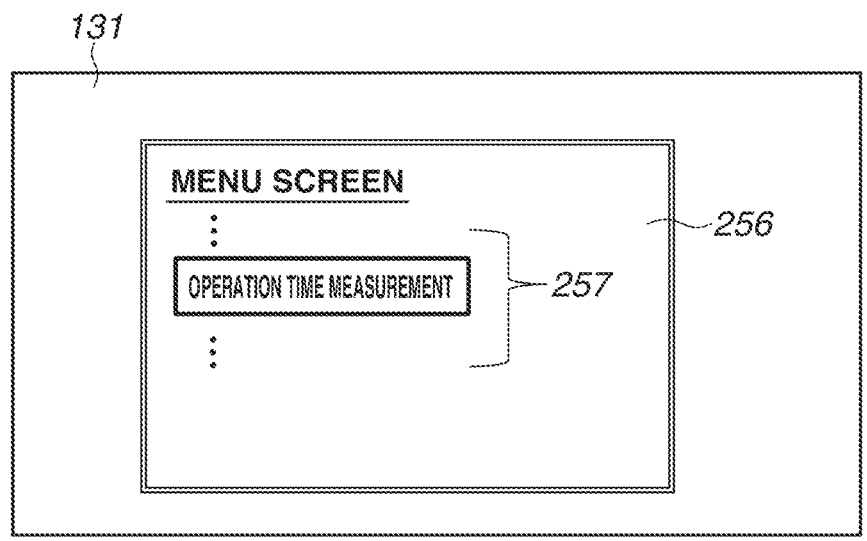
FIG. 22A is a diagram illustrating an external input device 130 according to the eighth exemplary embodiment.
Figure 22B:
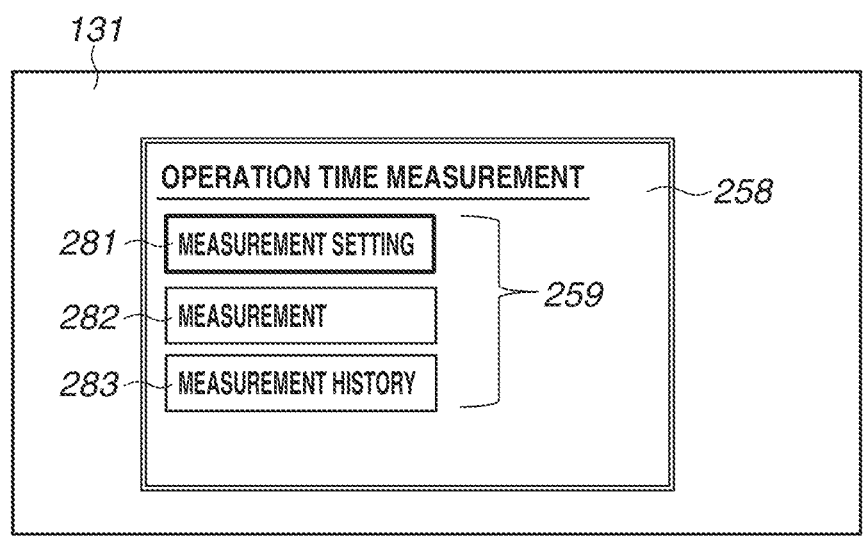
FIG. 22B is a diagram illustrating the external input device 130 according to the eighth exemplary embodiment.
Figure 22C:
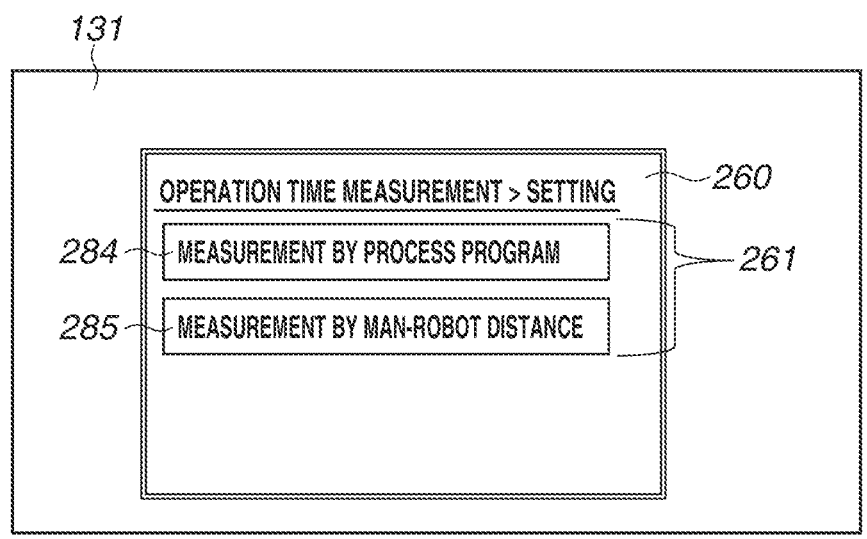
FIG. 22C is a diagram illustrating the external input device 130 according to the eighth exemplary embodiment.

FIGS. 22A to 22C illustrate configuration diagrams of display screens of the display unit 131 of the external input device 130 according to the present exemplary embodiment. FIG. 22A is a diagram where a menu screen section 256 according to the present exemplary embodiment is displayed. FIG. 22B is a diagram where an operation time measurement screen according to the present exemplary embodiment is displayed on the display unit 131. FIG. 22C is a diagram where an operation time measurement setting screen according to the present exemplary embodiment is displayed on the display unit 131.

In FIG. 22A, the menu screen section 256 according to the present exemplary embodiment displays function selection buttons 257.

There are as many function selection buttons 257 as the number of functions of the robot system 2000. The functions are assigned to the respective function selection buttons 257, and the menus of the corresponding functions can be opened by touching the respective buttons. In the present exemplary embodiment, "operation time measurement" is selected to transition to the screen shown in FIG. 22B.

In FIG. 22B, the display unit 131 displays an operation time measurement screen section 258. The operation time measurement screen section 258 includes operation time measurement selection buttons 259. The operation time measurement selection buttons 259 include a measurement setting button 281, a measurement button 282, and a measurement history button 283.

In the present exemplary embodiment, in a case where the measurement setting button 281 is touched, the screen transitions to that of FIG. 22C. The cases where the measurement button 282 and the measurement history button 283 are touched will also be described below.

In FIG. 22C, the display unit 131 displays an operation time measurement setting screen section 260. The operation time measurement setting screen section 260 includes operation time measurement setting selection buttons 261.

The operation time measurement setting selection buttons 261 includes a "measurement by process program" button 284 and a "measurement by man-robot distance" button 285.

In a case where the "measurement by process program" button 284 is touched, the screen transitions to a setting screen 262 for measurement based on a process program illustrated in FIG. 23. In a case where the "measurement by man-robot distance" button 285 is touched, the screen transitions to a setting screen section 265 for measurement based on a man-robot distance illustrated in FIG. 24.

FIG. 23 is a diagram illustrating a screen configuration of the display unit 131 in making settings for the measurement of operation time by a process program according to the present exemplary embodiment.

In FIG. 23, the display unit 131 displays the setting screen 262 for measurement based on the process program. The setting screen 262 for measurement based on the process program includes a process program selection button 263 and a measurement setting field 264.

The process program selection button 263 allows the operator to select a process program for measuring the operation time of. If the process program selection button 263 is touched, a list of process programs is displayed as a pull-down list to accept a selection made by the operator 255. In the present exemplary embodiment, a description will be given of a case where "Process Prg 1" is selected by the operator 255.

The measurement setting field 264 displays the details of processes of the process program selected by the process program selection button 263, and can set start and stop triggers for various operations included in the details of the processes.

Examples of the details of a process include "robot arm operation", "robot hand cramping", and "presence/absence detection". Operation start and stop triggers are set for each of the operation classifications.

The operation classifications to be described here include "robot operation", "robot-man operation", "man operation", and "other operations".

A "robot operation" refers to an operation performed by the robot apparatus 251 alone. A "robot-man operation" refers to an operation collaboratively performed by the robot apparatus 251 and the teaching operator 255. The operation time of a "robot-man operation" may hereinafter be referred to as collaborative operation time. A "man operation" refers to an operation performed by the teaching operator 255 alone. "Other operations" refer to operations other than the "robot operation", "robot-man operation", or "man operation".

In the present exemplary embodiment, the robot apparatus 251 places a work from the work storage area 252 to the work storage area 253. In the work storage area 253, the robot apparatus 251 and the operator 255 perform a collaborative operation. The operator 255 places the work from the work storage area 253 to the work storage area 254.

In the present exemplary embodiment, image-based presence/absence detection of a work is employed as operation start and stop triggers for calculating operation time. The reason is that a work placed on each work storage area typically transitions from a placed state to a not-placed state before and after the start of an operation, and transitions from the not-placed state to the placed state before and after the end of the operation.

Using the foregoing work placement states in the work storage areas, a time between before and after the start of an operation and before and after the end of the operation is regarded as an operation time.

While the presence or absence of a work may be used as the work start and stop triggers for calculating the operation time, a state where a part is added to the work or a state where the work is machined may be detected from an image and used as a trigger.

Presence/absence detection 1 in the measurement setting field 264 of FIG. 23 is used to detect the presence or absence of a work within the angle of view A and measure the time of the start of the "robot operation".

Presence/absence detection 2 is used to detect the presence or absence of a work within the angle of view B and detect the completion of the "robot operation", and measure the time of the "robot-man operation", and measure the time of the start of the "man operation". The collaborative operation is performed in the work storage area within the angle of view B.

Presence/absence detection 3 is used to detect the presence or absence of a work within the angle of view C and detect the completion of the "man operation" and measure the time of the start of "other operations".

Based on such presence/absence detections, the operator 255 sets operation start and stop triggers in units of processes in the measurement setting field 264. Specifically, a time duration between a start and a stop is the operation time that is the time to be measured.

In the present exemplary embodiment, the image processing-based presence/absence detection of a work is used as operation start and stop triggers. However, presence/absence detection of a work by a proximity switch, presence/absence detection by other switches, a start signal of a process operation, and/or a completion signal of a process operation may be used as triggers.

In FIG. 23, a distinction between the operation by the operator 255 and the operation by the robot apparatus 251 can be made on a process base. However, such a distinction can be not always available. A relative distance between the operator 255 and the robot apparatus 251 is thus directly measured, and the operation time is measured based thereon.

FIG. 24 is a diagram illustrating a screen configuration of the display unit 131 in setting a relative distance between the operator 255 and the robot apparatus 251. In FIG. 24, the display unit 131 displays the setting screen section 265 for setting a distance between the teaching operator 255 and the robot apparatus 251.

The setting screen section 265 includes a man-robot distance setting field 266. The man-robot distance setting field 266 sets a man-robot distance at which an operation is regarded as collaborative.

In a case where a distance between the robot apparatus 251 and the operator 255 converted from the focal lengths of the respective imaging apparatuses connected to the robot system 2000 and the numbers of pixels of the imaging apparatuses is less than or equal to the distance set in the man-robot distance setting field 266, the operation is regarded as being performed in a collaborative manner.

The operation time for an operation where the robot apparatus 251 and the operator 255 collaborate, i.e., a "robot-man operation" can thus be measured. In the present exemplary embodiment, the man-robot distance at which an operation is regarded as collaborative is set to 20 mm.

The setting methods for measuring an operation time have been described above with reference to FIGS. 23 and 24. Next, a method for checking operation times measured by using such setting methods will be described. The operation times can be checked by touching the measurement button 282 or the measurement history button 283.

The measurement button 282 will initially be described. FIG. 25 is a diagram illustrating a screen configuration of the display unit 131 in the case where the measurement button 282 is touched.

In FIG. 25, the display unit 131 displays a measurement function screen section 267. The measurement function screen section 267 includes a process program name display field 268 and a process program measured time display field 269.

The process program name display field 268 displays a process program name being currently executed. The process program name display field 268 is blank in a case where no process program is being executed. FIG. 25 illustrates a case where Process Prg 1 is being executed.

The process program measured time display field 269 displays the details of the processes of the process program being executed and the operation times when the details of the processes are executed. The process being currently executed is indicated by a running process cursor 270.

The operation times when the details of the processes are executed are displayed in a table (measured time display field 269) with the processes on the vertical axis and the operation classifications on the horizontal axis. Three types of operation times, namely, a start time [Start], a completion time [Stop], and a measured time [Time] are further displayed. The operation times of processes yet to be executed are blank.

Next, the measurement history button 283 will be described. FIG. 26 is a diagram illustrating a screen configuration of the display unit 131 in the case where the measurement history button 283 is touched.

In FIG. 26, the display unit 131 displays a measurement history screen section 271 and a process program measurement history display section 272. The measurement history screen section 271 includes measurement history selection buttons 273.

The measurement history selection buttons 273 list the histories of sets of executed process program names and dates and times of execution in the form of buttons.

By touching the button of a history to refer to, the operator 255 can display details thereof in the process program measurement history display section 272.

The process program measurement history display section 272 includes a process program name display field 274 and a process program measured time display field 275.

The process program name display field 274 displays the process program name selected by the measurement history selection buttons 273. In the present exemplary embodiment, a description will be given of a case where Process Prg 1 is selected.

The process program measured time display field 275 displays the details of the processes of the process program selected by the measurement history selection buttons 273, and the operation times when the processes are executed.

Like FIG. 25, the operation times when the details of the processes are executed are displayed as a table with the processes on the vertical axis and the operation classifications on the horizontal axis. Three types of operation times, namely, a start time [Start], a completion time [Stop], and a measured time [Time] are displayed.

In the above-described manner, the imaging apparatuses can be used to measure the operation times of the operator and the robot apparatus of which images are captured by the imaging apparatuses and display the operation times on the external input device 130.

This enables such measures as doing maintenance on a robot apparatus whose operation time reaches a predetermined threshold, and having an operator whose operation time reaches a predetermined value take a rest as appropriate. This can facilitate management operations such as maintenance and inspection on the work site.

Ninth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as a ninth exemplary embodiment.

In the present exemplary embodiment, a description will be given of an example of a UI where teaching time can be reduced even in a case where there are a lot of items to be taught to the robot apparatus and the imaging apparatus and it takes a long time to teach them.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 27:
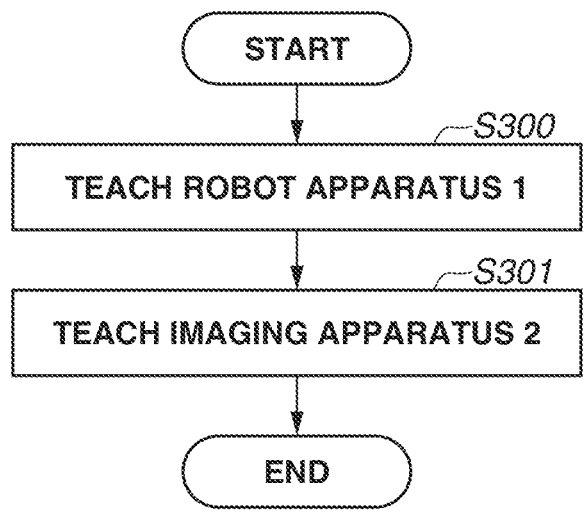
FIG. 27 is a flowchart illustrating a control procedure according to a ninth exemplary embodiment.

FIG. 27 is a flowchart of a method for teaching the robot apparatus 1 and the imaging apparatus 2 according to the present exemplary embodiment. A method for teaching a single point includes two steps S300 and S301. In the present exemplary embodiment, teaching is performed on a plurality of points.

In step S300, the operator initially teaches the robot apparatus 1. The operator teaches the robot apparatus 1 by direct teaching or by using the external input device 130.

In step S301, the operator teaches the imaging apparatus 2. The operator teaches the imaging apparatus 2 also by using the external input device 130.

Figure 28:
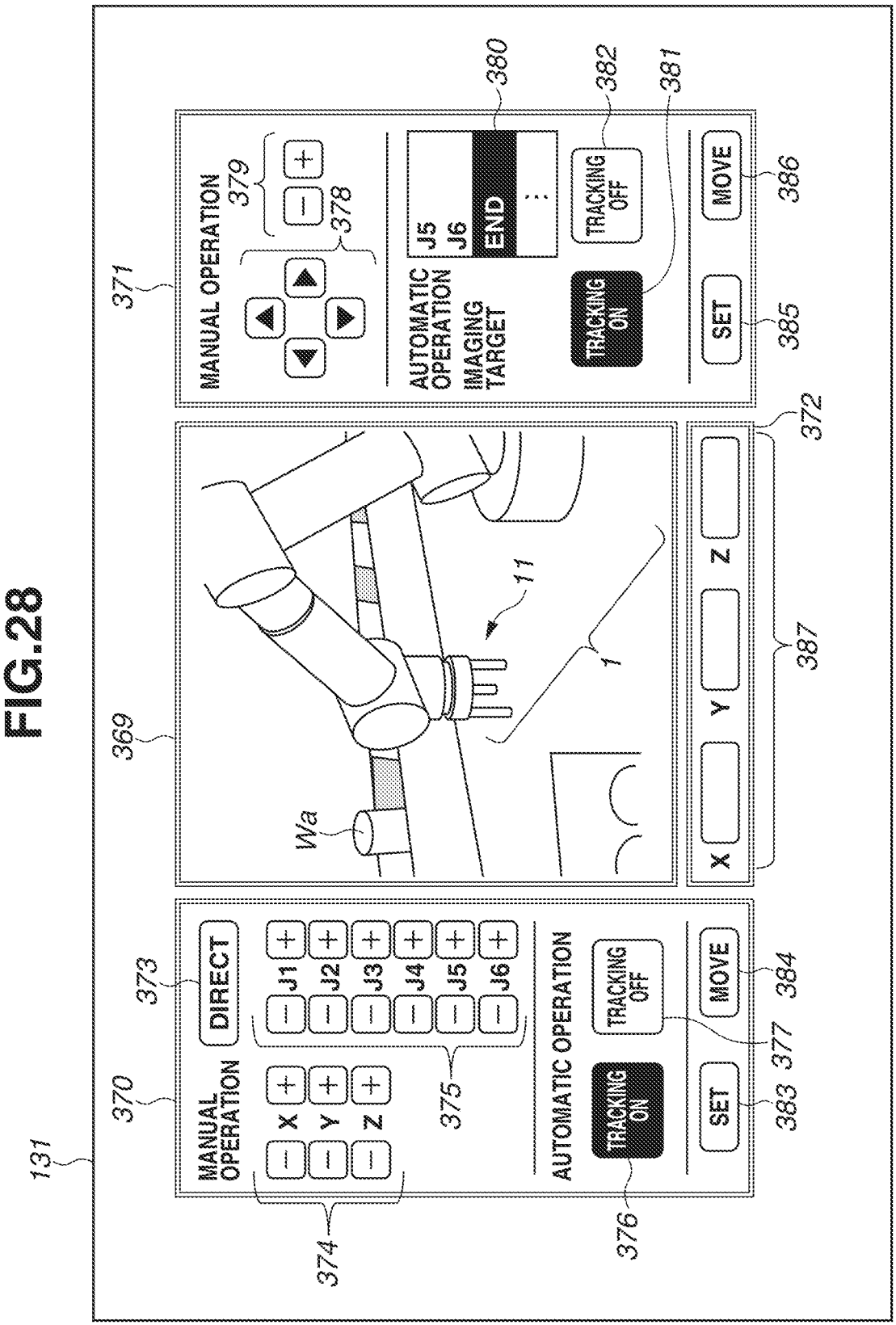
FIG. 28 is a diagram illustrating an external input device 130 according to the ninth exemplary embodiment.

FIG. 28 illustrates a configuration example of a screen for teaching the robot apparatus 1 and the imaging apparatus 2, displayed on the display unit 131 of the external input device 130 according to the present exemplary embodiment.

In FIG. 28, an image display section 369, a robot apparatus operation section 370, an imaging operation section 371, and a coordinate display section 372 are displayed in the display unit 131.

The image display section 369 displays an image captured by the imaging apparatus 2. The robot apparatus operation section 370 is an operation unit for operating the robot apparatus 1. The imaging operation section 371 is an operation unit for operating the imaging apparatus 2.

The coordinate display section 372 is an operation unit for displaying or setting the coordinates of the robot apparatus 1 or the display area of the image captured by the imaging apparatus 2.

The robot apparatus operation section 370 includes a teaching mode switch button 373 for switching the teaching of the robot apparatus 1 to direct teaching.

The robot apparatus operation section 370 also includes end effector operation buttons 374 for moving the end effector 11 of the robot apparatus 1 in X, Y, and Z directions in a given coordinate system, and a joint operation buttons 375 for operating the amounts of rotation of the respective joints J1 to J6 of the robot apparatus 1 separately.

The robot apparatus operation section 370 also includes robot tracking buttons for automatically operating the robot apparatus 1. The robot tracking buttons include a robot tracking ON button 376 for turning automatic operation ON and a robot tracking OFF button 377 for turning the automatic operation OFF.

The robot apparatus operation section 370 also includes a robot setting button 383 for setting the current position of the end effector 11 into the coordinate display section 372, and a robot movement button 384 for moving the position of the end effector 11 to the position displayed on the coordinate display section 372.

The imaging operation section 371 includes point of view operation buttons 378 for making pan and tilt operations on the imaging apparatus 2, and zoom operation buttons 379 for making zoom-in and zoom-out operations.

The imaging operation section 371 also includes an imaging target specification box 380 for specifying an imaging target of the imaging apparatus 2 in a case where the imaging apparatus 2 is automatically operated.

The imaging operation section 371 further includes imaging tracking buttons for making the imaging apparatus 2 follow a portion specified in the imaging target specification box 380 in a case where an imaging target is specified in the imaging target specification box 380. The imaging tracking buttons include an imaging tracking ON button 381 for turning imaging tracking ON, and an imaging tracking OFF button 382 for turning the imaging tracking OFF.

The imaging operation section 371 also includes an imaging setting button 385 for setting the coordinates where the imaging apparatus 2 is currently focused into the coordinate display section 372, and an imaging movement button 386 for moving the coordinates where the imaging apparatus 2 is focused to the coordinates displayed on the coordinate display section 372.

The coordinate display section 372 includes coordinate display boxes 387 for displaying and inputting X, Y, and Z coordinates.

To make the imaging by the imaging apparatus 2 follow the operation of the robot apparatus 1 during a teaching operation, the imaging tracking ON button 381 is tapped or clicked to follow the position specified in the imaging target specification box 380.

The tracking can be cancelled by tapping or clicking the imaging tracking OFF button 382.

Similarly, to make the robot apparatus 1 follow the imaging range of the imaging apparatus 2, the robot tracking ON button 376 is tapped or clicked, and the robot apparatus 1 follows the imaging range.

The tracking can be cancelled by tapping or clicking the robot tracking OFF button 377.

To find out the current spatial position of the end effector 11 during a teaching operation, the robot setting button 383 is tapped or clicked to display the X, Y, and Z coordinate values in the coordinate display boxes 387 of the coordinate display section 372.

The position of the end effector 11 is calculated by the not-illustrated encoders included in the respective joints of the robot apparatus 1, and displayed.

To move the end effector 11 to a predetermined spatial position, numerical values are input into the respective the coordinate display boxes 387 of the coordinate display section 372, and the robot movement button 384 is tapped or clicked. This moves the end effector 11 to the coordinates.

In this operation, the amounts of rotation of the respective joints of the robot apparatus 1 are calculated from the position values of the end effector 11 by using inverse kinematics computing, and the end effector 11 is moved to the predetermined position.

Similarly, to find out the spatial position of the center of the imaging range of the imaging apparatus 2, the imaging setting button 385 is tapped or clicked to display the X, Y, and Z coordinate values in the coordinate display boxes 387 of the coordinate display section 372.

To move the center of the imaging range of the imaging apparatus 2 to a predetermined spatial position, numerical values are input to the respective the coordinate display boxes 387 of the coordinate display section 372, and the imaging movement button 386 is tapped or clicked. This moves the center of the imaging range to move to the coordinates.

The position of the center of the imaging range of the imaging apparatus 2 is calculated by using image processing.

When the teaching operation on a predetermined point ends, the values on the respective axes of the robot apparatus 1 and the pan, tilt, and zoom information about the imaging apparatus 2 are simultaneously recorded in the control apparatus 13.

In the above-described manner, the robot apparatus 1 and the imaging apparatus 2 can be moved to predetermined positions by the operator simply inputting predetermined position values into the external input device 130.

Moreover, since the robot apparatus 1 and the imaging apparatus 2 make tracking operations so that a portion to focus on during the teaching operation is always displayed on the image display section 369, complicated manual operations are not needed.

This can reduce the operation load on the operator and reduce the teaching time even in a case where there are a lot of items to be taught to the robot apparatus and the imaging apparatus.

Tenth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as a tenth exemplary embodiment.

In the present exemplary embodiment, a description will be given of an example of a UI that facilitates teaching for focusing on a work handled by the robot apparatus.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 29:
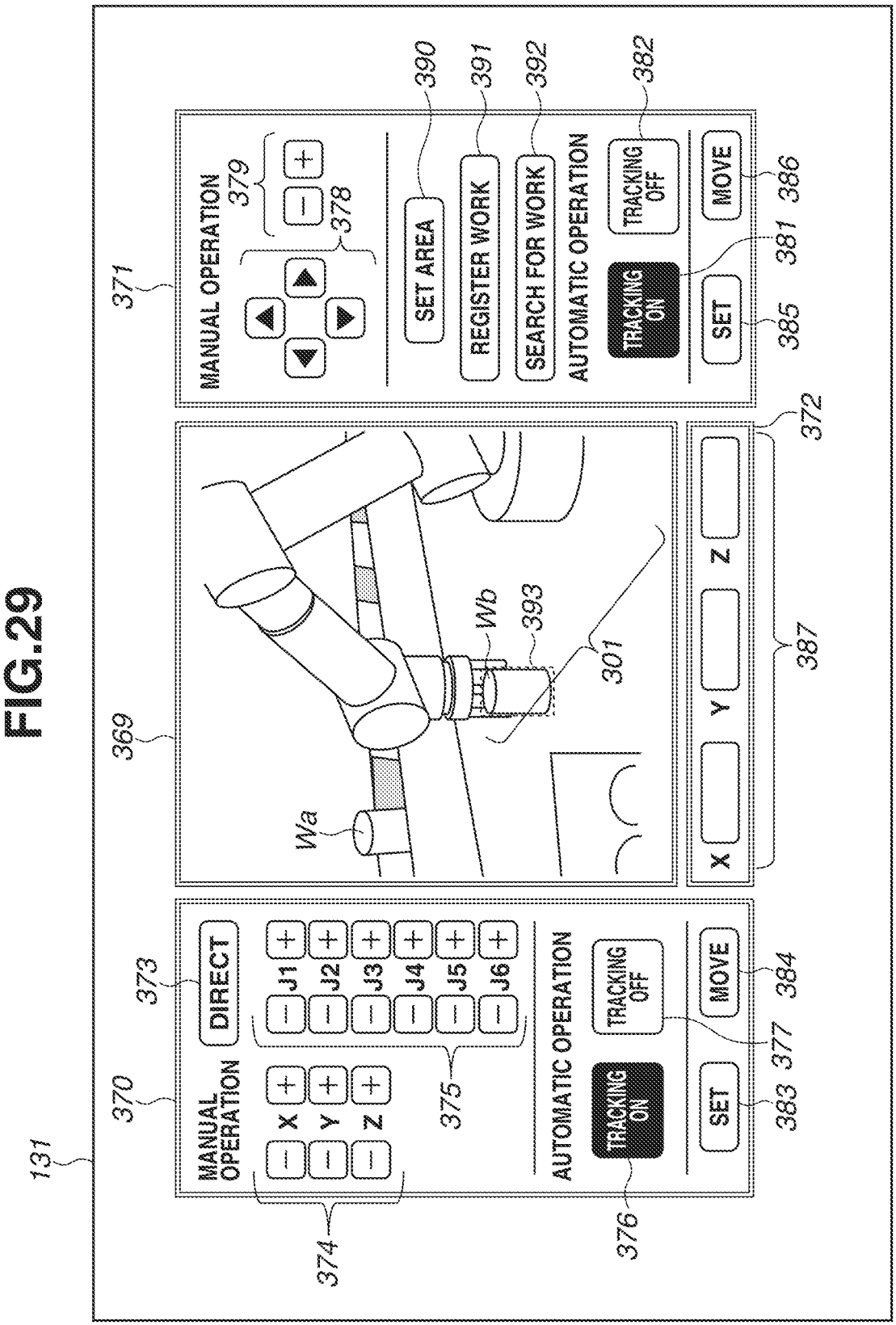
FIG. 29 is a diagram illustrating an external input device 130 according to a tenth exemplary embodiment.

FIG. 29 illustrates an example of a screen configuration for teaching the robot apparatus 1 and the imaging apparatus 2 displayed on the display unit 131 of the external input device 130 according to the present exemplary embodiment.

A difference from the foregoing ninth exemplary embodiment is that the imaging operation section 371 includes an area setting button 390, a work registration button 391, and a work search button 392.

The area setting button 390 allows the operator to set a predetermined area in the image displayed on the image display section 369.

The work registration button 391 can detect a work for the robot apparatus 1 to handle from the area set by the area setting button 390 and allows the operator to register the work as one to focus on.

The work is detected by recording image data on the work in the control apparatus 13 in advance and performing image processing on the image in the image display section 369.

The work search button 392 allows the operator to search the image displayed on the image display section 369 for the work registered by the work registration button 391.

Figure 30:
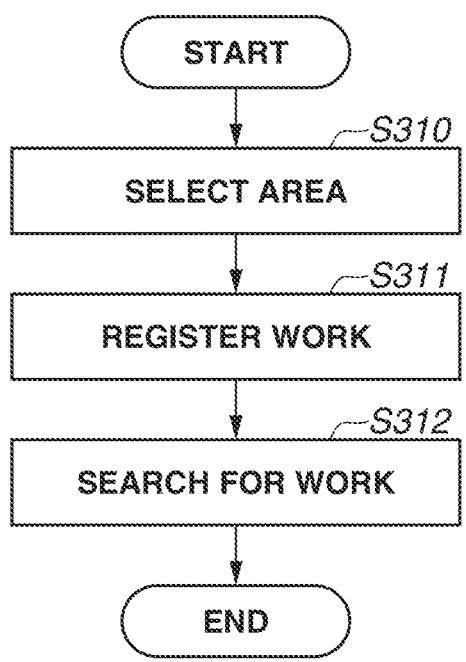
FIG. 30 is a flowchart illustrating a control procedure according to the tenth exemplary embodiment.

FIG. 30 is a flowchart that the imaging apparatus 2 executes in searching for a work according to the present exemplary embodiment. The work search method includes three steps S310 to S312 of FIG. 30, and can teach the imaging apparatus 2 the work position as the imaging point of view.

In step S310 of FIG. 30, the operator initially selects an area. In a case where the operator taps or clicks the area setting button 390, a work area 393 is superimposed on the image display section 369.

The operator can set the size of the work area 393 by tapping or clicking the work area 393 displayed on the image display section 369 and making an operation, such as a pinch-in and a pinch-out.

In step S311, the operator registers the work detected in the work area 393 as a work to focus on. The operator can register the work detected in the selected work area 393 as the work to focus on by tapping or clicking the work registration button 391.

In step S312, the imaging apparatus 2 searches around for the work registered in step S311 while performing driving in the pan and tilt directions. The operator can make the imaging apparatus 2 search for the registered work by tapping or clicking the work search button 392.

This enables teaching the imaging apparatus 2 to continue capturing an image of the work without inputting complicated coordinate values and the like, and can reduce the teaching time for the imaging apparatus 2.

Eleventh Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as an eleventh exemplary embodiment.

In the present exemplary embodiment, a description will be given of a case where some assembly processes to be performed by the operator in a production site for assembling a product are complicated due to reasons such as that the product includes a number of parts and that a lot of process procedures are involved.

In such a case, the operator can mistake the details of the operations or need a long time to perform the operations.

In a case where an operation includes complicated details, a lot of labor, such as suspending the assembly operation for checking, taking a printed instruction manual and the like in hand, and consulting pages corresponding to the process, is needed.

Moreover, an unskilled operator can take extremely long time to perform the operation, or make an operation mistake.

If an operator and the robot apparatus perform operations in the same space and the operator is unskilled, the operator can obstruct the moving destination of the robot apparatus, and the robot apparatus or a work conveyed by the robot apparatus can contact the operator.

In this case, issues such as a damage to the robot apparatus or the work, an assembly failure due to a misaligned operation of the robot apparatus, and a delay of the production line because of an operation stop can arise.

In view of the foregoing issues, in the present exemplary embodiment, a description will be given of an example of a UI where operation processes can be easily checked and the operations to be performed by the operator can be assisted by using the external input device.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 31:
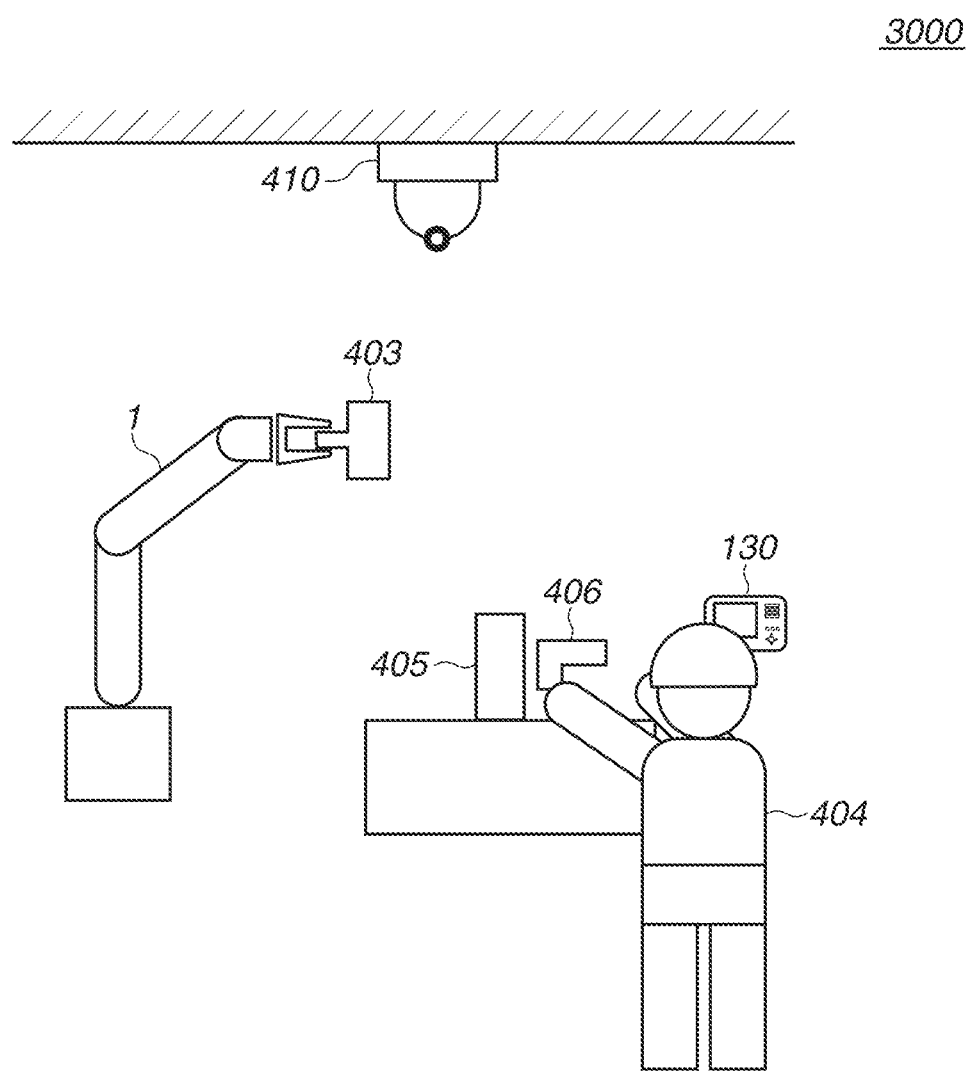
FIG. 31 is a diagram illustrating a robot system 3000 according to an eleventh exemplary embodiment.

FIG. 31 is a diagram illustrating a production site using a robot system 3000 according to the present exemplary embodiment.

The robot system 3000 includes a robot apparatus 1. The robot apparatus 1 automatically performs an assembly operation for assembling a part 403 with a part 405 based on operations programmed in advance.

The robot apparatus 1 is not limited to a vertically articulated configuration and may have any other configurations capable of an automatic assembly operation, such as a single-axis slide configuration, a SCARA configuration, and an XY configuration.

In any case, the joints of the robot apparatus 1 have rotation position or angle detection functions using sensors, such as an encoder, and the orientation of the robot apparatus 1 can be controlled.

An operator 404 stays near the robot apparatus 1 and performs an assembly operation on the part 405. The operator 404 can perform the operation with a hand or other part of the body put in the same space as where the robot apparatus 1 operates.

Note that the robot apparatus 1 is one called collaborative robot, intended to be operable with a human in a common space, and has sufficiently safe structures and functions with measures against collision and entrapment.

The operator 404 can edit a robot program for controlling the operation of the robot apparatus 1 by using the external input device 130.

The operator who performs the assembly operation of the part 405 is often different from the operator who edits the robot program. Respective specialized operators can take charge.

The external input device 130 is typically referred to as a teaching pendant, and has a function for communicating with a not-illustrated control apparatus of the robot apparatus 1. The external input device 130 has standard robot operation functions, such as operating the robot apparatus 1 to move, recording a teaching point indicating the moving destination of the robot apparatus 1, and moving the robot apparatus 1 to the position of the recorded teaching point position.

In the production site using such a robot apparatus, the operator 404 performs an assembly operation for assembling a part 406 with the part 405, with the external input device 130 held in hand or placed at a visually observable position.

The robot system 3000 also includes an imaging apparatus 410, and captures an image of the entire production site in a visually observable manner.

To capture an image of a needed target, the imaging apparatus 410 has driving functions, such as pan, tilt, and zoom driving functions for changing imaging directions and an angle of view. The number of imaging apparatuses 2 installed may be one. In a case where the single imaging apparatus has a dead angle, a plurality of imaging apparatuses may be installed at compensatory positions.

Figure 32:
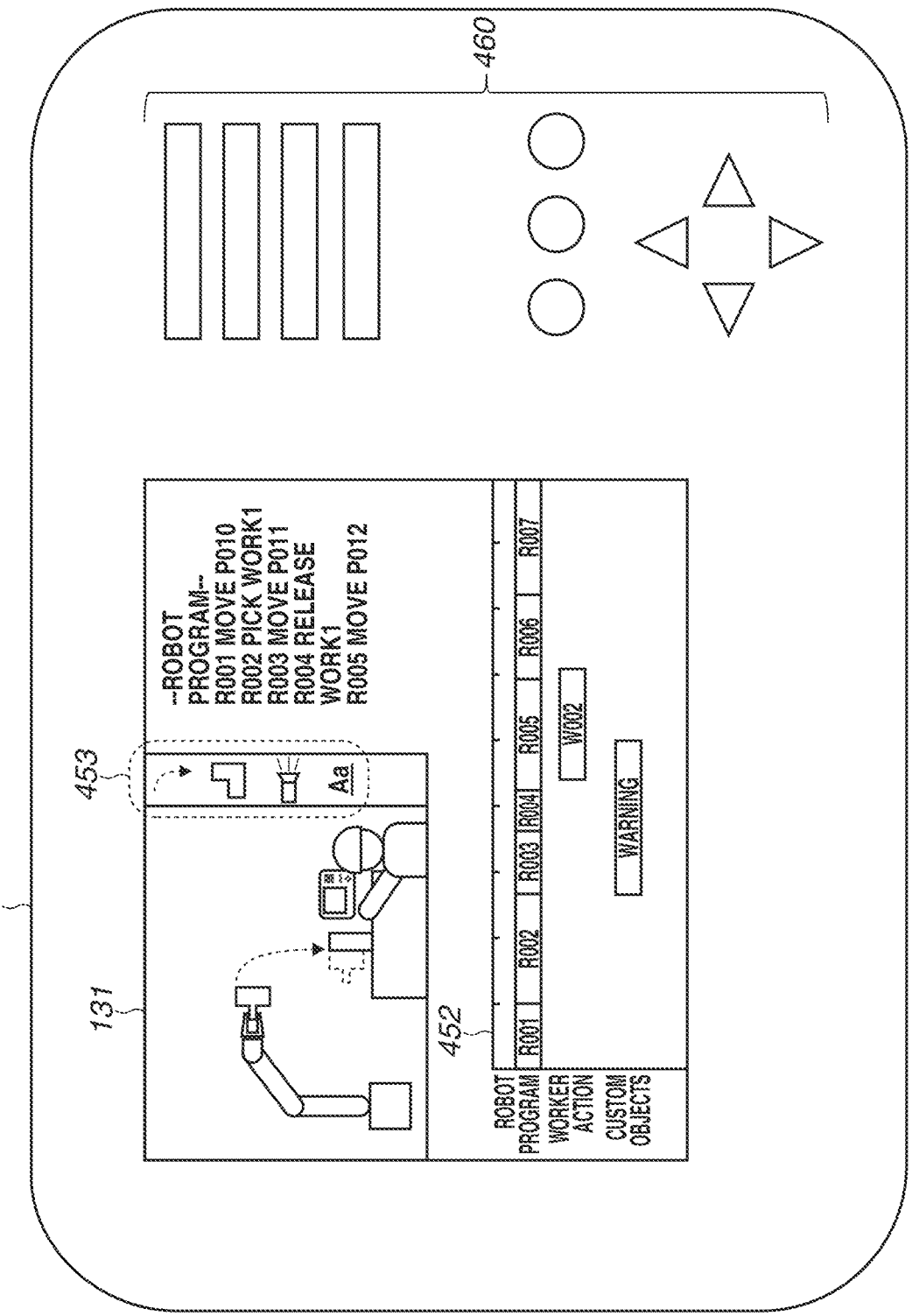
FIG. 32 is a diagram illustrating an external input device 130 according to the eleventh exemplary embodiment.

FIG. 32 is a diagram illustrating a configuration of the external input device 130 according to the present exemplary embodiment. The external input device 130 according to the present exemplary embodiment includes the display unit 131 and various operation units 460. Unlike the foregoing exemplary embodiments, the operation units 460 are button type units. Since their operations are similar to those in the foregoing exemplary embodiments, a description thereof will be omitted.

In FIG. 32, the external input device 130 includes the display unit 131 for displaying the image captured by the imaging apparatus 2.

Aside from the image from the imaging apparatus 2, the display unit 131 can display a robot program edit screen.

The display unit 131 is a touch panel including a touch sensor. The operator 404 can directly touch the display unit 131 to make intuitive operations and edits.

Moreover, the display in the display unit 131 may be selected and operated by using various buttons of the operation units 460. The external input device 130 may include an interface for connecting an additional keyboard and/or mouse.

The external input device 130 has a function of combining the image of the production site captured by the imaging apparatus 2 with a virtual image, such as that of a process operation of the robot apparatus 1 or a next assembly procedure of the part 406, and editing the same.

Here, the installation positions and directions of the imaging apparatus 2 with respect to the robot apparatus 1 installed in the production site and the part to be handled are known in advance.

A robot combined image 401b and a work combined image 403b indicating the positions and orientations of the virtual robot apparatus 1 and the part to be handled are displayed on the display unit 131 (FIG. 33) by using a perspective view derivable from their positional relationship by a typical perspective projection calculation method.

The joints of the robot apparatus 1 have an angle detection function, such as an encoder. The orientation of the robot apparatus 1 and the position of the part 403 conveyed can be calculated by kinematics computing.

Even in a case where the imaging apparatus 2 has functions, such as the pan, tilt, and zoom functions, the imaging direction and magnification ratio can be derived since the driving mechanisms have a rotation angle detection function, such as an encoder.

A shape model for the robot apparatus 1 is prepared by 3D CAD. Images showing the position of the tip of the robot apparatus 1 and the position of the part, calculated by the foregoing kinematics and perspective projection image calculation methods, can be virtually combined and displayed on the display unit 131.

The display unit 131 also displays a time chart 452, and has a function of editing the start and stop timing of the robot program and processes, such as an assembly operation by the operator 404 and combined display. The order and display timing of such processes can be edited and set on the time chart 452.

The horizontal axis of the time chart basically indicates time. The time needed for movement depends on the performance of the robot apparatus 1. The length of time for each process in the time chart can be freely set by the operator 404 or recorded by actually operating the robot apparatus 1 once. In a case where the robot apparatus is accompanied by robot simulation, the length of time may be derived by using the robot simulator.

As for the operation start timing of each process, the operator 404 can also freely set whether to perform operation in time or make the control apparatus identify the end timing of the previous process operation and synchronize the start of the next process operation with the end timing.

Moreover, an arrow, sound, character, and other items may be set as auxiliary display for the operator 404 to recognize the details of the assembly.

In such a case, the auxiliary display is displayed on the display unit 131 like display icons 453. The operator selects and layouts the display icons 453 and sets start timing.

In a case where display settings such as blinking and other highlighting of an arrow, a character, and a registered image, and free settings in color, size, and direction can be performed, the display icons 453 can improve in noticeability of an alert to the operator 404 even when the operator 404 concentrates on other operations.

In a case where there is installed a plurality of imaging apparatuses to capture images of the production site in a plurality of directions, the distance between the part and the operator in the three-dimensional space can be calculated and used as a warning issuance distance.

In such a case, to issue a warning when the part 403 and the operator 404 approach each other, the target objects are selected on-screen, a state where the distance therebetween is less than a certain numerical value is set as a threshold, and screen highlighting or sound issuance is set as a display icon 453.

Figure 33:
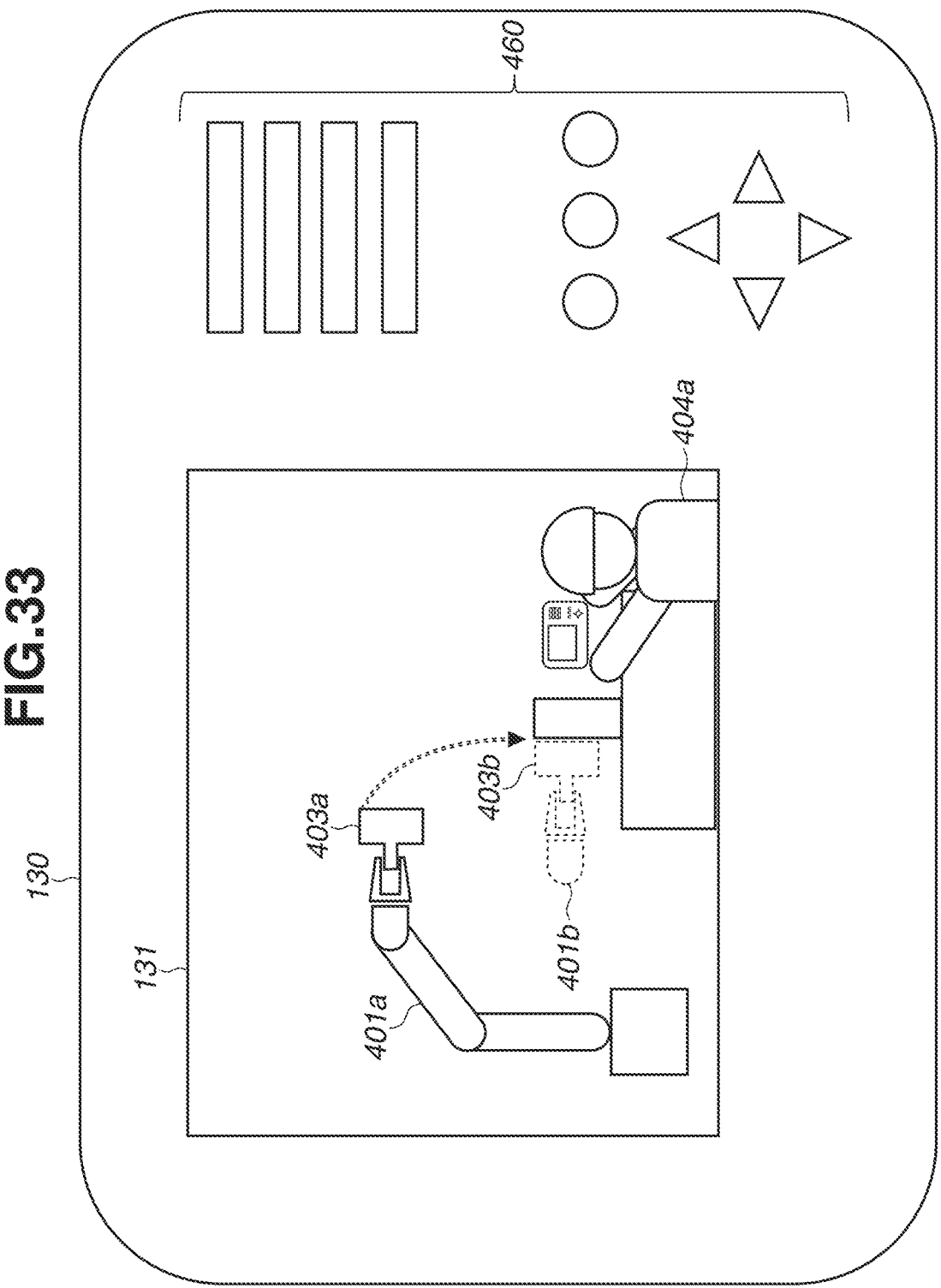
FIG. 33 is a diagram illustrating the external input device 130 according to the eleventh exemplary embodiment.

FIG. 33 is a diagram where the next operations of the robot apparatus 1 included in the robot system 3000, the part, and the like are virtually combined and displayed on the display unit 131.

Captured images displaying the actual robot apparatus 1, the part 403, and the teaching operator 404 will be referred to as a robot apparatus captured image 1a and a part captured image 403a.

By contrast, images virtually displaying the part 403 and the like positioned by the next operation of the robot apparatus 1 will be referred to as a robot apparatus combined image 1b and a work combined image 403b.

The combined images of the robot apparatus 1 and the part 403 to be displayed with the display unit 131 may be generated by recognizing the shapes of and keeping track of the registered target objects by image processing and recording the operations when the robot apparatus 1 is actually operated once and the operator 404 performs the assembly operation.

As for the image processing method, the operator 404, a specialized image processing engineer, or the like selects appropriate means from typical image processing, such as edge extraction, and applies the means.

The foregoing editing function for combining images or adding display does not necessarily need to be executed by the external input device 130 alone.

For example, images separately edited by a personal computer and the like may be stored in the control apparatus of the robot apparatus 1, and the control apparatus 13 may display the images on the external input device 130.

As described above, according to the present exemplary embodiment, what kind of operation is performed in the next process can be checked on the display unit 131 in advance without actually operating the robot apparatus during the operation in the production site.

An unexpected contact and the like between parts or with the operator 404 can thus be easily checked, and the risk of damage to the robot apparatus and the parts can be reduced.

Such operations of the robot apparatus in the processes can thus be easily checked and edited without a need to learn a skilled method for operating the robot apparatus and the imaging apparatus.

In addition, the setting to issue a warning when the robot apparatus 1 or the part 403 approaches the operator 404 can be easily implemented.

Twelfth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described.

In the present exemplary embodiment, a description will be given of a case where the operator teaches an operation by operating the robot apparatus like direct teaching.

Some robot apparatuses detect anomaly, issue sound or display characters indicating a warning, and stop accepting operations in a case where their operation limit is reached in performing the foregoing direct teaching.

This causes an issue that, in making operation settings near the operation limit of a robot apparatus, it takes longer to make the operation settings because the operation stops frequently and a recovery operation needs to be performed each time.

Moreover, there is another issue that in a case where the robot apparatus stops at or near the operation limit position, which direction the robot apparatus can move in is unable to be determined and the operability of the robot apparatus is degraded since the directions in which the robot apparatus can move are limited.

In view of the foregoing issues, the present exemplary embodiment deals with an example of a UI for reducing the teaching time and preventing the operability of the robot apparatus from being degraded even in a case where teaching and other operation settings are made near the operation limit of the robot apparatus.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

Figure 34:
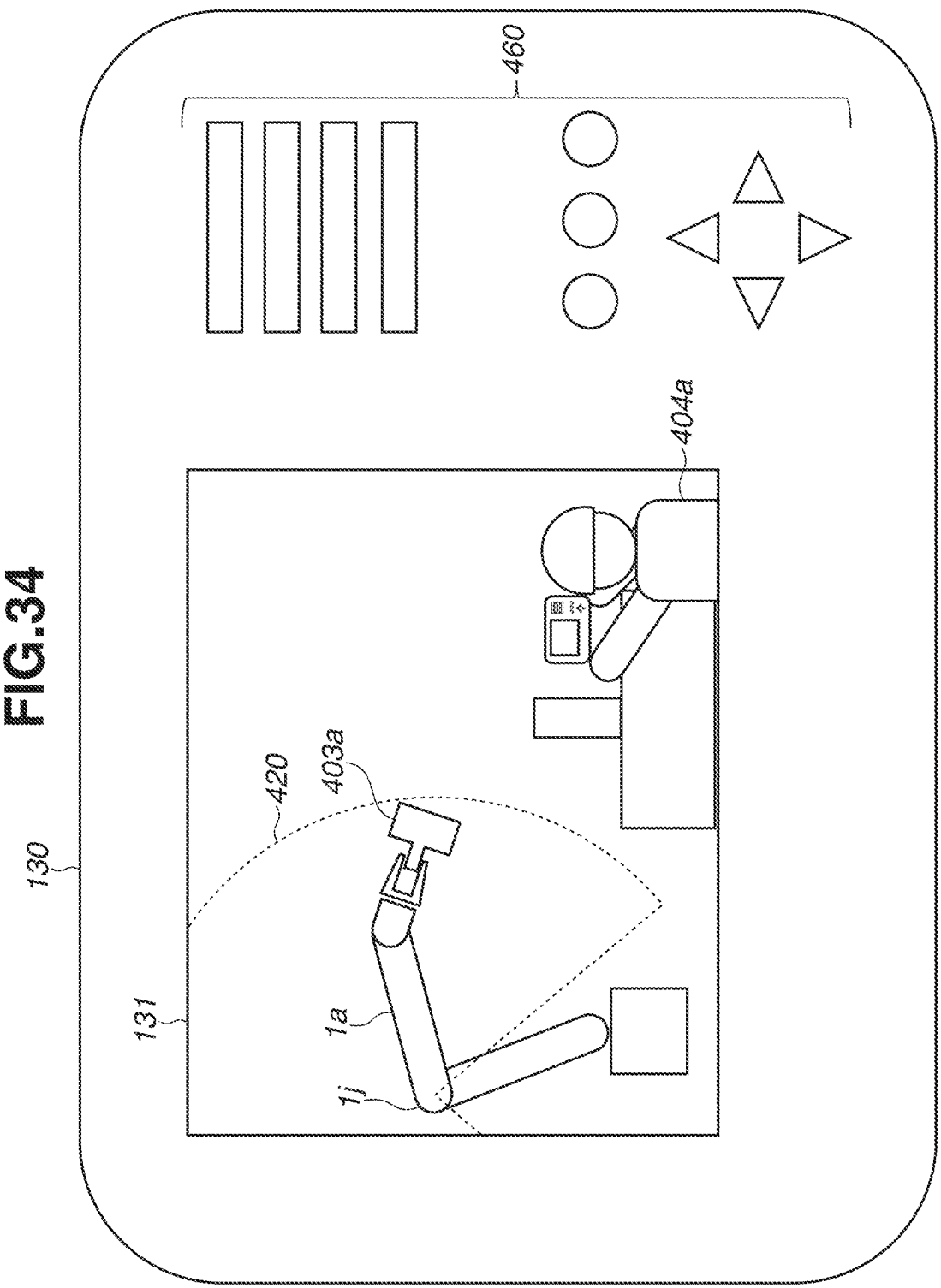
FIG. 34 is a diagram illustrating an external input device 130 according to a twelfth exemplary embodiment.

FIG. 34 illustrates a state in which an image of a situation where the operator 404 operates the robot apparatus 1 to move is captured by the imaging apparatus 2 and displayed on the display unit 131 on the external input device 130 as a robot apparatus captured image 1a.

In this state, the robot apparatus 1 is operated to make a rotating motion about a driving axis 1j of a joint of the robot apparatus 1, i.e., an operation called joint jog operation, axial operation, or the like is made.

Here, the operable range of the robot apparatus 1 is combined with the image captured by the imaging apparatus 2 and displayed on the display unit 131 as a robot joint operation range 420.

The geometry of this robot joint operation range 420 displayed on the display unit 131 is a combination of the rotatable angle about the driving axis 1j with the installation position and the joint angles of the robot apparatus 1 and the installation position and orientation of the imaging apparatus 2.

The geometry of the robot joint operation range 420 can be calculated as in the eleventh exemplary embodiment by further combining the shape of the robot apparatus 1 or the part 403 conveyed by the robot apparatus 1.

The geometry thus derived is displayed as the robot joint operation range 420 on the display unit 131.

Figure 35:
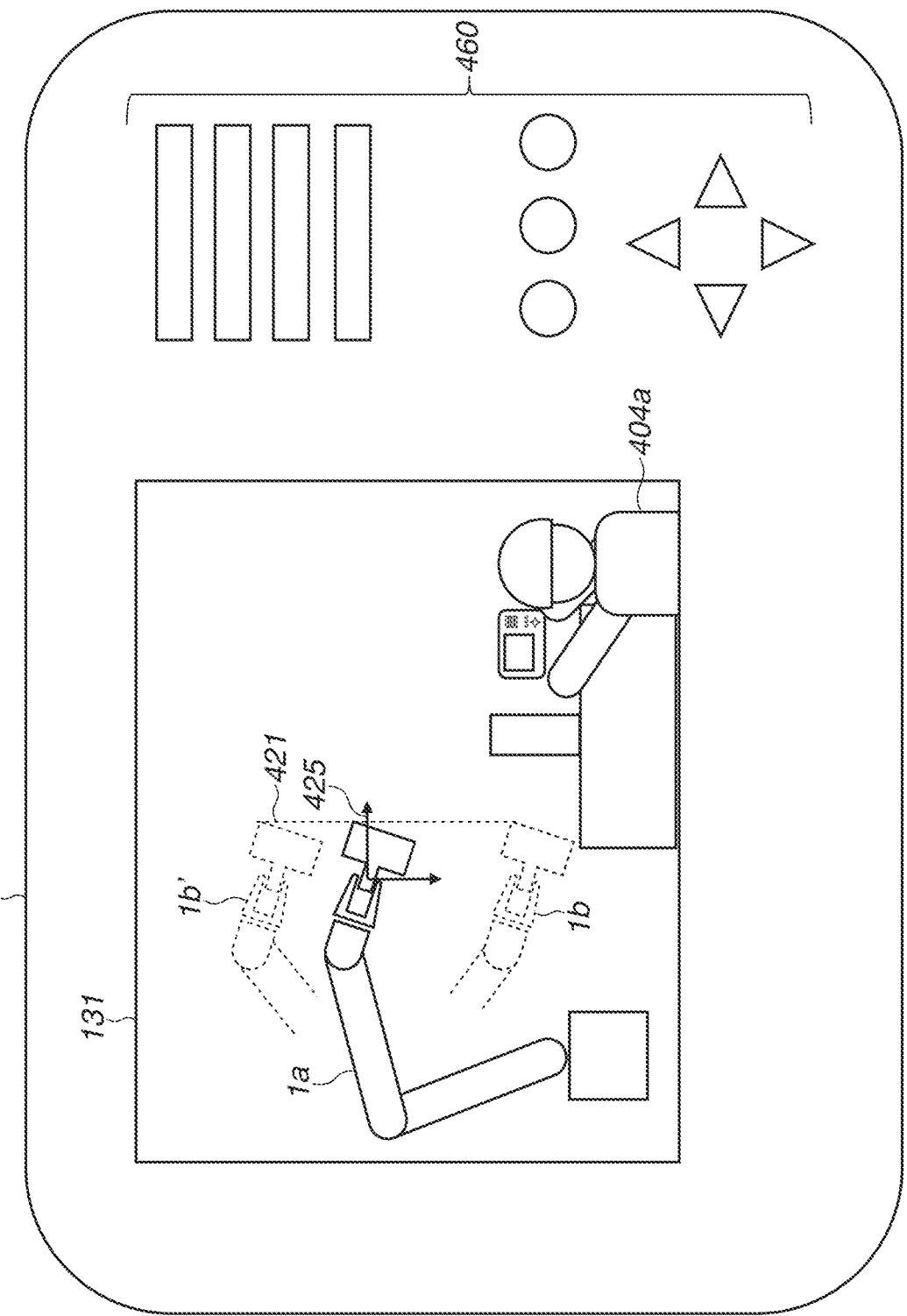
FIG. 35 is a diagram illustrating the external input device 130 according to the twelfth exemplary embodiment.

FIG. 35 illustrates a state where a moving operation along an orthogonal coordinate system 425 orthogonal to the installation surface of the robot apparatus 1, called orthogonal jog operation or the like, is made on the robot apparatus 1.

Like FIG. 34, an orthogonal operation range 421 of the robot apparatus 1 is displayed. In the state of FIG. 35, the robot apparatus 1 is moved in a vertical direction in the diagram, and vertical movement limits are illustrated.

In FIG. 35, the robot apparatus combined image 1b represents the lower limit of the orthogonal operation range 421 of the robot apparatus 1. A robot apparatus combined image 1b' represents the upper limit of the orthogonal operation range 421 of the robot apparatus 1.

Orthogonal jog operations can also move the robot apparatus 1 in a horizontal direction and a depth direction in the diagram, and circumferential directions thereof. Even in such cases, a combined image showing the virtual motion of the robot apparatus 1 as described above may be used for display.

In the depth direction of the diagram, the operation limits on the near side and the far side or the angles near the same can be made more identifiable by also displaying numerical indications in units of millimeters in the SI unit system with negative and positive signs.

An example of a method for selecting the direction of the range to be displayed by the orthogonal operation range 421 here is to display a corresponding range when each directional operation button of the operation units 460 is pressed.

Alternatively, the operator 404 selects in which direction to move the robot apparatus 1 in advance, and the direction is displayed all the time.

Figure 36:
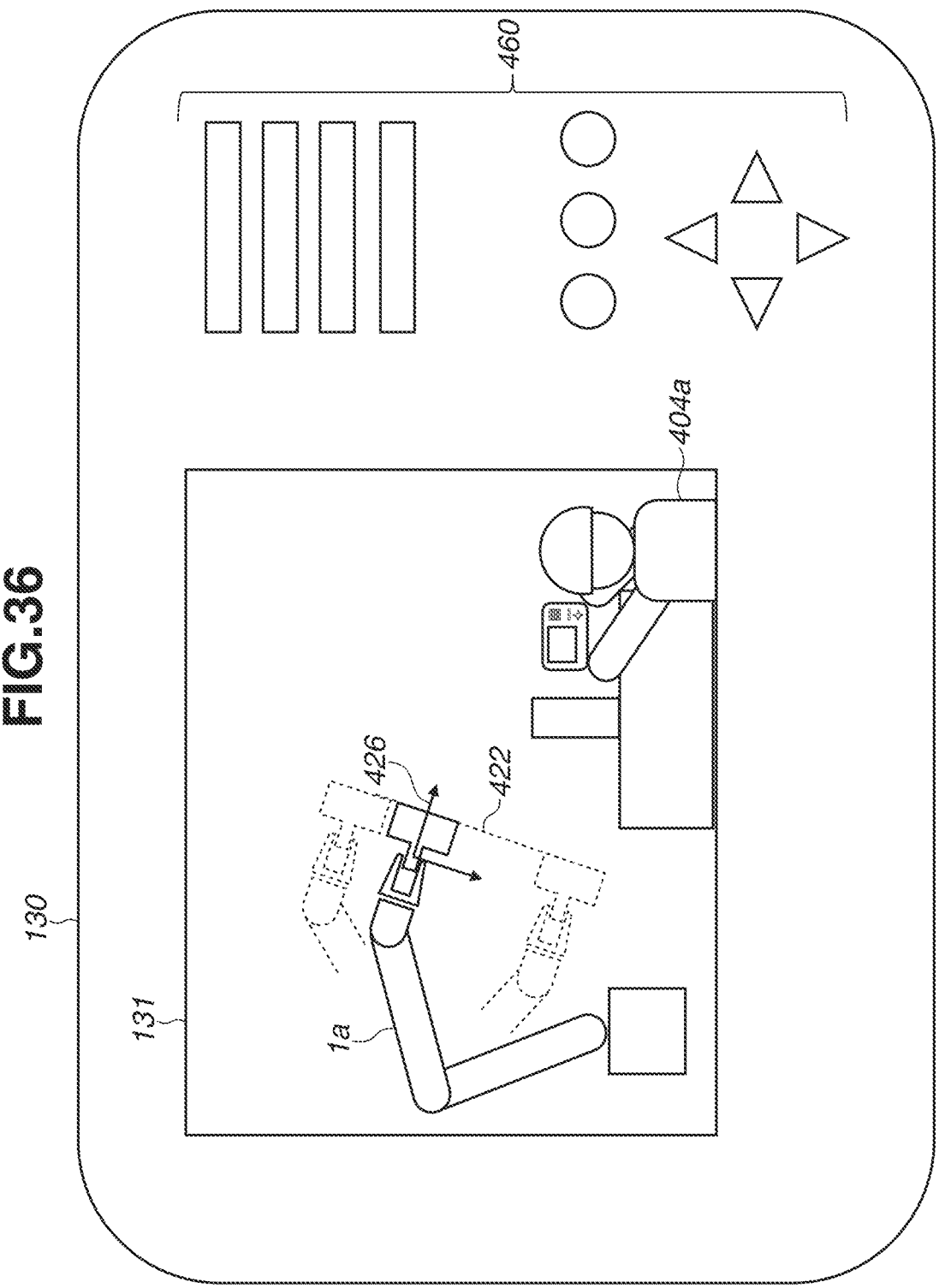
FIG. 36 is a diagram illustrating the external input device 130 according to the twelfth exemplary embodiment.

In FIG. 36, a moving operation along a tool coordinate system 426 orthogonal to the orientation of the tip of the robot apparatus 1, called tool jog operation or the like, is made on the robot apparatus 1. Like FIG. 35, in FIG. 36, a tool operation range 422 is displayed.

Even in the case of a tool jog operation, this can help the operator to grasp the operation range of the robot apparatus 1, and the operability of the robot apparatus 1 is improved.

The operation ranges 420 to 422 described with reference to FIGS. 34 to 36 can be freely switched between displayed and hidden, and do not interfere with the visibility of normal robot operations if configured to be displayable based on information and timing the operator 404 needs.

Alternatively, each of the operation ranges 420 to 422 can be set to be hidden, semitransparent, displayed in outlines, or the like when the display of the operation limit interferes with the visibility of the observation target.

Aside from the display of the operation range of the robot apparatus 1, the robot apparatus 1 is moved in a direction opposite to that of the immediately previous moving operation and stopped being operated before the robot apparatus 1 is halted with an error if the operator attempts to move the robot apparatus 1 beyond its operation limit.

Stopping the robot apparatus 1 thus enables continuing operating the robot apparatus 1 without impairing the operability of the robot apparatus 1.

A specific example of the method for controlling the robot apparatus 1 for that purpose will be described. For example, the operator presses a button of the operation units 460 of the external input device 130, to attempt to make an orthogonal jog operation on the robot apparatus 1 as a method for controlling the operation of the robot apparatus.

In such a case, the target moving position of the tip of the robot apparatus 1 is initially set, and the joint angles of the robot arm included in the robot apparatus 1 to reach that position are kinematically calculated.

There is an operation and control method for determining the operating speeds of the respective joints from differences from the angle of the respective joints of the current robot apparatus 1.

In such a case, the robot apparatus 1 is prevented from being halted with an error by setting in which the target position of the tip of the robot apparatus 1 can be set only up to or within the movable limit angles of the respective joints even in a case where an orthogonal job operation is made near the operation limit.

Moreover, in a case where the robot apparatus 1 is oriented within a certain range near the operation limit, the robot apparatus 1 is controlled to automatically make a moving operation to exit the range, e.g., move in a direction opposite to that of the previous operation.

This can avoid the issue that in which direction the robot apparatus 1 can be operated to move is unknown, in the state where the moving directions near the operation limit are extremely limited.

The specific range near the operation limit can be freely set by the operator 404. This enables the operator to make a selection based on the use purpose of the robot apparatus 1, such as to narrow the range so that operations can be more frequently performed near the limit or to conversely widen the range to avoid the risk of impairing operability at the limit positions.

As described above, according to the present exemplary embodiment, the operability of the robot apparatus 1 can be improved since the operation limit of the robot apparatus 1 can be checked by using the external input device 130.

This is particularly effective in avoiding structures lying around the robot apparatus 1 or when the robot apparatus 1 takes a complicated moving route.

In addition, the phenomenon that the robot apparatus 1 is frequently halted with an error near the operation limit can be avoided and the operability of the robot apparatus 1 is improved. Teaching operations on the robot apparatus can thus be made in a short time.

Thirteenth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as a thirteenth exemplary embodiment.

In the present exemplary embodiment, a description will be given of a case where the installation position of the robot apparatus is frequently moved to use the robot apparatus in a plurality of manufacturing lines depending on the production plan and the details of operations in the production site.

In a case where a robot apparatus is moved and the installation of the robot apparatus is not precisely adjusted, a relative position between a work and the robot apparatus changes. This causes issues such as that the robot apparatus is unable to perform operations for gripping and assembling a work and that the failure probability increases.

In moving a robot apparatus and adjusting the robot apparatus in position, alignment jigs fabricated with guaranteed precision typically need to be used to make adjustments so that the positions of the robot apparatus and the installation structure are determined with high precision.

However, such alignment jigs are costly and time consuming to manufacture. Alternatively, measuring instruments such as a laser distance meter, a protractor, and other angle meters can be used for adjustment. However, even in that case, measures like preparation of measuring instruments with guaranteed precision, precise use of the measuring instruments, designing and adjustment for the installation of the robot apparatus are needed.

In view of the foregoing issues, in the present exemplary embodiment, a description will be given of an example of a UI where the robot apparatus can be precisely positioned without using a jig or measuring instrument.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

FIG. 37 illustrates an image of an operation in moving the robot apparatus 1, captured by the imaging apparatus 2 and displayed on the display unit 131 on the external input device 130.

A robot installation image 1c is displayed near the robot apparatus captured image 1a captured by the imaging apparatus 2, so that an appropriate installation position of the robot apparatus 1 can be observed.

A designed 3D CAD model may be used for the shape and installation position of the robot installation image 1c. The position and shape of the robot apparatus 1 may be obtained by installing the robot apparatus 1 at an appropriate position once and then processing an image of the imaging apparatus, and the obtained position and shape may be used.

By using the robot installation image 1c prepared as described above, the geometrical shape to be displayed on the display unit 131 can be calculated from the orientation of the robot apparatus 1 and the orientation of the imaging apparatus 2 as in the eleventh exemplary embodiment.

Capturing an image of the robot apparatus 1 under the installation operation with the imaging apparatus 2 and processing the image to obtain the shape and position of the robot apparatus 1 enables a comparison with the robot installation image 1c.

Comparing the images for a matched area or maximum distance and displaying whether the installation position falls within an allowable range or in which direction the installation position is misaligned on the display unit 131 facilitates the installation operation.

The allowable ranges of the matched area and the maximum distance can be freely set by the operator 404 based on needed assembly precision and the like.

The installation precision can be improved by directing the orientation of the robot apparatus 1 in a plurality of directions or setting the robot apparatus 1 in a characteristic orientation during the installation operation, and aligning the robot apparatus 1 to the respective positions.

In particular, image processing precision is expected to be improved by setting the robot apparatus 1 in an orientation long in the horizontal direction, not the depth direction, when viewed from the imaging apparatus 2.

In addition, a characteristic part of the robot apparatus 1 may be enlarged and recorded by using the zoom function of the imaging apparatus 2, and the image may be used for positioning. This enables high precision positioning.

To capture images in a plurality of directions by using a plurality of imaging apparatuses during such operations can improve the installation precision in directions where observation using a single imaging apparatus is difficult.

The display method of the robot installation image 1c, such as whether to display the shape of the robot apparatus 1 with polygons, display the shape only in outlines, or provide a semitransparent display, can also be selected, based on the operability and visibility.

This can eliminate the need for the fabrication of an expensive long-lead-time alignment jig or the use of a measuring instrument even in the case where the robot apparatus 1 is moved and used on a plurality of production lines.

Moreover, in establishing a new production line in a hurry or starting a test run because of the production plan or the details of the production in the production site, a robot apparatus being used on a production line can be temporarily used.

Furthermore, when the robot apparatus finishes being used, the robot apparatus can be immediately returned to the original product line. This enables robot management accommodating multi-product small-volume production.

Fourteenth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as a fourteenth exemplary embodiment.

The present exemplary embodiment deals with a case where a robot apparatus 1 and an operator 404 are working in parallel.

In such a case, it is sometimes desired to make an imaging apparatus 2 inspect a part 406 handled by the operator 404 concurrently with the operation of the robot apparatus 1.

Here, the robot apparatus 1 can obstruct the field of view of the imaging apparatus 2 and make the part 406 not inspectable, or at what position the robot apparatus 1 can operate to perform parallel operation is not identifiable.

In the present exemplary embodiment, a description will be given of an example of a UI where the part handled by the operator can be inspected by the imaging apparatus concurrently with the operation of the robot apparatus even if the foregoing issue arises.

Differences from the foregoing exemplary embodiments in hardware and control system configurations will be illustrated and described below. Portions similar to those of the foregoing exemplary embodiments shall have similar configurations and be capable of performing similar operations to the foregoing, and a detailed description thereof will be omitted.

FIG. 38 illustrates an example where an image captured by the imaging apparatus 2 of the site where the robot apparatus 1 and the operator 404 are working in parallel in the same space is displayed on the display unit 131.

In the captured situation, the part 406 is obstructed by a predetermined joint of the robot apparatus 1, and the imaging apparatus 2 is unable to inspect the part 406.

Here, the display unit 131 displays a robot apparatus avoidance orientation 1d combined with the image captured by the imaging apparatus 2. The imaging apparatus 2 can inspect the part 406 if the robot apparatus 1 is moved to the indicated range.

As a method for deriving the robot apparatus avoidance orientation 1d, for example, a virtual pyramidal polyhedron connecting the outline of a part captured image 406a with the lens center of the imaging apparatus 2 is used, and the range where the polyhedron does not interfere with the robot apparatus 1 is thus the range where the robot apparatus 1 does not obstruct the part 406.

The orientation of the robot apparatus 1 can be kinematically calculated from the joint angles of the robot arm included in the robot apparatus 1.

What orientation eliminates the interference between the robot apparatus 1 and the polyhedron in changing the orientation of the robot apparatus 1 in a predetermined direction can thus be derived.

In addition, like the eleventh exemplary embodiment, the geometry of the robot apparatus avoidance orientation 1d to be displayed on the display unit 131 here can be derived from the orientation of the robot apparatus 1 and the orientation of the imaging apparatus 2 by perspective projection calculation.

As for which direction to calculate the robot apparatus avoidance orientation 1d when the robot apparatus 1 makes avoidance in, the operator 404 can specify an arbitrary direction along the orthogonal coordinate system and the like. FIG. 38 illustrates a range in the case where the robot apparatus 1 makes avoidance in the direction of the arrow H.

FIG. 39 illustrates a state where the robot apparatus 1 is moved to the position of the robot apparatus avoidance orientation 1d derived as described above.

The entire part 406 is thus displayed by the imaging apparatus 2 without being obstructed by the robot apparatus 1, and the imaging apparatus 2 can inspect the part 406.

As described above, according to the present exemplary embodiment, when the robot apparatus 1 and the operator 404 perform operations in parallel, the operator 404 can make settings about the operation teaching of the robot apparatus 1 while inspecting the part 406 with the imaging apparatus 2.

In a case where the installation position of the part 403 for the robot apparatus 1 to handle is determined by using this function, layout design can easily be made so that the imaging apparatus 2 can simultaneously monitor the operations of the robot apparatus 1 and the operator 404 while the robot apparatus 1 and the operator 404 perform parallel operations.

Fifteenth Exemplary Embodiment

Next, an example of a UI suitable in performing calibration operations and teaching operations on a robot apparatus and an imaging apparatus by using the external input device 130, using an image from the imaging apparatus displayed on the external input device 130 will be described as a fifteenth exemplary embodiment.

In the present exemplary embodiment, a description will be given of a case where the operator intuitively operates an imaging apparatus 2 when operating the imaging apparatus 2 by using the external input device 130. In a case where the imaging apparatus 2 is capable of operation in a pan direction and a tilt direction, an imaging operation section where the pan direction has been operated so far may look like an operation section of the tilt direction, depending on the manner of installation of the imaging apparatus 2 and the manner of display on the external input device 130. This makes the imaging apparatus 2 difficult to intuitively operate. The present exemplary embodiment describes an example of a UI where the imaging apparatus 2 can be intuitively operated by using the external input device 130 even in a case where the foregoing issue arises.

FIG. 40 illustrates a screen displayed on a display unit 131 according to the present exemplary embodiment. A difference from the foregoing various exemplary embodiments is that the screen includes an imaging apparatus installation icon 560 displaying the installation state of the imaging apparatus 2 as seen from the operator. The external input device 130 stores information about the manner of installation of the imaging apparatus 2 to be operated in advance, and displays the installation state of the imaging apparatus 2 on an imaging operation section 105, based on the stored information. An arrow B that is a visual indicator indicating the pan direction and an arrow A that is a visual indicator indicating the tilt direction are also displayed on the imaging apparatus installation icon 560.

When operating the imaging apparatus 2 in the direction of the arrow A that is the tilt direction, the operator operates the imaging apparatus 2 by using point of view operation buttons 106*a*. When operating the imaging apparatus 2 in the direction of the arrow B that is the pan direction, the operator operates the imaging apparatus 2 by using point of view operation buttons 106*b*. Here, "A"s are displayed near the point of view operation buttons 106*a* as visual indicators indicating the tilt direction, and "B"s are displayed near the point of view operation buttons 106*b* as visual indicators indicating the pan direction. This makes the directions indicated by the point of view operation buttons 106*a* agree with the direction of the arrow A that is the tilt direction in appearance, and the directions indicated by the point of view operation buttons 106*b* agree with the direction of the arrow B that is the pan direction in appearance. The imaging apparatus 2 can thus be intuitively operated by using the external input device 130.

FIG. 41 illustrates a screen displayed on the display unit 131 in a case where the imaging apparatus 2 is installed in a different manner from the installation manner in FIG. 40. In FIG. 41, the imaging apparatus 2 is installed as rotated 90° from the installation state of the imaging apparatus 2 in FIG. 40. The imaging apparatus installation icon 560 is displayed on the imaging operation section 105 with the imaging apparatus 2 rotated by 90°.

In FIG. 41, in a case where operating the imaging apparatus 2 in the direction of the arrow A that is the tilt direction, the operator operates the imaging apparatus 2 by using the point of view operation buttons 106*b*. When operating the imaging apparatus 2 in the direction of the arrow B that is the pan direction, the operator operates the imaging apparatus 2 by using the point of view operation buttons 106*a*. Here, "B"s are displayed near the point of view operation buttons 106*a* as visual indicators indicating the pan direction, and "A"s are displayed near the point of view operation buttons 106*b* as visual indicators indicating the tilt direction. This makes the directions indicated by the point of view operation buttons 106*b* agree with the direction of the arrow A that is the tilt direction in appearance, and the directions indicated by the point of view operation buttons 106*a* agree with the direction of the arrow B that is the pan direction in appearance. The imaging apparatus 2 can thus be intuitively operated by using the external input device 130 even in a case where the manner of installation of the imaging apparatus 2 is different. Moreover, since the manner of installation of the imaging apparatus 2 is displayed, the operator can perform more intuitive operation of the imaging apparatus 2. While the letters and arrows are displayed as visual indicators, methods visually recognizable to the operator, such as figures and pictures, may be used as appropriate.

The processing procedures of the foregoing various exemplary embodiments have been described to be executed by the control apparatus 13 in particular. However, a software control program capable of executing the foregoing functions and a recording medium recording the program may be mounted on the external input device 130 for implementation.

The software control program capable of executing the foregoing functions and the recording medium recording the program therefore configure the present invention.

In the foregoing exemplary embodiments, the computer-readable recording medium is described to be a ROM or a RAM, and the control program is described to be stored in the ROM or the RAM. However, the present invention is not limited to such modes.

A control program for implementing the present invention may be recorded on any recording medium that is computer-readable. For example, an HDD, an external storage device, a recording disk, and the like may be used as recording media for supplying the control program.

Other Exemplary Embodiments

In the foregoing various exemplary embodiments, the robot apparatus 1 is described to use an articulated robot arm including a plurality of joints. However, the number of joints is not limited thereto. While the robot apparatus is described to have a vertical multi-axis configuration, a configuration equivalent to the foregoing can be implemented even with joints of different types, such as a parallel link type.

Moreover, the configuration examples of the robot apparatus 1 have been illustrated in the diagrams of the exemplary embodiments. However, this is not restrictive, and design changes can be freely made by those skilled in the art. The motors included in the robot apparatus 1 are not limited to the foregoing configuration, and the driving sources for driving the joints may be devices such as artificial muscles.

The foregoing various exemplary embodiments can be applied to machines that can automatically perform extension and contraction, bending and stretching, up and down movement, right and left movement, or rotating operations, or composite operations thereof, based on information from a storage device included in a control apparatus.

In the foregoing various exemplary embodiments, the screen configuration for monitoring the operation of the robot apparatus imaged by the imaging apparatus 2 is displayed on the external input device 130. However, this is not restrictive.

For example, the screen configuration may be displayed on various interfaces, such as a portable terminal, a desktop personal computer, and a laptop personal computer that can operate the robot apparatus by using an application and the like.

In the foregoing exemplary embodiments, the items displayed on the display unit of the external input device are described as being called buttons. However, the buttons may be replaced with and implemented as display icons or display items.

In the foregoing various exemplary embodiments, the imaging apparatus 2 is described by using an imaging apparatus that is installed and captures an image at a predetermined position as an example. However, this is not restrictive. For example, an imaging apparatus may be installed on the end effector of a robot apparatus, and the imaging apparatus may be used as an on-hand camera to display an image from an imaging apparatus capturing an image from a fixed point and an image from the imaging apparatus used as the on-hand camera on the same screen of the external input device. The operator can thus observe the point of view from the end effector in operation while observing the entire robot apparatus, and can teach the robot apparatus more easily. The image from the imaging apparatus capturing an image from the fixed point and the image from the imaging apparatus used as the on-hand camera can be alternately displayed on the image display unit.

The foregoing various exemplary embodiments have been described by using examples where the image captured by the imaging apparatus 2 is displayed. However, this is not restrictive. The control apparatus 13 may include a built-in image processing apparatus, and may perform image processing on the image captured by the imaging apparatus 2 and display the result of the image processing on the display unit 131 of the external input device 130. In correcting the teaching of the robot apparatus by using the imaging apparatus 2, the operator can thus correct the teaching of the robot apparatus while observing the result of the image processing.

The present invention is not limited to the foregoing exemplary embodiments, and various changes and modifications can be made without departing from the spirit and scope of the present invention. The following claims are thus attached to make the scope of the present invention public.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, an imaging point of view can be easily adapted by using an image display unit, an imaging operation unit, and a robot apparatus operation unit even if a position of a robot apparatus changes successively when an operator teaches the robot apparatus while viewing an image from an imaging apparatus.

The operator can thus teach the robot apparatus at each teaching point by using the robot apparatus operation unit and adjust the imaging apparatus by using the imaging operation unit while checking the imaging point of view in the image display unit.

A user-friendly external input device can thus be provided since teaching operations on the robot apparatus and teaching operations on the imaging apparatus can be made and the image from the imaging apparatus can be observed by using the same device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An external input device with a monitor and one or more processors, the external input device being configured to operate a robot system including an imaging apparatus capable of changing an imaging point of view of the imaging apparatus, the one or more processors causing the external input device to provide functions performed by:
a robot apparatus operation unit displayed on the monitor and configured to operate a robot apparatus of the robot system;
an imaging operation unit displayed on the monitor and configured to operate the imaging apparatus; and
an image display unit displayed on the monitor and configured to display an image captured by the imaging apparatus,
wherein the image display unit is disposed between the robot apparatus operation unit and the imaging operation unit,
wherein the external input device further comprises:
a vertical flip button displayed on the monitor and configured to vertically flip the image on the image display unit, and
an automatic button configured to automatically vertically flip the image on the image display unit, and
wherein an automatic setting unit displayed on the monitor and configured to set a trigger for automatically vertically flipping the image on the image display unit is displayed by an operation on the automatic button.

2. The external input device according to claim 1, wherein display positions of the robot apparatus operation unit, the imaging operation unit, and the image display unit are changeable.

3. The external input device according to claim 1,
wherein the external input device can operate the robot apparatus as the robot apparatus operation unit by a touch on a representation of the robot apparatus displayed on the image display unit, and
wherein the external input device can operate the imaging apparatus as the imaging operation unit by a touch on a portion of the image display unit other than the displayed representation of the robot apparatus.

4. The external input device according to claim 3,
wherein the external input device can operate the robot apparatus as the robot apparatus operation unit by making a single touch or a multi-touch on any portion displayed on the image display unit, and
wherein the external input device can operate the imaging apparatus as the imaging operation unit by making a touch on any portion displayed on the image display unit, the touch being a method among the single touch and the multi-touch not being used to operate the robot apparatus.

5. The external input device according to claim 3, wherein in an operation of the imaging apparatus by touching the image display unit,
the imaging point of view of the imaging apparatus is moved by a touch on the image display unit and sliding the touch in a predetermined direction,
the imaging apparatus is zoomed out by a touch on the image display unit and a pinch-out, and
the imaging apparatus is zoomed in by a touch on the image display unit and a pinch-in.

6. The external input device according to claim 3, wherein in an operation of the robot apparatus by touching the image display unit, an operation for touching and flicking the image display unit is not accepted.

7. The external input device according to claim 1,
wherein the external input device can operate the robot apparatus as the robot apparatus operation unit by a touch on any portion displayed on the image display unit with a predetermined value of force or more, and
wherein the external input device can operate the imaging apparatus as the imaging operation unit by a touch on any portion displayed on the image display unit with a value of force less than the predetermined value of force.

8. The external input device according to claim 1, wherein the image display unit displays an operation setting button configured to set which to operate, the robot apparatus or the imaging apparatus, by a touch on the image display unit.

9. The external input device according to claim 1, further comprising a coordinate system switch button configured to, in switching between targets to be operated by the external input device, switch to a coordinate system serving as an operation reference for a corresponding one of the targets to be operated and make the target to be operated operable.

10. The external input device according to claim 9, wherein the coordinate system switch button includes
a base coordinate system button configured to switch to a base coordinate system based on a position where the robot apparatus is installed,
an end effector coordinate system button configured to switch to an end effector coordinate system based on a position of an end effector of the robot apparatus, and
an imaging coordinate system button configured to switch to a coordinate system related to the imaging apparatus.

11. The external input device according to claim 1, wherein the automatic setting unit is capable of setting an angle value serving as the trigger in each driving unit of the imaging apparatus.

12. The external input device according to claim 1, wherein the image on the image display unit can be rotated by a multi-touch.

13. The external input device according to claim 1,
wherein the monitor displays a process program screen configured to display operation processes of the robot apparatus, and
wherein the process program screen is configured to display a name of the imaging apparatus to be used in a predetermined one of the processes and a teaching point taught to the imaging apparatus.

14. The external input device according to claim 13,
wherein there is installed a plurality of the imaging apparatuses, and
wherein the external input device includes an imaging apparatus switch button configured to automatically switch to an imaging apparatus capturing an image of the robot apparatus among the plurality of the imaging apparatuses, as an imaging apparatus to display an image on a display unit.

15. The external input device according to claim 1,
wherein the monitor is configured to display
a measurement button configured to cause measurement of an operation time of the robot apparatus and an operator performing operation with the robot apparatus,
a measurement setting button configured to perform a setting of measurement of the operation time, and
a time display unit configured to display a measured operation time.

16. The external input device according to claim 15, wherein a setting screen configured to perform a setting of measurement of a collaborative operation time where the robot apparatus and the operator operate in a collaborative manner is displayed by an operation on the measurement setting button.

17. The external input device according to claim 15,
wherein a setting screen is capable of setting a relative distance between the robot apparatus and the operator, and
wherein a time during which the relative distance between the robot apparatus and the operator is less than or equal to a distance set on the setting screen is measured as the collaborative operation time.

18. The external input device according to claim 1,
wherein the monitor is configured to display
an imaging target specification box configured to set an imaging target of the imaging apparatus, and
an imaging tracking button configured to cause control of the imaging apparatus to continue automatically capturing an image of the imaging target specified by the imaging target specification box.

19. The external input device according to claim 18, wherein the monitor displays a robot tracking button configured to control the robot apparatus so that an image of the imaging target specified by the imaging target specification box continues to be automatically captured.

20. The external input device according to claim 18,
wherein the monitor includes a coordinate display box configured to display a predetermined coordinate value in the robot system,
wherein the coordinate display box is capable of inputting a predetermined coordinate value, and
wherein a robot movement button configured to operate the robot apparatus to the predetermined coordinate value input into the coordinate display box and an imaging movement button configured to cause the imaging apparatus to capture an image of the predetermined coordinate value input into the coordinate display box are displayed.

21. The external input device according to claim 1,
wherein the monitor is configured to display
an area setting button configured to set a predetermined area in imaging captured by the imaging apparatus, a work registration button configured to set a work for the imaging apparatus to capture an image of, and
a work search button configured to search the predetermined area for the work to be captured the image of.

22. The external input device according to claim 1,
wherein an image captured by the imaging apparatus of the robot apparatus in a predetermined process and a virtual robot combined image indicating a position of the robot apparatus in a process subsequent to the predetermined process are displayed on the image display unit.

23. The external input device according to claim 22, wherein the imaging captured by the imaging apparatus of the robot apparatus in the predetermined process and an operation range of the robot apparatus are displayed on the image display unit.

24. The external input device according to claim 23, wherein, as the operation range, a limit of the operation range is displayed by using the virtual robot combined image.

25. The external input device according to claim 22, wherein imaging captured by the imaging apparatus of an operation for installing the robot apparatus in a predetermined location and a virtual robot combined image indicating a position of the robot apparatus in a case where the robot apparatus is installed in a location different from the predetermined location are displayed on the image display unit.

26. The external input device according to claim 22, wherein imaging captured by the imaging apparatus of a work obstructed in part by the robot apparatus and a virtual robot combined image indicating a position of the robot apparatus where an image of the entire work can be captured by the imaging apparatus are displayed on the image display unit.

27. The external input device according to claim 1,
wherein a first icon configured to perform a display setting of the image display unit and a second icon configured to perform a setting of sound to be issued from a component of the robot apparatus are displayed on the image display unit.

28. The external input device according to claim 1, further comprising:
a storage unit configured to store face data on an operator operating the robot system by using the external input device,
wherein the monitor includes a face authentication button configured to detect a face of an operator using the external input device by the imaging apparatus, and compare the detected face with the face data stored in the storage unit.

29. The external input device according to claim 28, wherein an operation by the face authentication button includes comparing the detected face with the face data stored in the storage unit, and in a case where the detected face and the face data stored in the storage unit do not match, setting a restriction on operation of the robot apparatus by the operator.

30. The external input device according to claim 1,
wherein the robot apparatus operation unit, the imaging operation unit, and the image display unit are disposed on a predetermined surface of the monitor.

31. The external input device according to claim 1, wherein the robot apparatus operation unit is disposed on either left or right of the image display unit with respect the display unit, and the imaging operation unit is located on the other.

32. The external input device according to claim 1,
wherein an imaging apparatus installation icon indicating an installation state of the imaging apparatus is displayed on the monitor.

33. The external input device according to claim 32, wherein display of the imaging apparatus installation icon is also changed when the installation state of the imaging apparatus is changed.

34. The external input device according to claim 32,
wherein an imaging operation unit configured to operate the imaging apparatus is displayed on the monitor, and
wherein a setting of the imaging operation unit is changed in a case where the installation state of the imaging apparatus is changed.

35. The external input device according to claim 34,
wherein the imaging apparatus is a pan-tilt camera capable of driving in a pan direction and a tilt direction, and
wherein a visual indicator indicating the pan direction and a visual indicator indicating the tilt direction are displayed on the imaging apparatus installation icon.

36. The external input device according to claim 1, comprising, as the imaging apparatus, a first imaging apparatus capable of changing an imaging point of view and disposed at a position not moved by the robot apparatus, and a second imaging apparatus disposed on a predetermined portion of the robot apparatus,
wherein an image captured by the first imaging apparatus and an image captured by the second imaging apparatus can be displayed on the monitor.

37. The external input device according to claim 36, wherein the image captured by the first imaging apparatus and the second image captured by the second imaging apparatus can be alternately displayed.

38. An external input device with a monitor and one or more processors, the external input device being configured to operate a robot system including an imaging apparatus capable of changing an imaging point of view of the imaging apparatus, the one or more processors causing the external input device to provide functions performed by:
a robot apparatus operation unit displayed on the monitor and configured to operate a robot apparatus of the robot system;
an imaging operation unit displayed on the monitor and configured to operate the imaging apparatus; and
an image display unit displayed on the monitor and configured to display an image captured by the imaging apparatus,
wherein the image display unit is disposed between the robot apparatus operation unit and the imaging operation unit,
wherein the robot apparatus operation unit includes
a playback bar configured to indicate up to an end time of a predetermined operation of the robot apparatus taught in advance, and
a first position mark indicating a temporal position on the playback bar, and
wherein the imaging operation unit includes
operation bars displayed on the monitor and each indicating an operation range of respective driving units of the imaging apparatus, and
second position marks indicating a current position on each of the operation bars,
wherein an imaging point of view teaching point indicating a teaching point for a predetermined imaging point of view of the imaging apparatus is displayed on the playback bar and each of the operation bars.

39. The external input device according to claim 38,
wherein the imaging apparatus is a pan-tilt camera and includes a zoom function,
wherein the operation bars include
a pan operation bar configured to operate the imaging apparatus in a pan direction,
a tilt operation bar configured to operate the imaging apparatus in a tilt direction, and
a zoom adjustment bar configured to adjust the zoom function, and
wherein the second position marks are displayed on each of the pan operation bar, the tilt operation bar, and the zoom adjustment bar.

40. An external input device with a monitor and one or more processors, the external input device being configured to operate a robot system including an imaging apparatus capable of changing an imaging point of view of the imaging apparatus, the one or more processors causing the external input device to provide functions performed by:
  a robot apparatus operation unit displayed on the monitor and configured to operate a robot apparatus of the robot system;
  an imaging operation unit displayed on the monitor and configured to operate the imaging apparatus; and
  an image display unit displayed on the monitor and configured to display an image captured by the imaging apparatus,
wherein the image display unit is disposed between the robot apparatus operation unit and the imaging operation unit,
wherein the robot apparatus operation unit includes
a playback bar configured to indicate up to an end time of a predetermined operation of the robot apparatus taught in advance, and
a first position mark indicating a temporal position on the playback bar, and
wherein the imaging operation unit includes
operation bars displayed on the monitor and each indicating an operation range of respective driving units of the imaging apparatus, and
second position marks indicating a current position on each of the operation bars,
wherein a settable range is displayed on each of the operation bars, the settable range indicating a range where a teaching point for the imaging point of view can be set in the operation range of each of the driving units.

* * * * *